United States Patent
Braedt et al.

(10) Patent No.: US 12,135,064 B2
(45) Date of Patent: Nov. 5, 2024

(54) BRAKE ROTORS FOR BICYCLES

(71) Applicant: SRAM, LLC, Chicago, IL (US)

(72) Inventors: Henrik Braedt, Hambach (DE); Brian Jordan, Highland Park, IL (US); Charles Dunlap, Manitou Springs, CO (US); Sebastian Heyna, Hambch (DE)

(73) Assignee: SRAM, LLC, Chicago, IL (US)

( * ) Notice: Subject to any disclaimer, the term of this patent is extended or adjusted under 35 U.S.C. 154(b) by 835 days.

(21) Appl. No.: 17/125,029

(22) Filed: Dec. 17, 2020

(65) Prior Publication Data
US 2022/0196090 A1     Jun. 23, 2022

(51) Int. Cl.
*F16D 65/12*     (2006.01)
*B60B 27/00*     (2006.01)
*B62L 1/00*     (2006.01)
*F16D 65/02*     (2006.01)

(52) U.S. Cl.
CPC ........ *F16D 65/123* (2013.01); *B60B 27/0052* (2013.01); *B62L 1/005* (2013.01); *F16D 65/128* (2013.01); *B60B 27/0026* (2013.01); *B60B 2200/47* (2013.01); *B60B 2320/10* (2013.01); *F16D 2065/1328* (2013.01); *F16D 2065/136* (2013.01); *F16D 2065/1384* (2013.01); *F16D 2065/1392* (2013.01); *F16D 2200/0021* (2013.01); *F16D 2200/003* (2013.01); *F16D 2200/0043* (2013.01); *F16D 2200/0047* (2013.01); *F16D 2200/0052* (2013.01); *F16D 2200/006* (2013.01); *F16D 2250/0084* (2013.01)

(58) Field of Classification Search
CPC ..................... F16D 65/12; F16D 65/123–128
USPC .......................................... 188/18 A, 218 XL
See application file for complete search history.

(56) References Cited

U.S. PATENT DOCUMENTS

| | | | | |
|---|---|---|---|---|
| 5,520,269 | A * | 5/1996 | Yamamoto | F16D 65/123 188/218 XL |
| 10,480,601 | B2 * | 11/2019 | Dunlap | F16D 65/125 |
| 11,644,072 | B2 * | 5/2023 | Lisciani | F16D 65/123 188/218 XL |
| 2006/0054422 | A1 | 3/2006 | Dimsey et al. | |

(Continued)

FOREIGN PATENT DOCUMENTS

| | | |
|---|---|---|
| CN | 1697942 | 11/2005 |
| CN | 103201162 | 7/2013 |

(Continued)

OTHER PUBLICATIONS

Yeti Lawwill DH Custom Frame Made for Jürgen Beneke, Web Page, Last Checked Nov. 19, 2021, <https://www.worthpoint.com/worthopedia/yeti-lawwill-dh-custom-frame-made-176605707>.

(Continued)

*Primary Examiner* — Christopher P Schwartz

(57) ABSTRACT

Brake rotors for bicycles are described herein. An example brake rotor for a bicycle includes a carrier to be coupled to a hub of the bicycle. The brake rotor also includes a brake track having braking surfaces to be engaged by brake pads. The brake track is disposed radially outward of the carrier. The brake track has a first thickness and the carrier has a second thickness greater than the first thickness. The brake track is coupled to the carrier such that the brake track is axially movable relative to the carrier while being radially and circumferentially constrained relative to the carrier.

17 Claims, 30 Drawing Sheets

(56) References Cited

U.S. PATENT DOCUMENTS

| | | | |
|---|---|---|---|
| 2015/0183488 A1 | 7/2015 | Hirotomi et al. | |
| 2017/0114846 A1 | 4/2017 | Chen | |
| 2019/0093717 A1* | 3/2019 | Kirkpatrick | ........... F16D 65/186 |
| 2019/0120305 A1 | 4/2019 | Lavezzi | |
| 2020/0407009 A1* | 12/2020 | Dunlap, III | ........... F16D 65/128 |

FOREIGN PATENT DOCUMENTS

| | | |
|---|---|---|
| CN | 104768842 | 2/2018 |
| CN | 109424672 | 3/2019 |
| CN | 109789871 | 5/2019 |
| DE | 102010035492 | 3/2012 |
| TW | 201325984 | 7/2013 |
| TW | 201843400 | 12/2018 |
| TW | M572336 U | 1/2019 |

OTHER PUBLICATIONS

1998 Yeti DH-8, Web Page, Last Checked Nov. 19, 2021, <http://www.vintagemtbworkshop.com/1998-yeti-dh-8.html>.

Christopher Bayer, "First Look: Ghost presents the new RIOT LT", Web Page, Nov. 17, 2014, <https://enduro-mtb.com/en/first-look-ghost-presents-the-new-riot-lt/>.

Tyler Benedict, "Ghost's 2016 AMR platform builds three trail bikes from one frame, new Lector World Cup & more", Web Page, Jul. 5, 2015, <https://bikerumor.com/ghosts-2016-amr-platform-builds-three-trail-bikes-from-one-frame-new-lector-world-cup-more/>.

Mike Kazimer, "Ghost Bikes AMR Rio 9", Web Page, Aug. 14, 2013, <https://www.pinkbike.com/news/First-Look-Ghost-Bikes-AMR-Riot-9.html?trk=rss>.

Greg Kopecky, "2020 Trek Checkpoint gravel bike gets updates, wide-range 1x drivetrain option", Web Page, Aug. 13, 2019, <https://bikerumor.com/2020-trek-checkpoint-gravel-bike-gets-updates-wide-range-1x-drivetrain-option/>.

Cory Benson, "Reshaped MMR Kenta prototype XC mountain bike gets Nove Mesto World Cup race debut", Web Page, May 17, 2021, <https://bikerumor.com/reshaped-mmr-kenta-prototype-xc-mountain-bike-gets-nove-mesto-world-cup-race-debut/>.

James Smurthwaite, "MMR's Prototype Kenta Full Suspension XC Race Bike", Web Page, May 17, 2021, <https://www.pinkbike.com/news/mmrs-prototype-kenta-full-suspension-race-bike-albstadt-xc-world-cup-2021.html?trk=rss>.

Francesco Mazza, "Riconoscere i sistemi Virtual Pivot", Web Page, Jul. 1, 2014, <https://www.mtb-mag.com/riconoscere-i-sistemi-virtual-pivot/>, IT.

"Yetifan 90s", Web Page, Last Checked Nov. 19, 2021, <http://www.yetifan.com/YETI_PAST/80s/00s/90s/90s.html>.

* cited by examiner

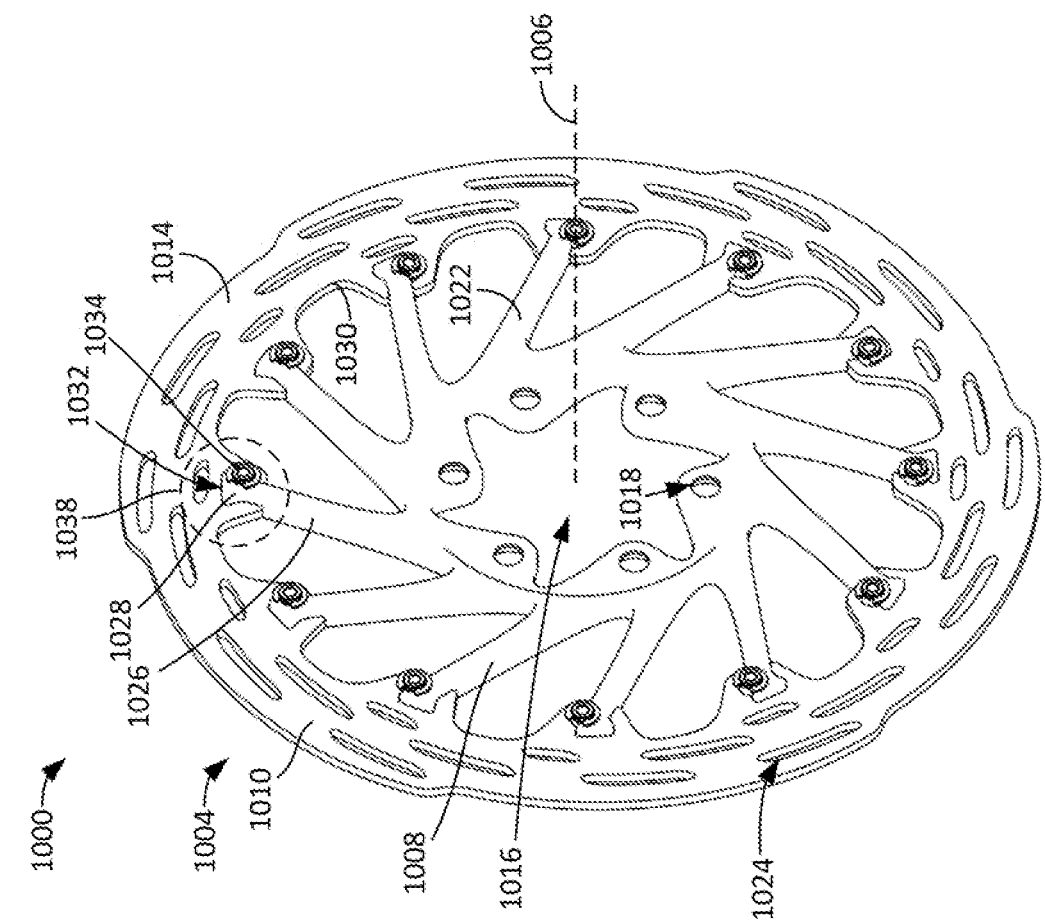
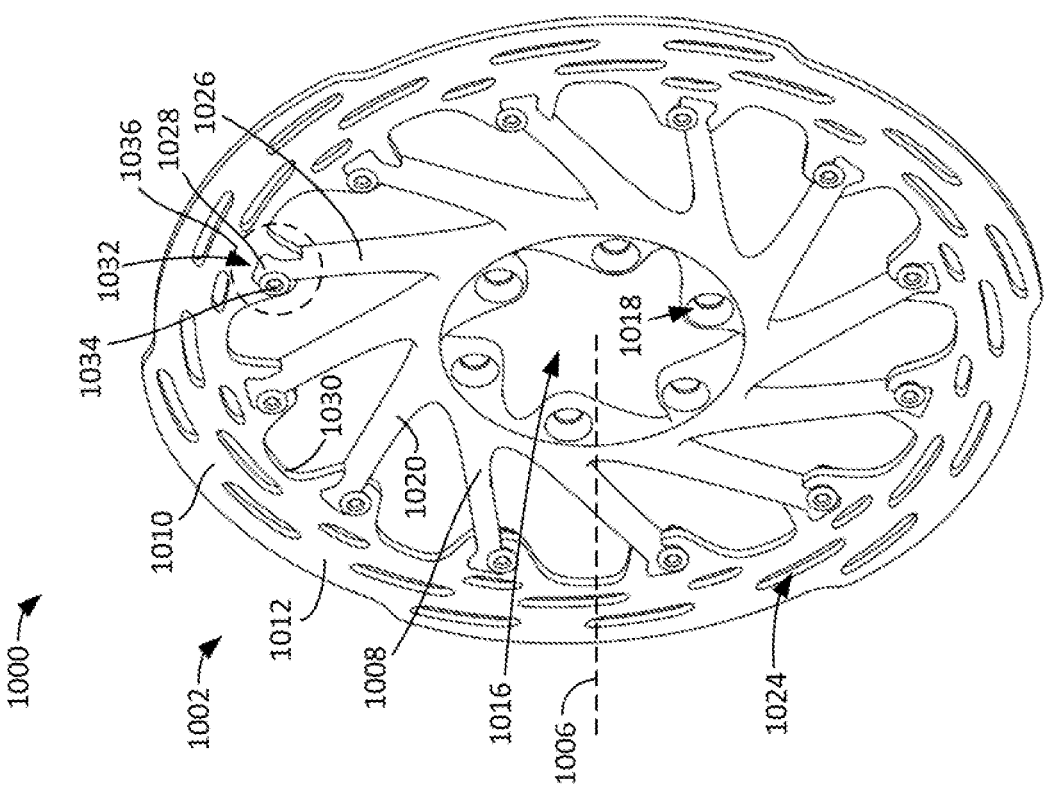

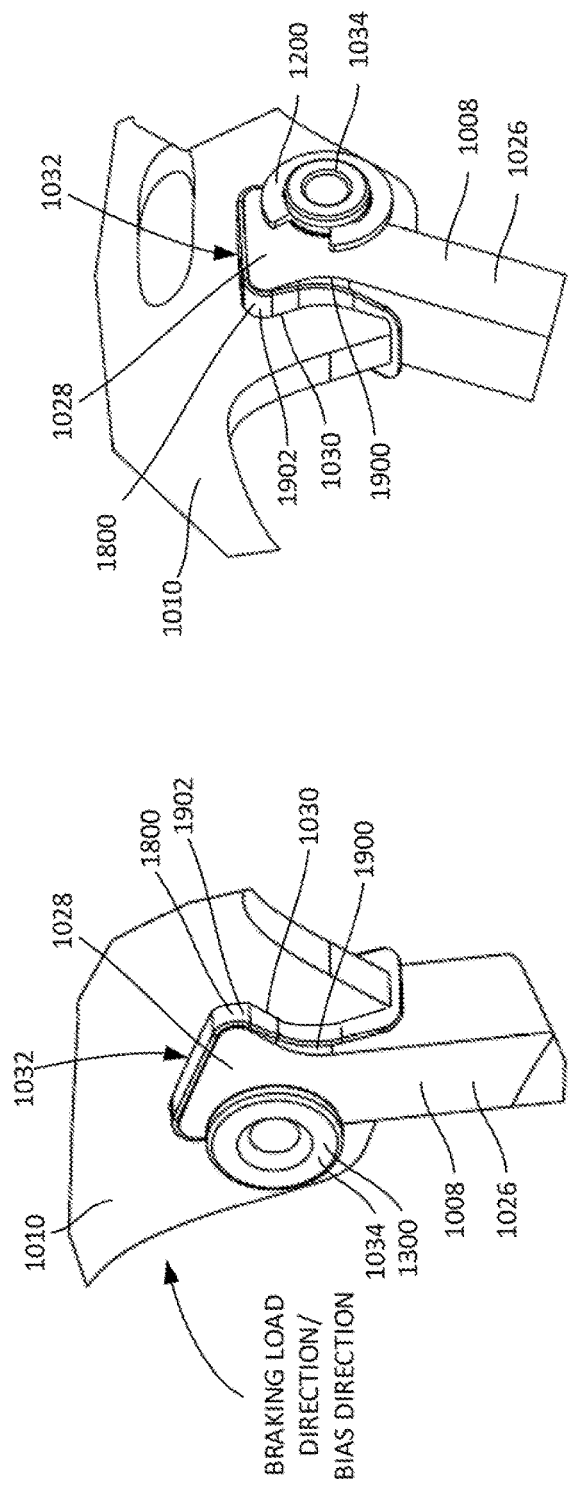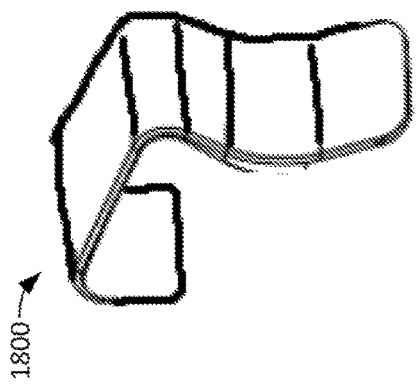

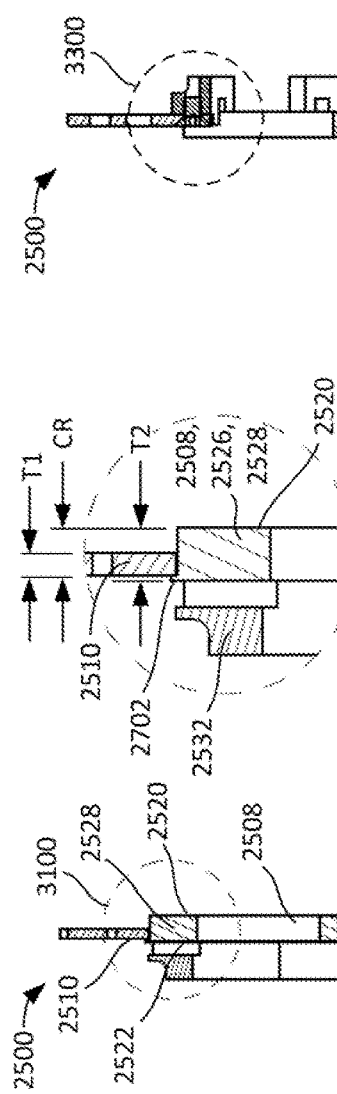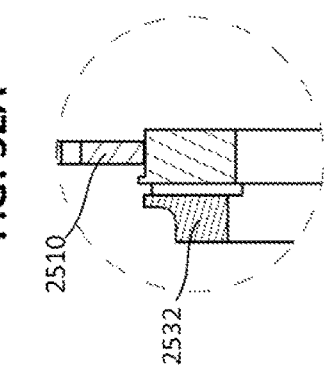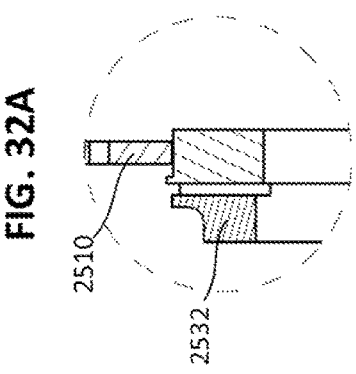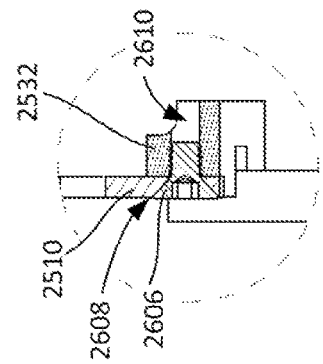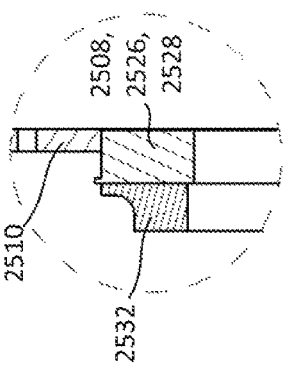

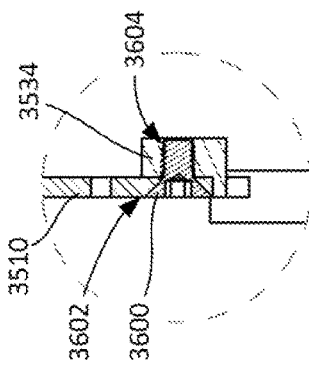
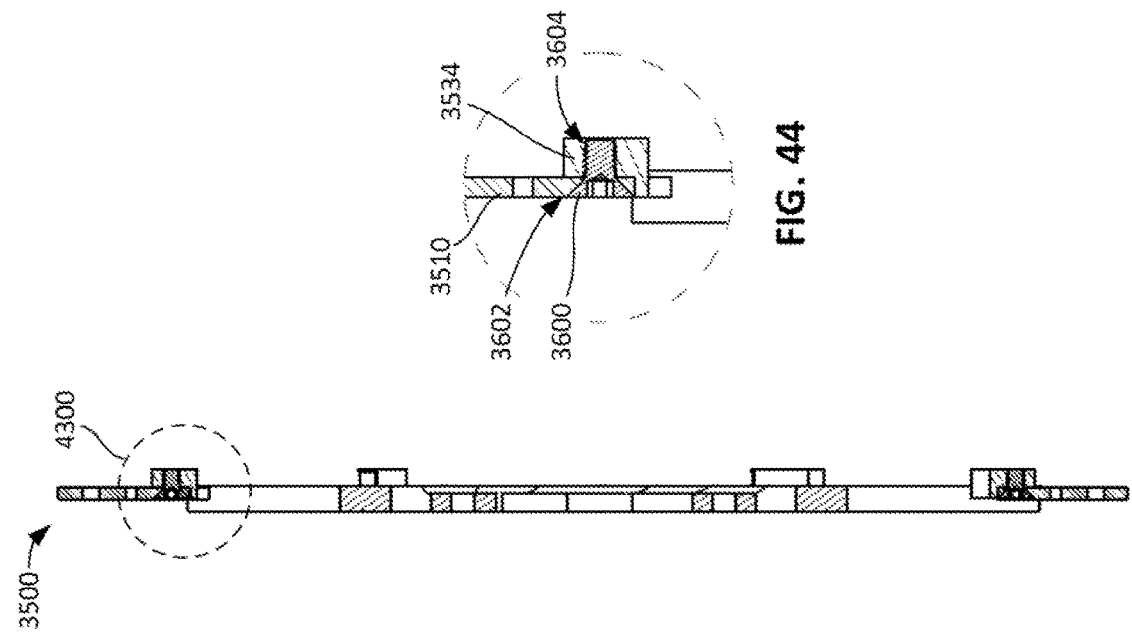
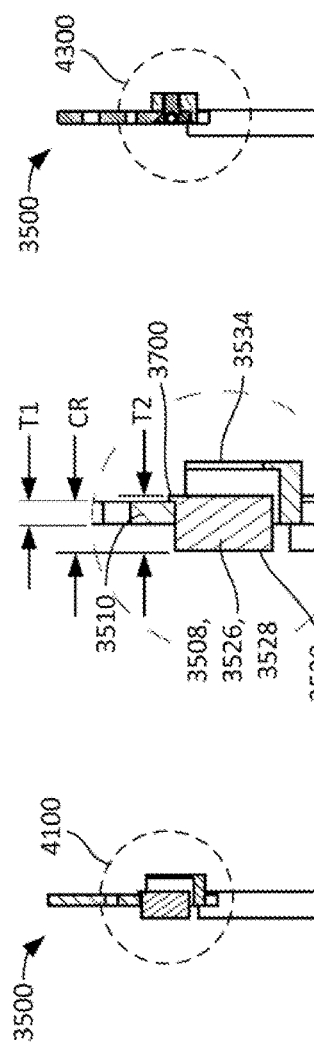
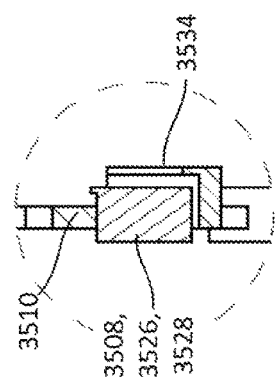
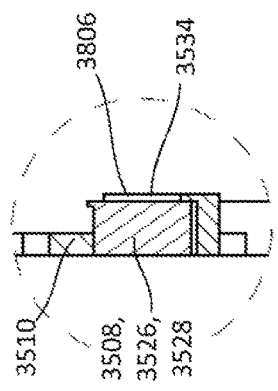

BRAKE ROTORS FOR BICYCLES

FIELD OF THE DISCLOSURE

This disclosure relates generally to bicycle components and, more specifically, to self-aligning brake rotors for bicycles.

BACKGROUND

Bicycles and other human powered vehicles often include disc brakes. A disc brake includes a brake rotor and a brake caliper. The brake rotor is typically mounted to a hub on a wheel of the bicycle, and the brake caliper is mounted to a fixed portion of the bicycle such as the frame. When the brake caliper is actuated, the brake caliper moves one or more brake pads into engagement with the brake rotor, which slows the brake rotor and, thus, reduces the speed the bicycle.

SUMMARY

An example brake rotor for a bicycle includes a carrier to be coupled to a hub of the bicycle. The brake rotor also includes a brake track having braking surfaces to be engaged by brake pads. The brake track is disposed radially outward of the carrier. The brake track has a first thickness and the carrier has a second thickness greater than the first thickness. The brake rotor has a rotational axis defining a coordinate reference. The brake track is coupled to the carrier such that the brake track is axially movable relative to the carrier while being radially and circumferentially constrained relative to the carrier.

An example brake rotor for a bicycle includes a carrier to be coupled to a hub of the bicycle. The carrier has an arm with an end portion. The end portion has a protrusion extending in a circumferential direction. The brake rotor also includes a brake track having braking surfaces to be engaged by brake pads. The brake rotor has a rotational axis defining a coordinate reference. The brake track is disposed radially outward of the carrier. The brake track has an inner peripheral edge with a notch. The end portion of the arm is disposed in the notch. The brake track is axially slidable on the end portion. The notch of the brake track is at least partially defined by a lip that is disposed radially inward relative to the protrusion of the end portion to radially constrain the brake track relative to the carrier.

An example hub assembly for a bicycle includes a hub having a spoke-attachment flange, a frame attachment section, and a first spline interface between the spoke-attachment flange and the frame attachment section. The hub assembly also includes a brake rotor disposed on the hub. The hub and the brake rotor are rotatable about a rotational axis that defines a coordinate reference. The brake rotor includes a carrier and a brake track coupled to the carrier. The carrier has a second spline interface engaged with the first spline interface. The first spline interface having a greater thickness than the second spline interface. The brake rotor being axially movable on the second spline interface of the hub between the spoke-attachment flange and the frame attachment section.

BRIEF DESCRIPTION OF THE DRAWINGS

FIGS. 10A and 10B are perspective views of opposite sides of an example brake rotor constructed in accordance with the teachings of this disclosure.

FIGS. 19A and 19B are enlarged views of the callouts in FIGS. 18A and 18B, respectively.

FIG. 20 is a perspective view of an example spring from the example brake rotor of FIGS. 18A and 18B.

FIG. 31 is a cross-sectional view of the example brake rotor of FIGS. 25A and 25B taken along line D-D in FIG. 30.

FIGS. 32A, 32B, and 32C are enlarged views of the callout in FIG. 31 showing an example brake track and an example positioning portion moved axially to three different positions.

FIG. 33 is a cross-sectional view of the example brake rotor of FIGS. 25A and 25B taken along line E-E in FIG. 30.

FIG. 34 is an enlarged view of the callout in FIG. 33.

FIG. 41 is a cross-sectional view of the example brake rotor of FIGS. 35A and 35B taken along line F-F in FIG. 40.

FIGS. 42A, 42B and 42C are enlarged views of the callout in FIG. 41 showing an example brake track and an example stop moved axially to three different positions.

FIG. 43 is a cross-sectional view of the example brake rotor of FIGS. 35A and 35B taken along line G-G in FIG. 40.

FIG. 44 is an enlarged view of the callout in FIG. 43.

The figures are not to scale. Instead, the thickness of the layers or regions may be enlarged in the drawings. In general, the same reference numbers will be used throughout the drawing(s) and accompanying written description to refer to the same or like parts.

Figure 1:
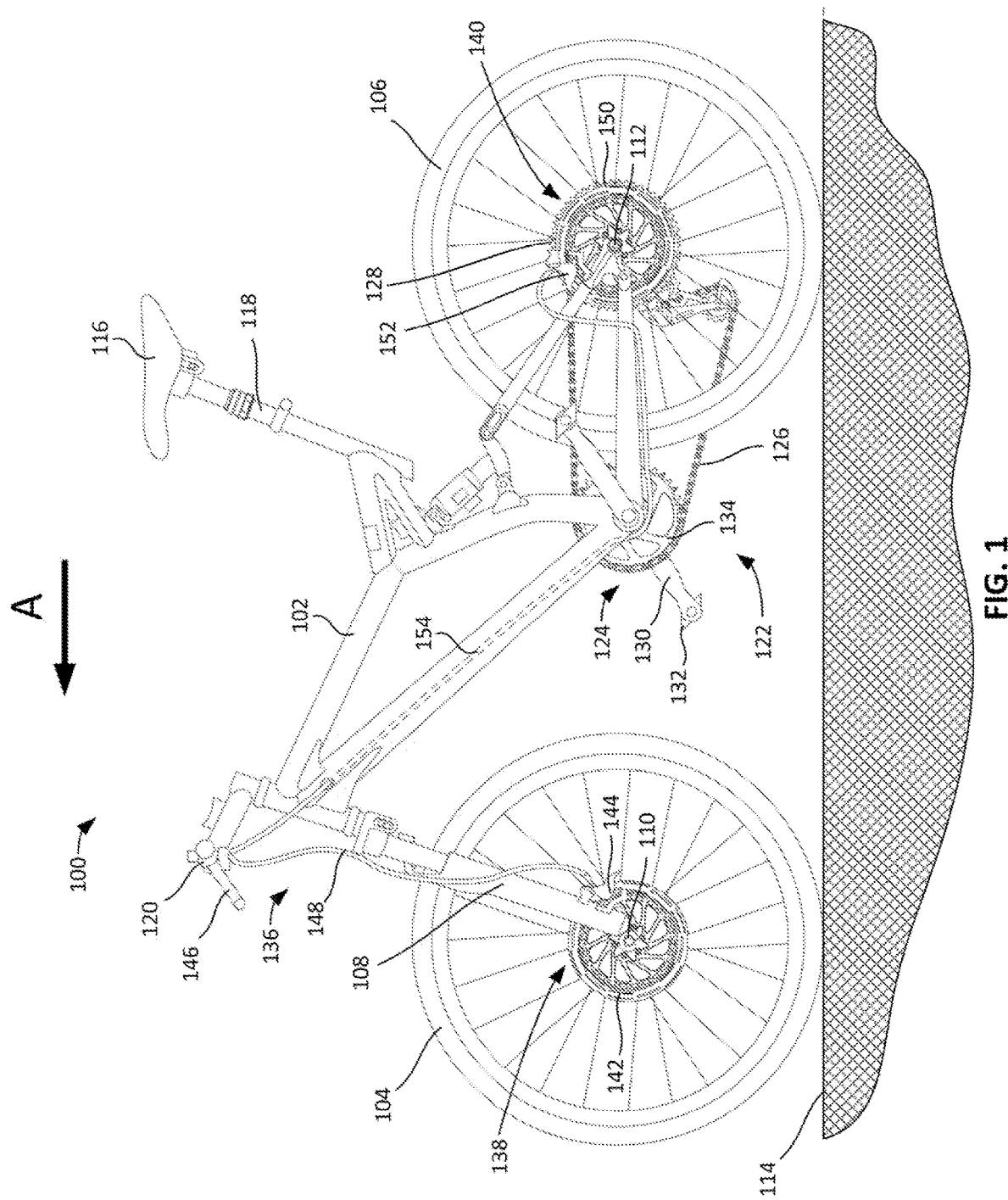
FIG. 1 is a side view of an example bicycle that may employ any of the example brake rotors, hub assemblies, and/or other components disclosed herein.

Descriptors "first," "second," "third," etc. are used herein when identifying multiple elements or components that may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Brakes on modern bicycles (including electric bicycles (e-bikes)) have evolved to utilize technology from automotive braking systems, such as disc brakes. Disc brakes have greater stopping power and deceleration control than traditional rim and cable pull brakes used in the past. The front and/or rear brakes on a bicycle may be implemented as disc brakes.

A disc brake includes a brake rotor and a brake caliper. The brake rotor is typically coupled to and rotates with a hub on a wheel of the bicycle. The brake caliper is mounted to a stationary part of the bicycle near the brake rotor. When the brake caliper is actuated, the brake caliper moves two brake pads into engagement with the outer surface(s) of the brake rotor. The friction between the brake pads and the brake rotor causes the brake rotor to slow, thereby reducing the speed of the wheel and, thus, the bicycle.

When not braking, it is undesired for the brake rotor to contact the brake pads as this generates wasteful rolling friction that slows the bicycle and causes unnecessary wear on the brake rotor and brake pads. This contact may also cause undesirable noise (e.g., brake squeaking). Current disc brake assembly requires a painstaking adjustment process to ensure the brake rotor is centered between the brake pads to avoid non-braking contact. Often, the brake rotor needs multiple shims or spacers to aid in this centering adjustment.

Also, as the brake pads wear over time, the pistons of the brake caliper automatically self-advance to make up for the worn pad material. However, self-advancing pistons seldom advance the same from one side to the other. As such, the brake pads engage the sides of the brake rotor at different times and/or with different forces. This leads to unbalanced braking forces, undesired brake rub, and uneven pad wear. Typically the brake rotor needs to be adjusted to re-center the brake rotor between the brake pads, and the cycle repeats.

As used herein, the terms "axial," "axially" and other variations thereof mean a direction that that coincides with or is parallel to a rotational axis, which may be defined by a brake rotor and/or a hub. The terms "radial," "radially," and other variations thereof mean a direction that extends orthogonally from the rotational axis, and which can include a radially inward direction that is toward the rotational axis or a radially outward direction that is away from the rotational axis. The terms "circumferential," "circumferentially," and other variations thereof mean a direction that extends concentrically around the rotational axis.

Disclosed herein are example self-centering or floating brake rotors that address at least the drawbacks noted above. The example brake rotors disclosed herein are movable in the axial direction, which allows the brake rotor to find its center position between the brake pads each time the brake pads are applied. When the brake pads retract, the brake rotor maintains its centered position without the need for a spring or biasing device. The example brake rotors disclosed herein are axially movable a sufficient amount to account for brake assembly dimensional variances and brake pad wear. Therefore, as the brake pads wear over time, the brake rotor readjusts itself to a new center position. This reduces or eliminates the need to finely adjust the location of the brake rotor when initially installing the brake rotor and over time as required with traditional brake rotors. The example brake rotors disclosed herein also reduce or eliminate unbalanced braking forces and unnecessary brake rub, thereby improving braking performance and prolonging the life cycle of the brake components. While the example brake rotors may be movable in the axial direction, the example brake rotors are constrained in the radial and circumferential directions, which ensures the braking surfaces of the brake rotor remain radially aligned with the brake pads and that braking loads are transferred to the hub. Therefore, the example brake rotors disclosed herein benefit from being radially and circumferentially aligned with the brake pads, but movable in the axial direction to ensure the brake rotor remains centered between the brake pads. In some examples disclosed herein, only a portion of the brake rotor is axially movable, such as the brake track. In other examples disclosed herein, the entire brake rotor is axially movable on the hub. The axial movement disclosed herein may be considered unbiased friction sliding, meaning no spring bias but some frictional resistance.

An example brake rotor disclosed herein includes a carrier that attaches to a hub of the bicycle and a brake track that is disposed radially outward of the carrier and coupled to the carrier. The carrier has a set of radially extending arms that have end portions. The arms have end portions are disposed in notches formed on an inner peripheral edge of the brake track. The brake track is axially slidable on the end portions and, thus, axially movable relative to the carrier. The carrier is wider than the brake track. As such, the brake track can slide axially on the carrier without extending beyond the sides of the carrier. The end portions have a unique shape or profile that matches the shape of the notches. For example, the end portions may be keyed and/or dovetailed to the track. This shape enables the brake track to move axially relative to the carrier, but constrains or restricts movement of the brake track in the radial and circumferential directions relative to the carrier.

The sliding interface between the brake track and the carrier creates a friction force, which is the result of a coefficient of friction between the two bodies. The friction force is an amount such that the brake track can move (e.g., slide) axially on the carrier when engaged by the brake pads to re-center itself, but when the brake pads are released, the brake track remains in substantially the same axial position on the carrier. In other words, when the brake pads are applied, the net force (if unbalanced) of the brake pads exceeds the frictional force and moves the brake track axially until the friction exceeds the net force, thereby centering the brake track between the brake pads. When the pads are retracted and no braking force is applied, the frictional force is sufficient to hold the brake track in the same axial position, so the brake track remains centered until the brake pads are applied again. Thus, the brake track is axially movable without any springs or bias devices.

In some examples disclosed herein, the brake track is unconstrained in the axial direction. As such, the brake track can be completely removed from the carrier by sliding the brake track axially relative to the carrier. However, when installed on the bicycle, the brake pads may prevent the brake track from moving axially beyond a certain amount. In some examples, the brake track is axially movable on the carrier at least the full range or distance between the brake pads in their open position. In other words, when the brake pads are in their retracted or open state, the brake rotor can move axially to any position between the two brake pads. In some examples, the range of axial movement is even greater than the original distance between the brake pads, so that when the brake pads wear and their distance increases, the brake rotor is movable through the complete distance between the brake pads.

In some examples disclosed herein, the brake rotor includes one or more stops that limit the axial movement in one or both axial directions beyond a certain amount. The stop(s) can be coupled to the brake track, the carrier, and/or another structure adjacent the brake rotor. For example, in some example brake rotors disclosed herein, one or more pins are disposed in openings formed in the brake rotor. Each pin has a head (a first stop) on one side of the brake rotor and a clip (a second stop) on the opposite side of the brake rotor. The head and the pin overlap with the brake track in the axial direction, thereby limiting axial movement of the brake track and defining the outer boundaries of the axial movement.

In some examples disclosed herein, a brake rotor includes one or more positioning portions with thermal dissipation elements (e.g., cooling fins) that are coupled to a side of the brake track. The positioning portions help dissipate heat from the brake track. The positioning portions may be constructed of aluminum, for example. The end portions of the arms of the carrier are disposed in notches formed in the positioning portions. The end portions the arms have tabs that extend upward. The tabs act as a first stop when the brake track is moved a certain amount in a first axial direction, and the positioning portions act as a second stop when the brake track is moved a certain amount in a second axial direction.

The brake track can be designed to be axially movable any amount. The distance of allowable axial movement is greater than a mere tolerance from a rigid connection as seen in known brake rotors. In some examples, the brake track is movable in the axial direction relative to the carrier at least a distance of 0.1 millimeters (mm) (or ±0.05 mm from a center position). In some examples, the brake rotor is designed to allow a certain axial movement based on a factor of the thickness of the brake track. For example, the brake track may be movable in the axial direction at least 0.1× the thickness of the brake track. For instance, if the brake track is 1.5 mm thick, the brake track may be movable at least 0.15 mm in the axial direction. In other examples, more alignment range may be desired and the brake rotor is designed such that the brake track is movable more or less than 0.1 mm or 0.1× the thickness of the brake track. For example, the brake track may be movable at least 3 mm (or ±1.5 mm from a center position). As another example, the brake track may be movable a distance that is at least 150% the thickness of the brake track (or ±75% the thickness of the brake track from a center position). In some examples disclosed herein, the brake track is movable within a center range, which is the distance or range between two axial limits. The center range can be any distance that is greater than the thickness of the brake track, which ensures the brake track can move axially relative to the carrier. In some examples, the brake rotor can be configured to have center range that is a specific factor of the brake track thickness, such as 1.1× the thickness of the brake track, 1.2× the thickness of the brake track, 1.3× the thickness of the brake track, etc. In some examples, the center range is the same as the thickness of the portion of the carrier on which the brake track slides. In some examples, the center range is greater than a single brake pad wear range.

In some examples disclosed herein, a brake rotor may be axially movable on a hub. For example, disclosed herein is a hub assembly including a hub and a brake rotor. The hub has a first spline interface and a carrier of the brake rotor has a central opening defined by a second spline interface. The brake rotor is disposed on the hub with the hub extending through the central opening, such that the second spline interface of the carrier is engaged (e.g., meshed) with the first spline interface of the hub. In some examples, the first spline interface can be wider or deeper than the second spline interface. This enables the carrier (and, thus, the brake rotor) to slide axially on the hub for self-centering. In some examples, the brake rotor is unconstrained in the axial direction. In other examples, the hub assembly may include one or more stops to limit axial movement of the brake rotor to a certain amount.

Turning now to the figures, FIG. 1 illustrates one example of a human powered vehicle on which the example brake rotors and associated components disclosed herein may be implemented. In this example, the vehicle is one possible type of bicycle 100, such as a mountain bicycle. In the illustrated example, the bicycle 100 includes a frame 102 and a front wheel 104 and a rear wheel 106 rotatably coupled to the frame 102. In the illustrated example, the front wheel 104 is coupled to the front end of the frame 102 via a front fork 108. In some examples, the front fork 108 includes one or more suspension components (e.g., a shock absorber) to absorb shocks or vibrations. The front wheel 104 is rotatably coupled to the front fork 108 via a front hub 110. The rear wheel 106 is coupled to the frame 102 to support the rear end of the frame 102. The rear wheel 106 is rotatably coupled to the frame 102 via a rear hub 112. In some examples, one or more suspension components may be coupled between the rear wheel 106 and the frame 102 to absorb shocks or vibrations. A front and/or forward riding direction or orientation of the bicycle 100 is indicated by the direction of the arrow A in FIG. 1. As such, a forward direction of movement for the bicycle 100 is indicated by the direction of the arrow A. The bicycle 100 is shown as riding on a riding surface 114. The riding surface 114 may be any riding surface such as the ground (e.g., a dirt path, a sidewalk, a street, etc.), a man-made structure above the ground (e.g., a wooden ramp), and/or any other surface.

In the illustrated example, the bicycle 100 includes a seat 116 coupled to the frame 102 (e.g., near the rear end of the frame 102 relative to the forward direction A) via a seat post 118. The bicycle 100 also includes handlebars 120 coupled to the frame 102 and the front fork 108 (e.g., near a forward end of the frame 102 relative to the forward direction A) for steering the bicycle 100. In the illustrated example, the bicycle 100 has a drivetrain 122 that includes a crank assembly 124. The crank assembly 124 is operatively coupled via a chain 126 to a sprocket assembly 128. The sprocket assembly 128 is mounted to the rear hub 112. The crank assembly 124 includes at least one, and typically two, crank arms 130 and pedals 132, along with at least one front sprocket, or chainring 134. The example bicycle 100 may include a rear gear change device (e.g., a derailleur) and/or a front gear change device to move the chain 126 through different sprockets.

The example bicycle 100 of FIG. 1 includes an example brake system 136. The example brake system 136 may be used to reduce the speed of the bicycle 100. The example brake system 136 includes a front brake 138 for slowing the rotation of the front wheel 104 and a rear brake 140 for slowing the rotation of the rear wheel 106. In this example, the front and rear brakes 138, 140 are implemented as hydraulic disc brakes. The front brake 138 includes a front brake rotor 142 (sometimes referred to as a brake disc) and a front brake caliper 144. The front brake rotor 142 is coupled to and rotates with the front wheel 104 on the front hub 110. The front brake caliper 144 is coupled to the front fork 108 adjacent the front brake rotor 142. When the front brake caliper 144 is actuated, the front brake caliper 144 moves one or more brake pads into engagement with the front brake rotor 142 to slow the front brake rotor 142 and, thus, slow the rotation of the front wheel 104. In the illustrated example, the brake system 136 includes a front brake actuator 146 (e.g., a lever) that is used to actuate the front brake caliper 144. The front brake actuator 146 is coupled to the handlebars 120. The front brake actuator 146 is fluidly coupled to the front brake caliper 144 via a first fluid line 148. In this example, the front brake actuator 146 is actuated by moving the front brake actuator 146 toward the grip on the handlebars 120. This actuation causes brake fluid to be pushed to the front brake caliper 144 to provide braking pressure on the front brake rotor 142. Conversely, the front brake actuator 146 is de-actuated by releasing or otherwise moving the front brake actuator 146 away from the grip, which relieves or reduces the braking pressure to the front brake caliper 144.

Similarly, the rear brake 140 includes a rear brake rotor 150 and a rear brake caliper 152. The rear brake rotor 150 is coupled to and rotates with the rear wheel 106 via the rear hub 112. When the rear brake caliper 152 is actuated, the rear brake caliper 152 moves one or more brake pads into engagement with the rear brake rotor 150 to slow the rear brake rotor 150 and, thus, slow the rotation of the rear wheel 106. Similar to the front brake actuator 146, the brake system 136 includes a rear brake actuator (not shown) that is coupled to the handlebars 120 and used to actuate the rear brake caliper 152. The rear brake lever is fluidly coupled to the rear brake caliper 152 via a second fluid line 154. The rear brake actuator and the rear brake caliper 152 operate similar to the front brake actuator 146 and the front brake caliper 144.

While in this example the front and rear brakes 138, 140 are hydraulically actuated, in other examples, the front and/or rear brakes 138, 140 may be cable actuated. For example, the front brake actuator 146 may be coupled to the front brake caliper 144 via a cable. When the front brake actuator 146 is moved toward the handlebars 120, the cable is pulled to actuate the front brake caliper 144. In the illustrated, the front and rear brake rotors 142, 150 are disposed on the left side of the front and rear wheels 104, 106 (when facing the direction A). In other examples, the front and/or rear brake rotors 142, 150 may be disposed on the right side of the front and rear wheels 104, 106, respectively.

While the example bicycle 100 depicted in FIG. 1 is a type of mountain bicycle, the example brake rotors and associated components disclosed herein can be implemented on other types of bicycles. For example, the disclosed brake rotors may be used on road bicycles, as well as bicycles with mechanical (e.g., cable, hydraulic, pneumatic, etc.) and non-mechanical (e.g., wired, wireless) drive systems. The disclosed brake rotors may also be implemented on other types of two-, three-, and four-wheeled human powered vehicles. Further, the example brake rotors can be used on other types of vehicles, such as motorized vehicles (e.g., a motorcycle, a car, a truck, etc.). The example brake rotors disclosed herein can be used with any road or trail conditions (e.g., hot, cold, wet, muddy, snowy, etc.).

Figure 2B:
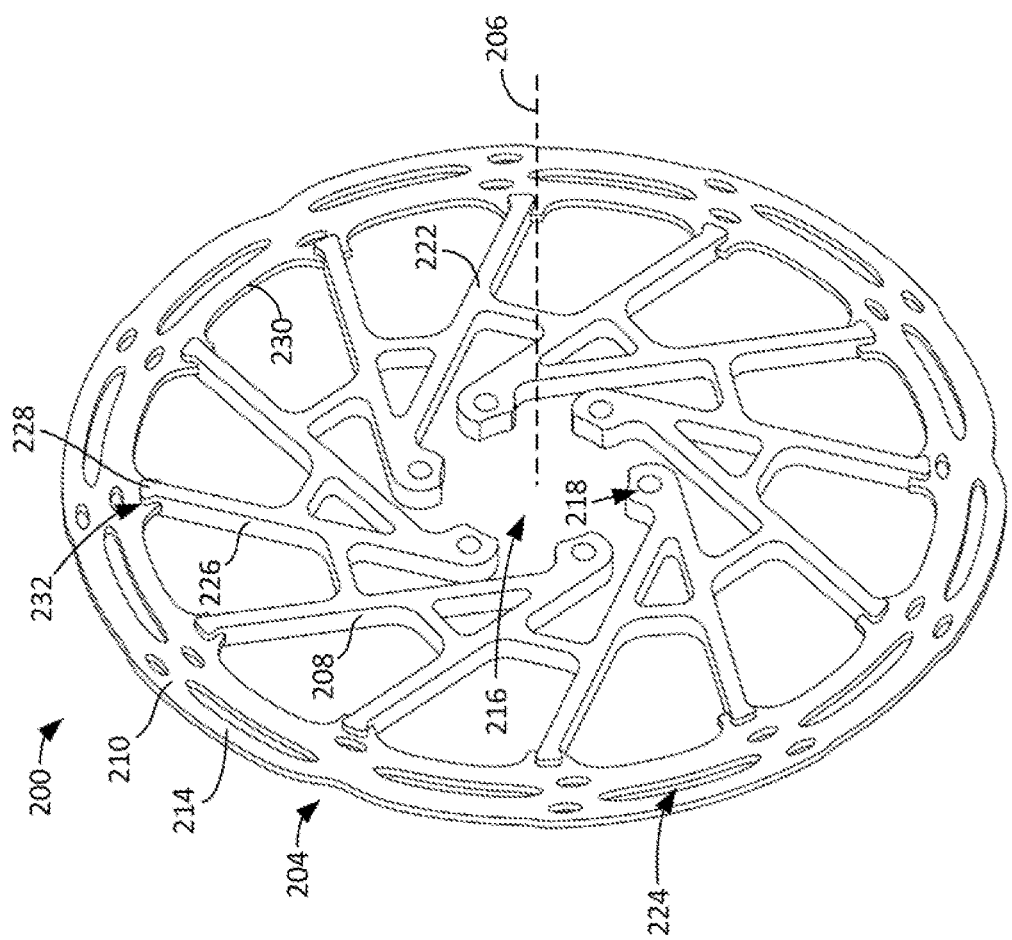
FIGS. 2A and 2B are perspective views of opposite sides of an example brake rotor constructed in accordance with the teachings of this disclosure.
Figure 2A:
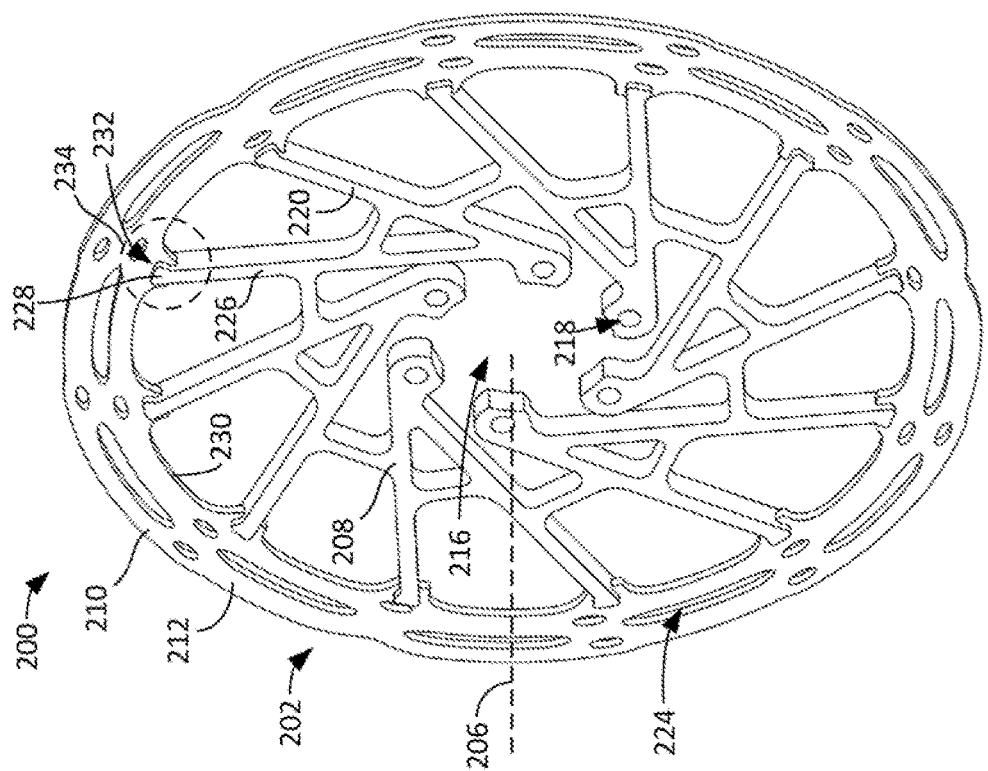

FIGS. 2A and 2B illustrate an example brake rotor 200 constructed in accordance with the teachings of this disclosure. The example brake rotor 200 can be implemented on the bicycle 100 of FIG. 1, for example, as the front brake rotor 142 and/or the rear brake rotor 150. FIG. 2A is a perspective view of a first side 202 of the brake rotor 200 and FIG. 2B is a perspective view of a second side 204 of the brake rotor 200 opposite the first side 202. The brake rotor 200 has a central axis 206 that forms the rotational axis about which the brake rotor 200 rotates. This rotational axis defines a coordinate reference for the axial, radial, and circumferential directions referenced herein.

As illustrated in FIGS. 2A and 2B, the brake rotor 200 includes a carrier 208 (sometimes referred to as a spider, a core, or a hub mounting portion) and a brake track 210. The brake track 210 is disposed radially outward of the carrier 208. The brake track 210 is coupled (e.g., movably or slidably coupled) to the carrier 208, as disclosed in further detail herein. The brake track 206 has braking surfaces that are to be engaged by one or more brake pads. In particular, the brake track 210 has a first side 212 and a second side 214 opposite the first side 212. The first and second sides 212, 214 form braking surfaces that may be engaged by brake pads to slow the rotation of the brake rotor 200. The brake track 210 may be constructed of an abrasive, wear-resistant material. The brake track 210 be constructed (e.g., machined, stamped, extruded, etc.) of a single monolithic part or may be constructed of multiple parts or components coupled together.

The carrier 208 acts an intermediate structure to attach the brake track 210 to a hub of a bicycle, such as the front hub 110 or the rear hub 112 of the bicycle 100 of FIG. 1. In particular, the carrier 208 has an outer attachment section (examples of which are disclosed in further detail herein) to attach to the brake track 210 and an inner attachment portion to attach to the hub. In this example, the carrier 208 has a central opening 216 to receive the hub and a plurality of fastener openings 218 (one of which is referenced in FIGS. 2A and 2B) to receive fasteners (e.g., bolts, screws, rivets, etc.) for coupling the brake rotor 200 to the hub. The carrier 208 may include any number of fastener openings 218 to match the corresponding fastener arrangement on the hub. The central opening 216 and the fastener openings 218 form the hub interface of the carrier 208. When the carrier 208 is attached to the hub, the carrier 208 may be constrained axially, radially, and circumferentially. The carrier 208 has a first side 220 and a second side 222 opposite the first side 220. The carrier 208 can be constructed (e.g., machined, stamped, extruded, etc.) of a single monolithic part or may be constructed of multiple parts or components coupled together.

In some examples, the brake track 210 is constructed of stainless steel. Stainless steel may be desirable for being highly wear resistant. In some examples, the brake track 210 is constructed of martensitic stainless steel. For example, the brake track 210 may be constructed of 300 series or 400 series stainless steel. In other examples, the brake track 210 can be constructed of other types of stainless steel and/or other materials (e.g., austenitic stainless steel, a steel alloy, ceramic, ceramic matrix alloy, iron, carbon fiber, silicon carbide alloy, carbon/carbon, etc.). As shown in FIGS. 2A and 2B, the brake track 210 may include a plurality of openings 224 (one of which is referenced in FIGS. 2A and 2B) to improve airflow and dissipate heat. In some examples, the carrier 208 is constructed of aluminum, such as 6000 series or 7000 series aluminum. Aluminum is typically lighter than stainless steel, which helps reduce the total weight of the brake rotor 200. In other examples, the carrier 208 may be constructed of other types of aluminum and/or other materials (e.g., an aluminum alloy, a metal matrix aluminum, copper, beryllium, stainless steel (such as martensitic and/or austenitic steel), a steel alloy, ceramic, ceramic matrix alloy, iron, carbon fiber, silicon carbide alloy, carbon/carbon, etc.).

In this example, the brake track 210 is coupled to the carrier 208 such that the brake track 210 is axially movable relative to the carrier 208 while being radially and circumferentially constrained relative to the carrier 208. In other words, the brake track 210 is movable or slidable in the axial direction relative to the carrier 208, but is restricted from moving in the radial and circumferential directions relative to the carrier 208. This allows the brake track 210 to self-center during braking operations, while still remaining radially aligned with the brake pads. In this example, an axial direction is a direction that is coincident with or parallel to the center axis 206, a radial direction is a direction that is orthogonal to the center axis 206, and a circumferential direction is a direction that extends concentrically around the center axis 206.

As shown in FIGS. 2A and 2B, the carrier 208 includes a set of arms 226 (one of which is referenced in FIGS. 2A and 2B). The arms 226 may also be referred to as support members, limbs, or extensions. In the illustrated example, the carrier 208 has twelve arms 226. However, in other examples, the carrier 208 may have more or fewer arms. The arms 226 extend generally radially outward from the center of the brake rotor 200. The outer radial ends of the arms 226 are spaced equidistant from each other. In this example, the arms 226 are also angled or curved (relative to the radial direction) to allow for thermal expansion to avoid brake surface warping.

In the illustrated example, each of the arms 226 has an end section or portion 228 (e.g. a distal end portion). The brake track 210 is coupled (e.g., movably coupled) to the end portions 228 of the arms 226 and, thus, to the carrier 208. The brake track 210 has an inner peripheral edge 230 that forms or otherwise includes a set of notches 232 (one of which is referenced in FIGS. 2A and 2B). The notches 232 may be referred to as keyed openings or slots. The end portions 228 of the arms 226 are disposed within the respective ones of the notches 232.

Figure 3:
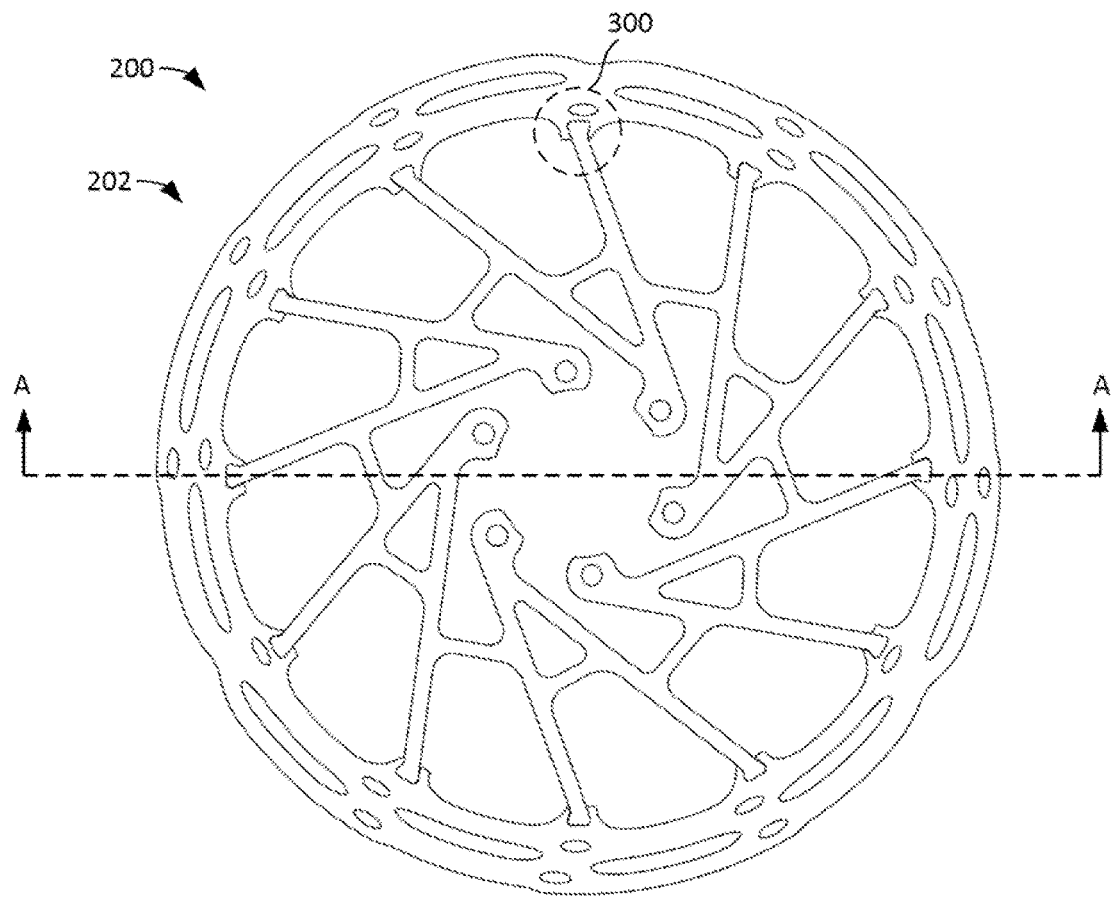
FIG. 3 is a side view of the example brake rotor of FIGS. 2A and 2B.
Figure 4:
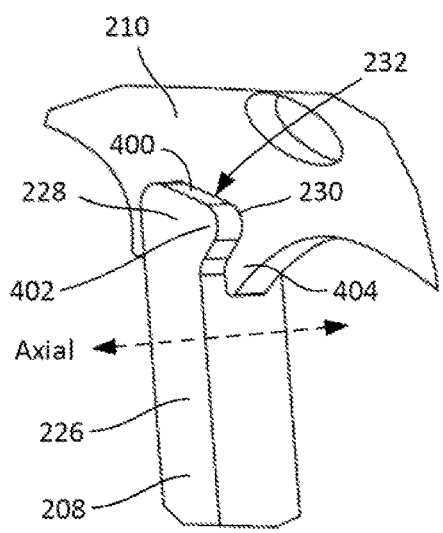
FIG. 4 is an enlarged view of the callout in FIG. 2A.
Figure 5:
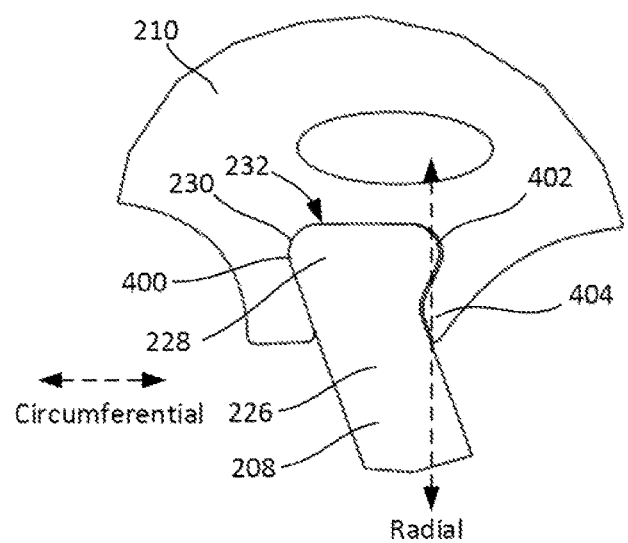
FIG. 5 is an enlarged view of the callout in FIG. 3.

FIG. 3 is a side view showing the first side 202 of the brake rotor 200. FIG. 4 is an enlarged view of the callout 234 from FIG. 2A, and FIG. 5 is an enlarged view of the callout 300 from FIG. 3. FIGS. 4 and 5 show enlarged views of the interface between one of the arms 226 of the carrier 208 and one of the notches 232 in the brake track 210. The other arms 226 and notches 232 (shown in FIGS. 2A and 2B) are identical to the arm 226 and the notch 232 shown in FIGS. 4 and 5. Thus, any of the aspects disclosed in connection with the arm 226 and the notch 232 shown in FIGS. 4 and 5 can likewise apply to the other arms 226 and notches 232. As can be seen in FIG. 4, the carrier 208 has a greater thickness than the brake track 210. As such, the brake track 210 can move or slide in the axial direction relative to the carrier 208 without extending beyond the sides of the carrier 208. As shown in FIGS. 4 and 5, the end portion 228 of the arm 226 is disposed in the notch 232 in the brake track 210. The end portion 228 is to slide in the notch 232 when the brake track 210 moves axially relative to the carrier 208. In this example, the inner peripheral edge 230 of the brake track 210 along the notch 232 is slidably engaged with an outer peripheral edge 400 of the end portion 228. These surfaces form a sliding interface as the brake track 210 moves axially relative to the carrier 208.

The example brake rotor 200 has one or more radial retaining features that restrict the brake track 210 from moving radially relative to the carrier 208, but still enable the brake track to move axially relative to the carrier. In this example, the radial retaining features are implemented by the shape of the end portions 228 of the arms 226. For example, as shown in FIGS. 4 and 5, the end portion 228 of the arm 226 has a protrusion 402 (e.g., an overhang or bulge) extending in the circumferential direction. As such, the end portion 228 has a shape or profile that increases circumferentially toward the end of the arm 226. The notch 232 has a shape that corresponds to or matches the shape of the end portion 228 of the arm 226. As shown in FIGS. 4 and 5, the brake track 210 has a lip 404. The notch 232 is at least partially defined by the lip 404. The lip 404 overlaps with the protrusion 402 in the radial direction. For example, FIG. 5 shows a radial line extending from the center axis 206 (FIGS. 2A and 2B) of the brake rotor 200. As shown, the lip 404 is disposed radially inward relative to the protrusion, which radially constrains the brake track 210 relative to the carrier 208. In other words, this prevents the brake track 210 from moving radially (outward) relative to the carrier 208. The brake track 210 is also constrained from moving radially inward by the arm 226. The arm 226 also constrains the brake track 210 from moving circumferentially relative to the carrier 208. Thus, the brake track 210 is constrained in the radial and circumferential directions. This helps ensure the brake track 210 remains radially aligned with the brake pads. As such, the end portions 228 of the arms 226 are implemented as retaining features. However, in other examples, such retaining features can be implemented on other sections of the carrier 208 that is not on the ends of the arms 226.

In the illustrated example, the end portion 228 of the arm 226 is asymmetrical. However, in other examples, the end portion 228 of the arm 226 may be symmetrical. For example, a second protrusion may extend in the opposite circumferential direction as the protrusion 402. In other examples, the end portion 228 may have a different shape, such as a rectilinear shape, a hexagonal shape, a star shape, a circular shape, a spline, etc. While in some examples each of the end portions 228 has the same shape, in other examples, the end portions 228 can have different shapes than each other.

As disclosed above, each of the other arms 226 and the corresponding notches 232 are identical to the arm 226 and the notch 232 shown in FIGS. 4 and 5. The brake rotor 200 may be assembled, for example, by sliding the brake track 210 onto the carrier 208 in the axial direction. For example, the brake track 210 can be placed axially adjacent the carrier 208 with the ends portions 228 of the arms 226 aligned with the notches 232. Then the brake track 210 can be moved axially relative to the carrier 208 (or vice versa) such that the end portions 228 of the arms 226 are inserted into the corresponding notches 232.

The end portions 228 and the notches 232 are dimensioned such that contact surfaces of the brake track 210 and the carrier 208 (i.e., the outer peripheral edges 400 of the end portions 228 and the inner peripheral edge 230 of the notches 232) slidably engage and create a friction fit between the brake track 210 and the carrier 208. The resulting friction force between the surfaces is an amount that enables the brake track 210 to slide axially on the carrier 208 when engaged with a sufficient force (e.g., 1 newton) by the brake pads, but when the brake pads are released, the friction force is sufficient to hold the brake track 210 in substantially the same axial position on the carrier 208.

In this example, the sliding surfaces that form the sliding engagement interface that enable the brake track 210 to self-center are radially outward from the hub attachment section of the carrier 208. In particular, the carrier 208 is to be coupled to the hub, and the brake track 210, which is disposed radially outward of the carrier 208, is movable relative to the carrier 208. However, in other examples, the sliding engagement interface that allows for axial movement may be formed at the hub interface. An example of such a configuration is disclosed in further detail in conjunction with FIGS. 46-49.

Figure 6:
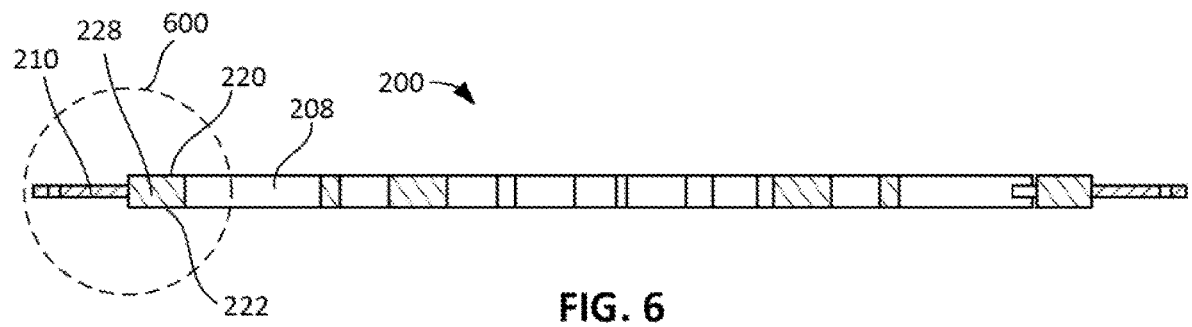
FIG. 6 is a cross-sectional view of the example brake rotor of FIGS. 2A and 2B taken along line A-A in FIG. 3.

FIG. 6 is a cross-sectional view of the example brake rotor 200 taken along line A-A of FIG. 3. The brake track 210 is disposed radially outward of the carrier 208. In particular, the brake track 210 is positioned axially between the first and second sides 220, 222 of the carrier 208 (e.g., between the first and second sides 220, 222 at the end portions 228 of the carrier 208).

Figure 7A:
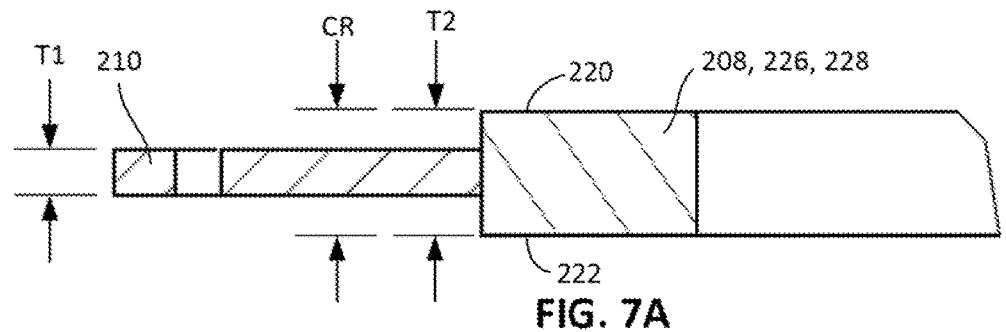
FIGS. 7A, 7B, and 7C are enlarged views of the callout in FIG. 6 showing an example brake track moved axially to three different positions.
Figure 7B:
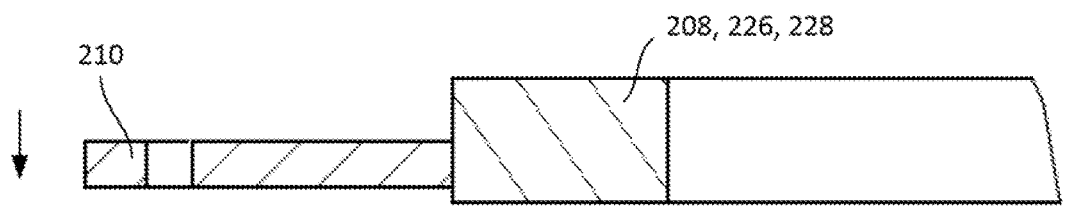
Figure 7C:
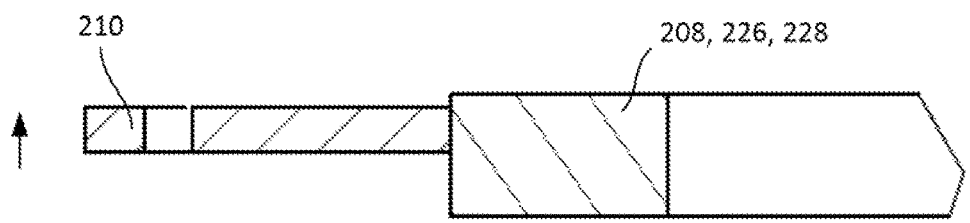

FIGS. 7A, 7B, and 7C are enlarged views of the callout 600 in FIG. 6 showing the brake track 210 in three different axial positions. FIG. 7A shows the brake track 210 in a center position in which the brake track 210 is substantially axially centered on the carrier 208. The brake track 210 is movable (e.g., slidable) in the axial direction relative to the carrier 208. For example, FIG. 7B shows the brake track 210 moved in one axial direction (e.g., inboard) to a first position (e.g., a first limit position), and FIG. 7C shows the brake track 210 moved in the opposite axial direction (e.g., outboard) to a second position (e.g., a second limit position).

As shown in FIG. 7A, the brake track 210 has a thickness T1 and the carrier 208 (e.g., the end portion 228 of the arm 226) has a thickness T2 that is greater than the thickness T1 of the brake track 210. As such, the brake track 210 can move axially relative to the carrier 208 without extending beyond the first and second sides 220, 222 of the carrier 208, which, in some examples, can be undesirable for transferring braking loads from the brake track 210 to the carrier 208. The thickness T1 of the brake track 210 can be any thickness. In some examples, the thickness T1 of the brake track 210 is about 1.85 mm (e.g., ±0.05 mm). In other examples, the thickness T1 of the brake track 210 may be greater than or less than 1.85 mm.

In some examples, the brake track 210 is movable (e.g., slidable) in the axial direction relative to the carrier 208 at least a distance of 0.1 millimeters (mm) (or ±0.05 mm from the center position in FIG. 7A). In some examples, the brake track 210 is axially movable a certain amount based on a factor of the thickness T1 of the brake track 210. For example, the brake track 210 may be movable in the axial direction at least 0.1× the thickness T1 of the brake track 210. For instance, if the brake track 210 has a thickness T1 of 1.85 mm, the brake track 210 may be movable at least 0.185 mm in the axial direction (or ±0.0925 mm from the center position in FIG. 7A). In other examples, the brake track 210 is movable more or less than 0.1 mm or 0.1× the thickness T1 of the brake track 210. In some examples, the brake track 210 is axially movable at least 3 mm (or ±1.5 mm from the center position in FIG. 7A). As another example, the brake track 210 may be axially movable a distance that is at least 150% of the thickness T1 of the brake track 210 (or ±75% the thickness T1 of the brake track 210 from the center position in FIG. 7A).

In some examples, the brake track 210 is movable within a center range CR, which defines the limits of axial movement. The brake track 210 can be positioned anywhere within the center range CR. In some examples, the center range CR can be any amount that is greater than the thickness T1 of the brake track 210. In some examples, the center range CR is configured to be a factor that is greater than the thickness T1 of the brake track 210, such as 1.1× the thickness T1 of the brake track 210, 1.2× the thickness T1 of the brake track 210, 1.3× the thickness T1 of the brake track 210, etc. For example, if the brake track 210 has a thickness T1 of 1.85 mm, then the center range CR can be any distance greater than 1.85 mm, thereby enabling the brake track 210 to move axially within the center range CR. For example, the center range CR may be 4.85 mm. The allowable axial movement of the brake track 210 is the center range CR minus the thickness T1 of the brake track 210. Therefore, in this example, the brake track 210 can move a total distance of 3 mm (or ±1.5 mm from the center position). As another example, assume the brake track 210 has a thickness T1 of 2 mm. In such an example, the center range CR may be 6 mm, which allows the brake track 210 to move 4 mm (or ±2 mm from the center position). In some examples, such as shown in FIG. 7A, the center range CR is the same as the thickness T2 of the carrier 208. In other words, the first and second sides 220, 222 of the carrier 208 may define the limits or boundaries of the allowable movement. This allows for the maximum range of movement without extending beyond the carrier 208. However, in other examples, the center range CR may be greater than or less than the thickness T2 of the carrier 208. For example, the thickness T2 of the carrier 208 may be 6 mm while the center range CR is 5.8 mm (inset 0.1 mm from each side of the carrier 208).

In this example, the brake rotor 200 does not include any stops to limit axial movement of the brake track 210 relative to the carrier 208. Therefore, the brake track 210 could be moved off of the carrier 208 in the axial direction. However, when installed on a bicycle with a brake caliper, the brake pads of the brake caliper may limit the axial movement of the brake track 210 and, thus, define the center range CR. For instance, when the brake pads are in their open position, the brake pads prevent the brake track 210 from moving too far in either axial direction. An example of this is discussed below.

Figure 8:
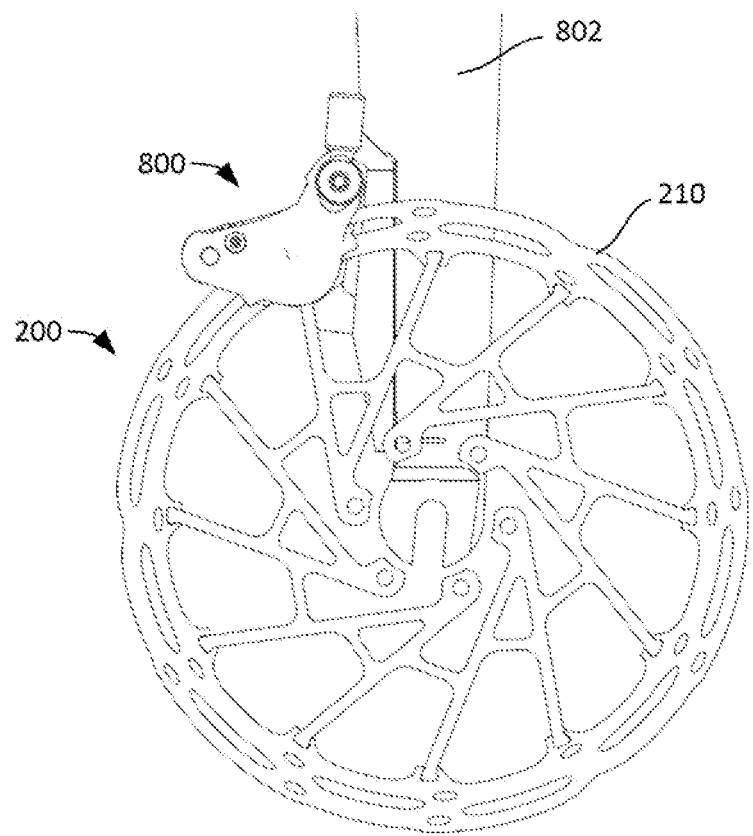
FIG. 8 is a side view of the example brake rotor of FIGS. 2A and 2B and an example brake caliper.

FIG. 8 shows the example brake rotor 200 used with an example brake caliper 800. The brake caliper 800 is mounted on a frame 802 of a bicycle. The caliper 800 may correspond of the front brake caliper 144 or the rear brake caliper 152 on the bicycle 100 of FIG. 1, for example. The brake track 210 extends into the brake caliper 800.

Figure 9:
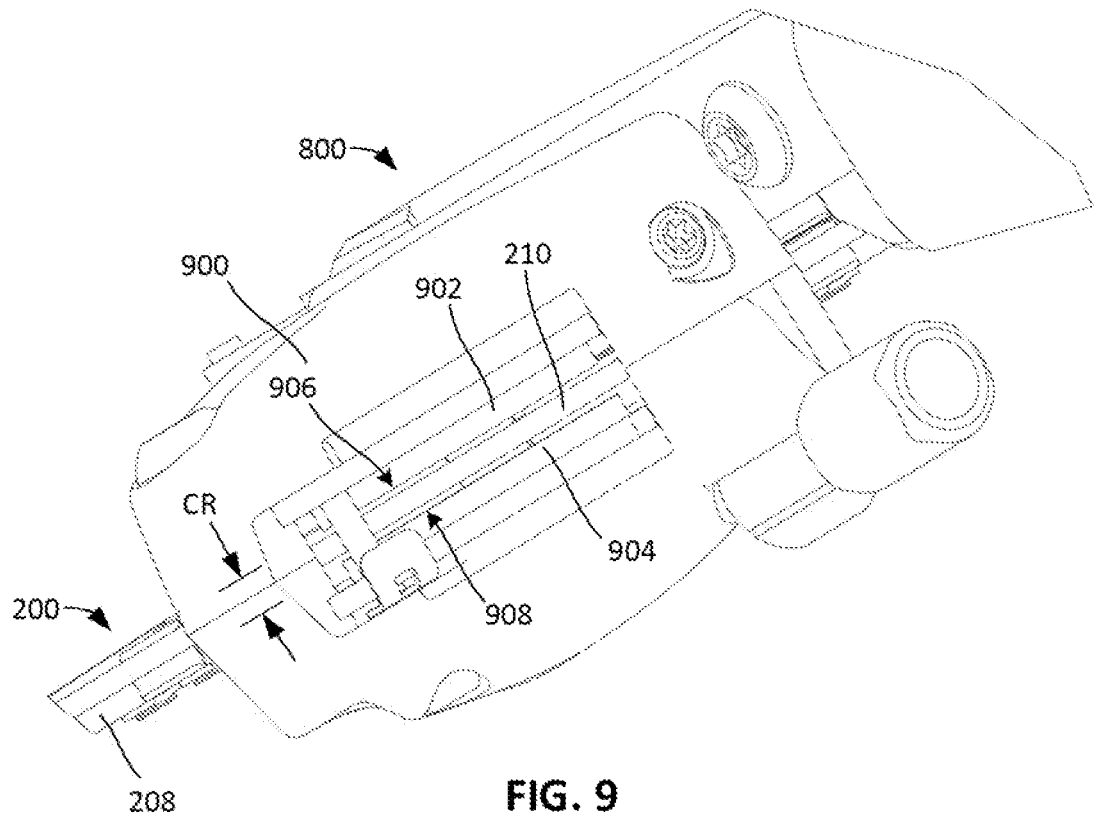
FIG. 9 is an end view of the example brake rotor and the example brake caliper of FIG. 8.

FIG. 9 is a top or end view of the caliper 800 showing the brake rotor 200 within the caliper 800. The caliper 800 has a body 900 (e.g., a housing) and first and second brake pads 902, 904 that are movable relative to the body 900. The first and second brake pads 902, 904 are disposed on opposite sides of the brake track 210. In FIG. 9, the brake pads 902, 904 are in their fully open or retracted position. When the brake caliper 800 is activated (e.g., via hydraulic and/or mechanical actuation), the brake pads 902, 904 are moved toward each other and engage opposite sides of the brake track 210, thereby clamping the brake rotor 200 between the brake pads 902, 904. The frictional engagement between the brake pads 902, 904 and the sides of the brake track 210 slows the rotation of the brake track 210 and, thus, slows the rotation of the associated wheel. When braking force is released, the brake pads 902, 904 retract or move outward away from the brake track 210 to their fully open position.

As shown in FIG. 9, when the brake pads 902, 904 are fully retracted, the first brake pad 902 is spaced from the brake track 210 by a first gap 906, and the second brake pad 904 is separated from the brake track 210 by a second gap 908. Generally, it is desired to have the brake track 210 centered between the brake pads 902, 904, so that when the brake is applied, the brake pads 902, 904 come into contact with the sides of the brake track 210 at substantially the same time and apply substantially the same force. However, over time, the brake pads 902, 904 and/or the sides of the brake track 210 may wear at different rates. As such, the size of the gaps 906, 908 may change over time. With known brake rotors, this results in uneven braking force because one of the brake pads 902, 904 engages the brake track prior to the other brake pad 902, 904. As disclosed herein, the brake track 210 of the example brake rotor 200 is axially movable on the carrier 208. Therefore, if the brake rotor 210 is not centered between the brake pads 902, 904 when the brake is applied, one of the brake pads 902, 904 moves (e.g., pushes) the brake track 210 axially to a position where the brake pads 902, 904 apply substantially the same force, i.e., a center position between the brake pads 902, 904. In particular, if there is unbalanced force from the brake pads 902, 904 on the brake track 210, the net force overcomes the friction force (between the brake track 210 and the carrier 208) and causes the brake track 210 to slide relative to the carrier 208 to a position where there is substantially balanced forced on the opposite sides of the brake track 210. In this manner, the brake rotor 210 self-centers between the brake pads 902, 904, which allows substantially balanced braking force on the opposite sides of the brake track 210, and which ensures the brake track 210 is spaced apart from the brake pads 902, 904 when the brake pads 902, 904 are retracted. When the brake is released and the brake pads 902, 904 are retracted to their fully open position (as shown in FIG. 9), the brake track 210 remains in the new centered positioned via the static friction between the brake track 210 and the carrier 208. As such, the brake track 210 is centered between the brake pads 902, 904 for the next braking operation. This ensure an appropriate gap is formed between the brake track 210 and the brake pads 902, 904 to avoid unnecessary brake contact. This adjustment may occur each time there is an unbalanced force or contact of the brake pads 902, 904 on the brake track 210. In brake calipers with opposing slave pistons, the brake pads 902 904 retract approximately equal distances away from the brake track 210. In brake calipers with single side slave pistons, the brake pads 902, 904 retract unequal distances away from the brake track 210. Whether the brake rotor 200 is used with a brake caliper having opposing or single side slave pistons, the brake track 210 maintains its new position between the brake pads 902 904. Thus, the example brake rotor 200 reduces or eliminates the need to constantly adjust the position of the brake rotor 200 over time as required with known brake rotors.

This self-centering effect also helps when initially installing the brake rotor 200 and the brake caliper 800 on a bicycle. In particular, with known brake rotors, it is typically a pain-staking process to align the brake track between the brake pads 902, 904. Typically a person uses shims to finely adjust the exact location of the brake rotor. On the other hand, the example brake rotor 200 can be installed without shims (or with minimal shims), because the brake tack 200 self-centers once the brake is applied. This greatly reduces labor costs and time associated with assembly and maintenance of the bicycle.

In this example, the center range CR is defined by the distance between the first and second brake pads 902, 904 in their fully open position. As disclosed above, in some examples, the center range CR may correspond to the thickness T2 of the carrier 208. In other examples, the center range CR may be greater than or less than the thickness T2 of the carrier 208. In some examples, as the brake pads 902, 904 and/or the brake track 210 wear over time, the center range CR increases and/or changes location (e.g., shifts slightly inboard or outboard).

While the example brake rotor 200 does not have any stops, in other examples, one or more stops could be coupled to or formed on the brake rotor 200 to define the center range CR. For example, a lip could be formed on the end portion 228 of one or more of the arms 226. Example stops are disclosed in further detail herein.

FIGS. 10A and 10B illustrate another example brake rotor 1000 constructed in accordance with the teachings of this disclosure. The example brake rotor 1000 can be implemented on the bicycle 100 of FIG. 1, for example, as the front brake rotor 142 and/or the rear brake rotor 150. FIG. 10A is a perspective view of a first side 1002 of the brake rotor 1000 and FIG. 10B is a perspective view of a second side 1004 of the brake rotor 1000 opposite the first side 1002. The brake rotor 1000 has a central axis 1006 that forms the rotational axis about which the brake rotor 1000 rotates. The brake rotor 1000 is substantially the same as the brake rotor 200 of FIGS. 2A and 2B. In particular, the brake rotor 1000 includes a carrier 1008, a brake track 1010 that is disposed radially outward of the carrier 1008, a first side 1012 and a second side 1014 of the brake track 1010 (which form the braking surfaces), a central opening 1016 in the carrier 1008 to receive a hub, a plurality of fastener openings 1018, a first side 1020 and a second side 1022 of the carrier 1008, a plurality of openings 1024 in the brake track 1010, a set of arms 1026 having end portions 1028, and an inner peripheral edge 1030 forming notches 1032 on the brake track 1010. The brake track 1010 is slidable in the axial direction on the end portions 1028 of the arms 1026 but constrained in the radial and circumferential directions in the same manner as in the brake rotor 200 disclosed above. To avoid redundancy, a full description of the carrier 1008 and the brake track 1010 is not provided. Instead, it is understood that any of the example structural and/or functional aspects disclosed above in connection with the brake rotor 200 likewise apply to the brake rotor 1000.

In this example, the brake rotor 1000 includes stops to limit the axial movement of the brake track 1010 relative to the carrier 1008 and thereby define the center range CR. For example, as shown in FIGS. 10A and 10B, the brake rotor 1000 includes a set of pins 1034 (one of which is referenced in FIGS. 10A and 10B). In this example, the brake rotor 1000 includes the same number of pins 1034 as the arms 1026, and each of the pins 1034 is associated with one of the arms 1026. In other examples, the brake rotor 1000 may include more or fewer pins (e.g., one, two, three, etc.). Each of the pins 1034 extends through an opening formed in the brake rotor 1000. The pins 1034 limit the axial movement of the brake track 1010 relative to the carrier 1008 and prevent the brake track 1010 from moving too far in one axial direction or the other.

Figure 11:
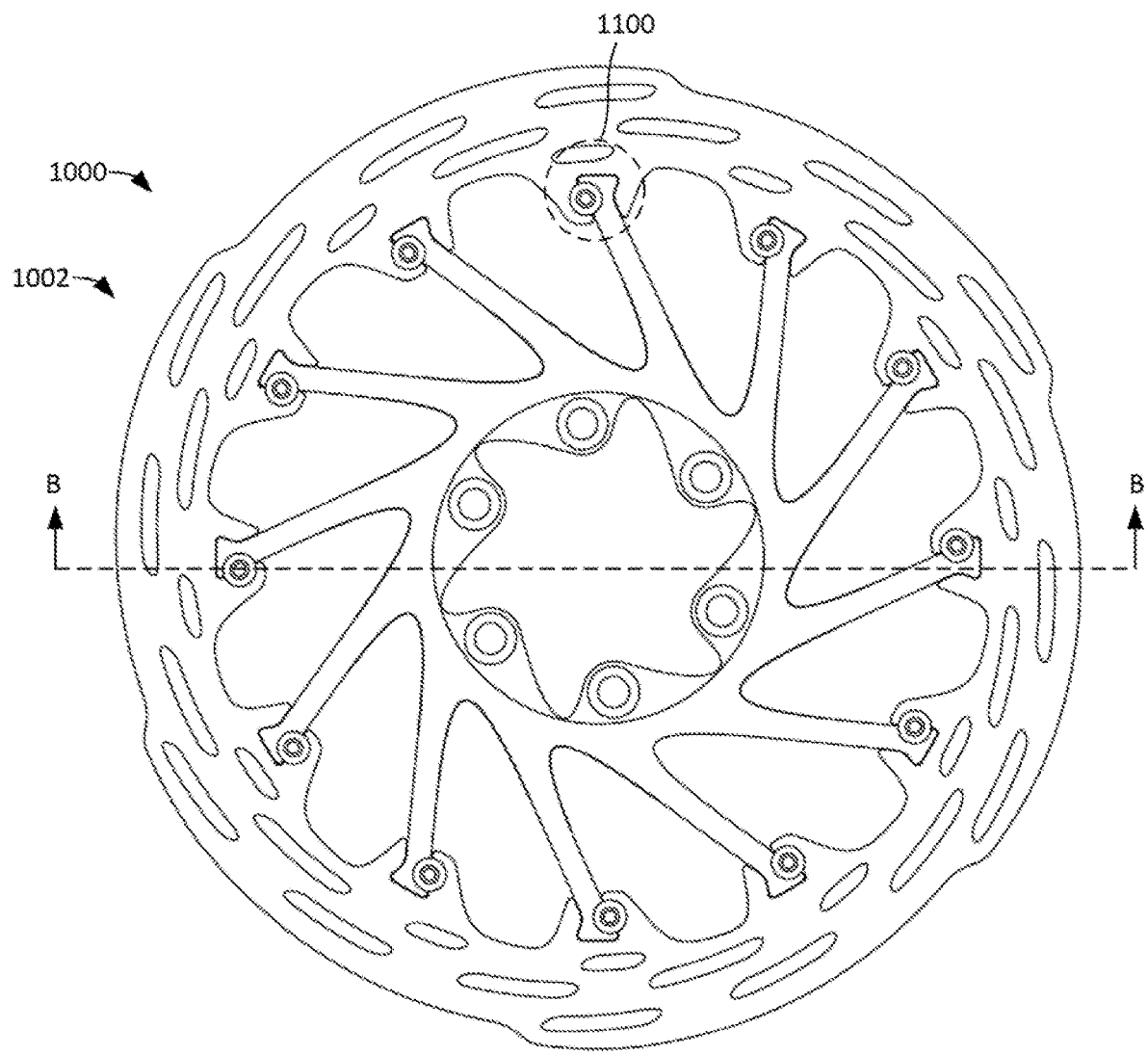
FIG. 11 is a side view of the example brake rotor of FIGS. 10A and 10B.
Figure 12:
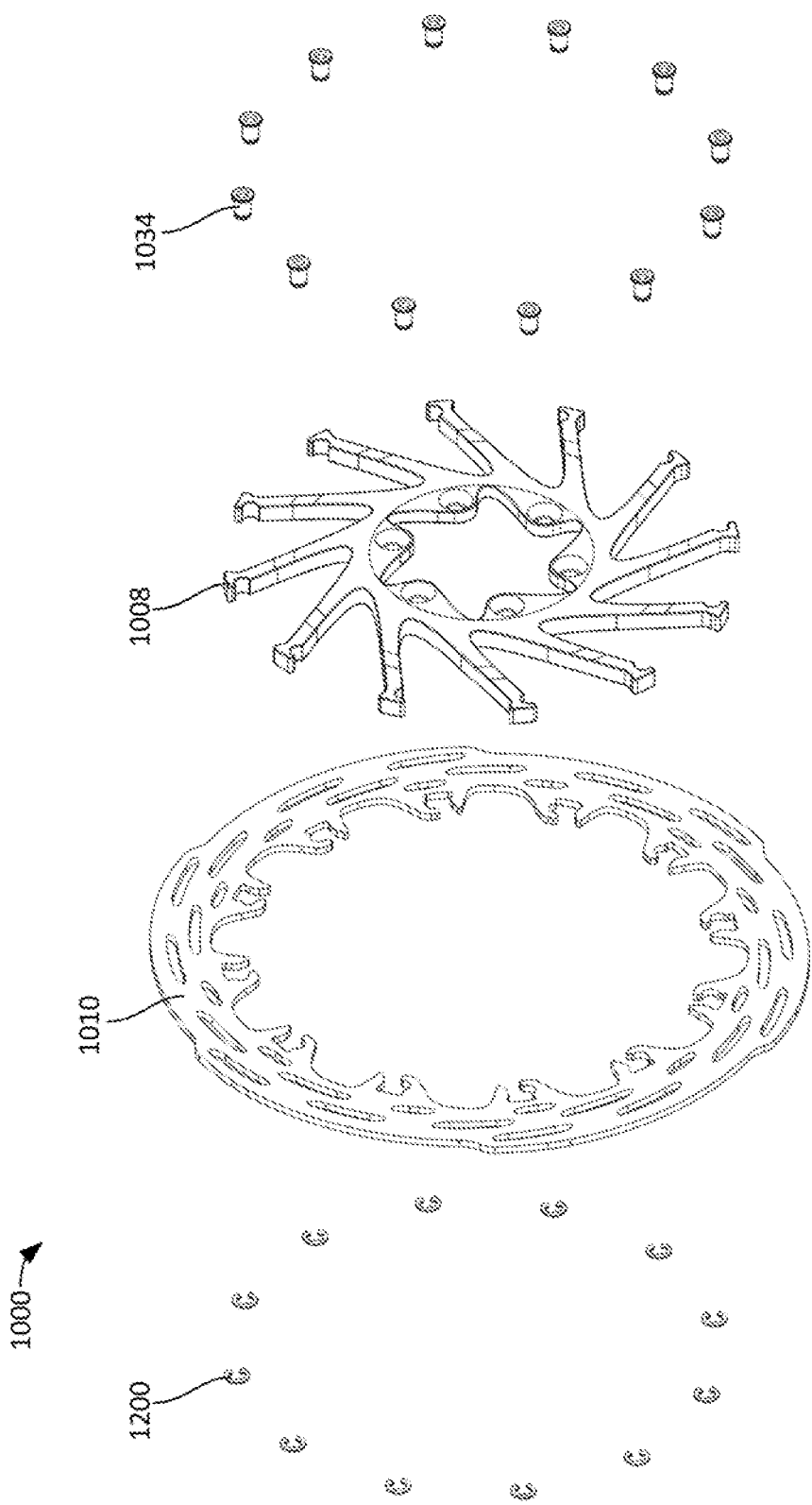
FIG. 12 is an exploded view of the example brake rotor of FIGS. 10A and 10B.

FIG. 11 is a side view showing the first side 1002 of the brake rotor 1000. FIG. 12 is an exploded view of the brake rotor 1000. As shown in FIG. 12, the brake rotor 1000 includes the carrier 1008, the brake track 1010, and the pins 1034 (one of which is referenced in FIG. 12). To hold the pins 1034 in place, the brake rotor 1000 includes a set of clips 1200 (one of which is referenced in FIG. 12) for the respective pins 1034.

Figure 13:
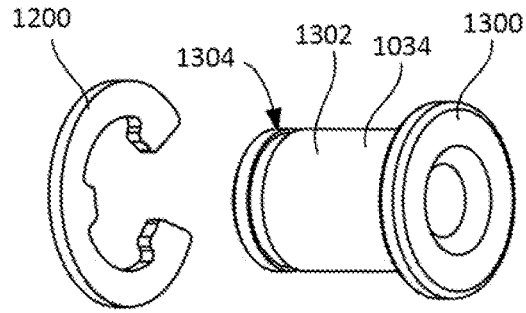
FIG. 13 is a perspective view of an example pin and an example clip that may be implemented in connection with the example brake rotor of FIGS. 10A and 10B.

FIG. 13 is a perspective view of one of the pins 1034 and one of the clips 1200. The pin 1034 has a head 1300 and a shaft 1302. In some examples, the head 1300 and the shaft 1302 are integrally formed. The shaft 1302 has a groove near a distal end of the shaft 1302 to receive the clip 1200. The clip 1200 can be pushed into the groove 1304, which couples the clip 1200 to the pin 1034.

Figure 14A:
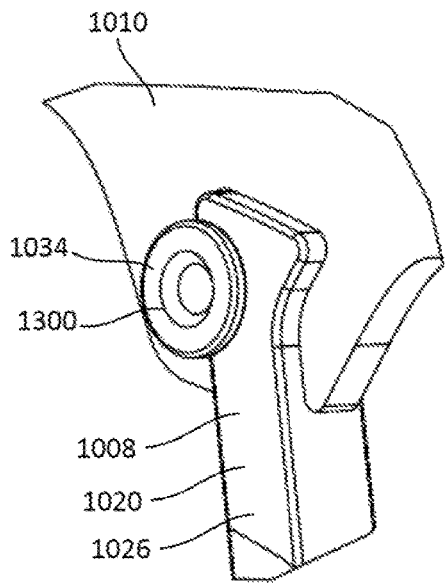
FIGS. 14A and 14B are enlarged views of the callouts in FIGS. 10A and 10B, respectively.
Figure 14B:
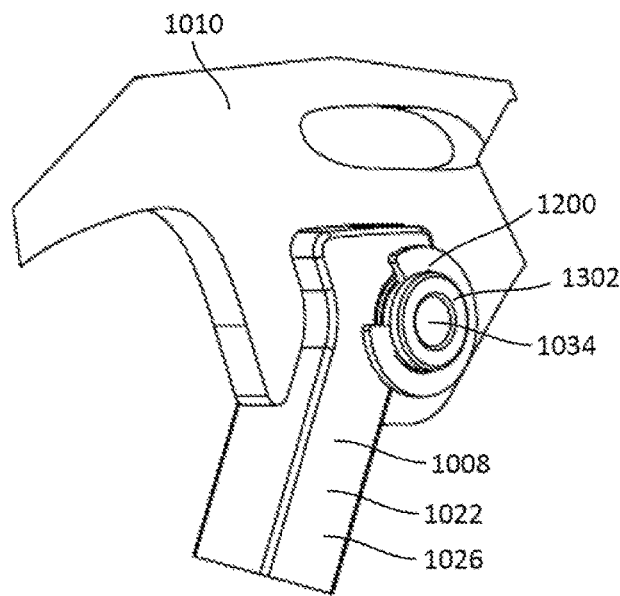

FIG. 14A is an enlarged view from the callout 1036 in FIG. 10A and FIG. 14B is enlarged view of the callout 1038 in FIG. 10B. As shown in FIG. 13A, the head 1300 of the pin 1034 is disposed on the first side 1020 of the carrier 1008. The shaft 1302 (FIG. 13) of the pin 1034 extends through an opening in the brake rotor 1000. As shown in FIG. 13B, the clip 1200 is coupled to the shaft 1302 and disposed on the second side 1022 of the carrier 1008. The pin 1034 is dimensioned such that when the pin 1034 and the clip 1200 are installed, as shown in FIGS. 14A and 14B, the head 1300 engages the first side 1020 of the arm 1026 and the clip 1200 engages the second side 1022 of the arm 1026. The head 1300 and the clip 1200 extend radially outward and overlap with a portion of the brake track 1010 in the axial direction. As such, the head 1300 and the clip 1200 are first and second stops that define the outer boundaries of the axial movement of the brake track 1010. The head 1300 (the first stop) is on the first side 1002 of the brake rotor 1000 and the clip 1200 (a second stop) is on the second side 1004 of the brake rotor 1000. The head 1300 (the first stop) limits axial movement of the brake track 1010 in a first axial direction and the clip 1200 (the second stop) limits axial movement of the brake track 1010 in a second axial direction.

Figure 15:
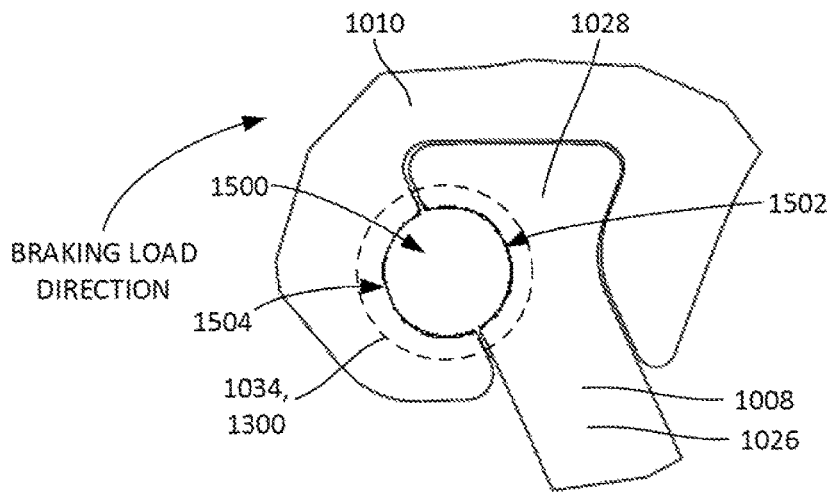
FIG. 15 is an enlarged view of the callout in FIG. 11.

FIG. 15 is an enlarged view of the callout 1100 in FIG. 11 with the pin 1034 removed. An outline of the head 1300 of the pin 1034 is shown in dashed lines. As shown in FIG. 15, the brake rotor 1000 includes an opening 1500 for the pin 1034. The opening 1500 is partially (e.g., half) formed in the brake track 1010 and partially (e.g., half) formed in the carrier 1008 (and, in particular, in the end portion 1028 of the arm 1026 of the carrier 1008). In this example, the end portion 1028 of the arm 1026 has a first semicircular groove 1502, and the brake track 1010 has a second semicircular groove 1504. The grooves 1502, 1504 may be machined (e.g., drilled) in the arm 1026 and the brake track 1010, respectively. The head 1300 and the clip 1200 have a larger diameter than the opening 1500. Therefore, when the pin 1034 and the clip 1200 are installed, the head 1300 and the clip 1200 overlap at least a section of the brake track 1010 in the axial direction. This prevents the brake track from moving axially beyond the head 1300 or the clip 1200.

In some examples, it is advantageous to have the pin 1034 disposed between the surfaces of the arm 1026 and the brake track 1010 because the pin 1034 acts as a load transfer mechanism. In some examples, as shown in FIG. 15, the pin 1034 is disposed on the load side of the arm 1026 (e.g., on the left side in FIG. 15). As such, during braking, braking loads are transferred from the brake track 1010, through the pin 1034, and to the arm 1026 of the carrier 1008. The pin 1034 has larger surface/contact area on the carrier 1008 compared to having a flat interface directly between the brake track 1010 and the arm 1026. This increased surface area helps distribute the braking loads more evenly and thereby reduces the load PSI to the carrier 1008. The pin 1034 also helps dissipate heat across the entire width of the pin 1034. As a result, less heat is transferred to the carrier 1008. Therefore, the transfer of force and heat per interface surface area is reduced on the carrier 208 so as not to overly stress and permanently deform the carrier 208.

In some examples, the brake track 1010 is constructed of stainless steel, the carrier 1008 is constructed of aluminum, and the pin 1034 is constructed of a non-aluminum material having a higher melting point than aluminum and that can withstand higher surface stresses at higher temperatures. As such, the pin 1034 is constructed of a different material than the carrier 1008. This helps reduce heat transfer to the carrier 1008. In some examples, the pin 1034 is constructed of stainless steel, such as series 300 or series 400 stainless steel. In other examples, the pin 1034 may be constructed of other types of material, such as titanium.

While in the illustrated example the opening 1500 for the pin 1034 is half formed in each of the arm 1026 and the brake track 1010, in other examples, the opening 1500 can be formed more in one of the structures than the other structure (e.g., 75% formed in the arm 1026 and 25% formed in the brake track 1010). In some examples, the opening 1500 is entirely formed through the arm 1026 (e.g., through a center of the arm 1026). While only one of the pins 1034 is described in connection with FIGS. 13-15, it is understood that each of the other pins 1034 is identical to the pin 1034 disclosed in connection with FIGS. 13-15.

Figure 16:
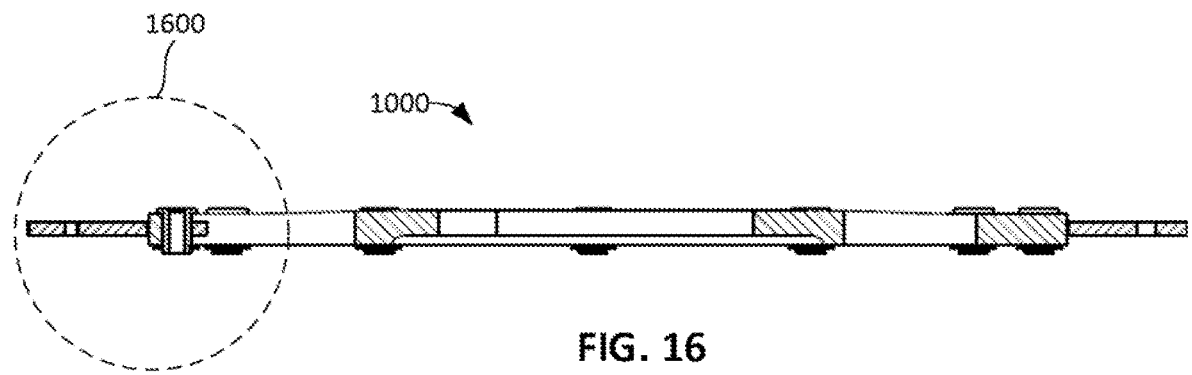
FIG. 16 is a cross-sectional view of the example brake rotor of FIGS. 10A and 10B taken along line B-B in FIG. 11.
Figure 17A:
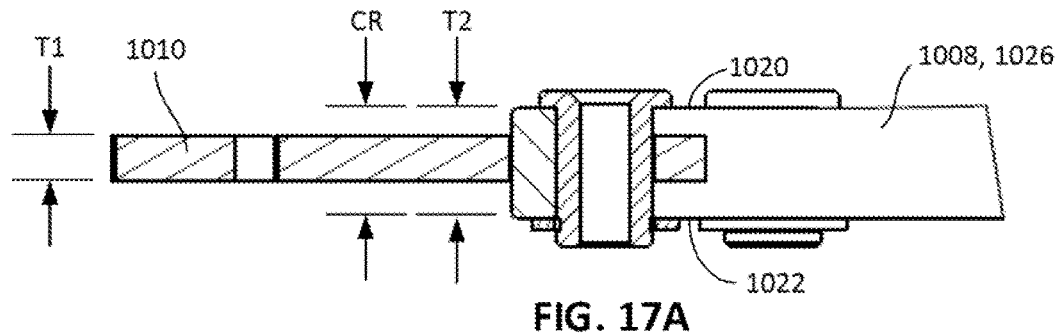
FIGS. 17A, 17B, and 17C are enlarged views of the callout in FIG. 16 showing an example brake track moved axially to three different positions.
Figure 17B:
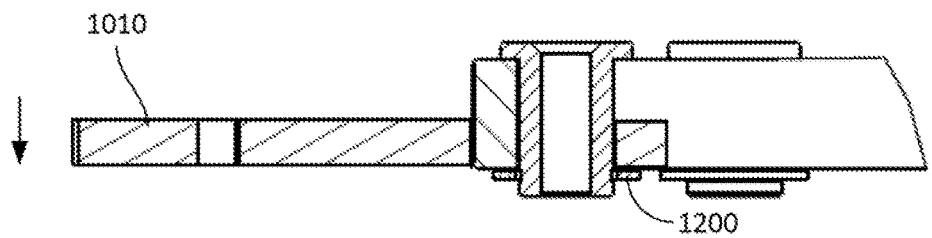
Figure 17C:
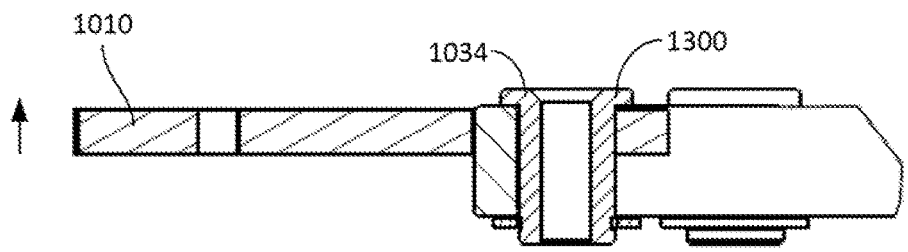

FIG. 16 is a cross-sectional view of the example brake rotor 1000 taken along line B-B of FIG. 11. FIGS. 17A, 17B, and 17C are enlarged views of the callout 1600 in FIG. 16 showing the brake track 1010 in three different axial positions. As shown in FIG. 17A, the brake track 1010 has a thickness T1 and the carrier 1008 (e.g., the end portion 1028 of the arm 1026) has a thickness T2 that is greater than the thickness T1 of the brake track 1010. FIG. 17A shows the brake track 1010 in a center position. The brake track 1010 is movable (e.g., slidable) in the axial direction relative to the carrier 1008. If the brake track 1010 is moved in one axial direction (e.g., inboard) to the position shown in FIG. 17B, the brake track 1010 engages the clip 1200. This prevents brake track 1010 from being further moved in the same axial direction. Similarly, if the brake track 1010 is moved in the opposite axial direction (e.g., outboard) to the position shown in FIG. 17C, the brake track 1010 engages the head 1300 of the pin 1034, which prevents the brake track 1010 from being further moved in the same axial direction. As such, the inner surfaces of the head 1300 and the clip 1200 form or define the center range CR. In this example, because the head 1300 and the clip 1200 are engaged with the first and second sides 1020, 1022, respectively, of the carrier 1008, the center range CR is the same as the thickness T2 of the carrier 208. In some examples, this allows for the maximum range of movement without allowing the brake track 1010 to move beyond the sides 1020, 1022 of the carrier 208. However, in other examples, the center range CR may be greater than or less than the thickness T2 of the carrier 1008.

In some examples, the brake rotor 1000 includes a pin for each interface of the arms 1026 and notches 1032, such as shown in FIGS. 10A, 10B, 11, and 12. However, in other examples, the brake rotor 1000 may include pins for only some of the interfaces, but not all of the interfaces. For example, the brake rotor 1000 may include only one pin and clip for one of the arms 1026 and its corresponding notch 1032. The other arms 1026 and notches 1032 may not have any pins. In such an example, the single pin and clip can still prevent the entire brake track 1010 from moving axially beyond the limits of the center range CR. Similar to the brake rotor 200 disclosed above, the brake track 1010 is constrained in the radial and circumferential directions. Even if the pin(s) were removed, the brake track 1010 is still constrained in the radial and circumferential directions.

While in this example the clips 1200 are used to retain the pins 1034 and form portions of the axial limits, in other examples, other structures can be used to retain the pins, such as cotter pins. In some examples, the pins 1034 may instead be implemented as rivets. In such an example, the ends of the rivets may be splayed outward to form a second head on the opposite side of the brake rotor 1000. In other examples, threaded fasteners, such as nuts and bolts, can be used in a similar manner.

Figure 18B:
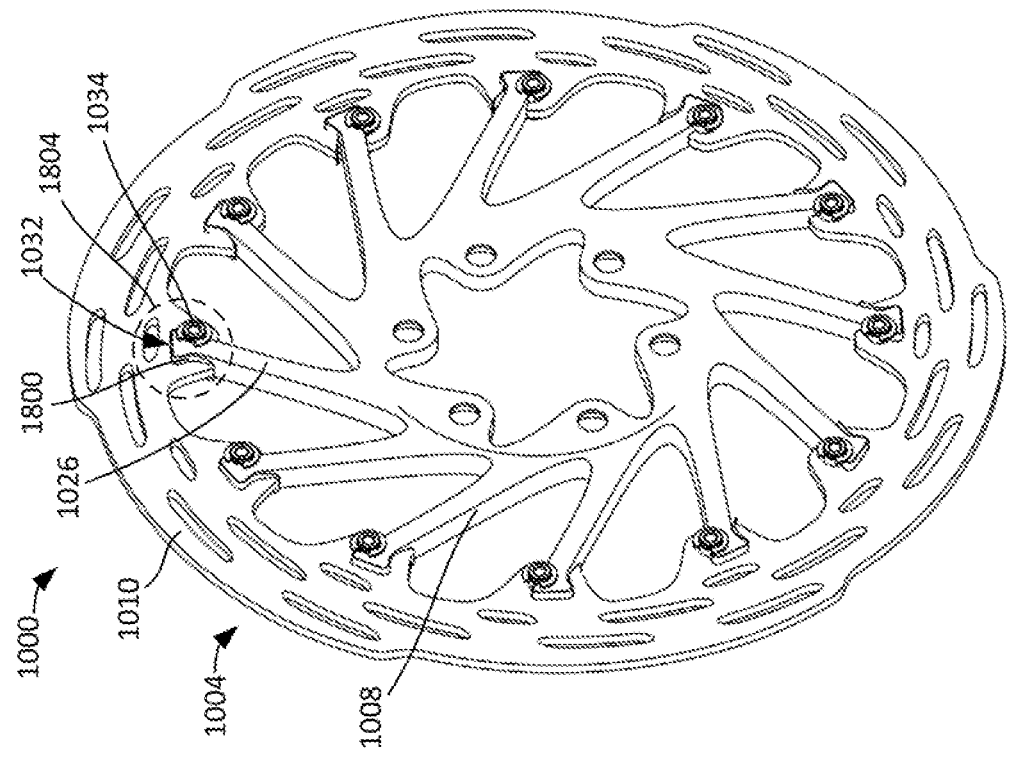
FIGS. 18A and 18B are perspective views of opposite sides of the example brake rotor of FIGS. 10A and 10B in which example springs are included to bias an example brake track in a circumferential direction.
Figure 18A:
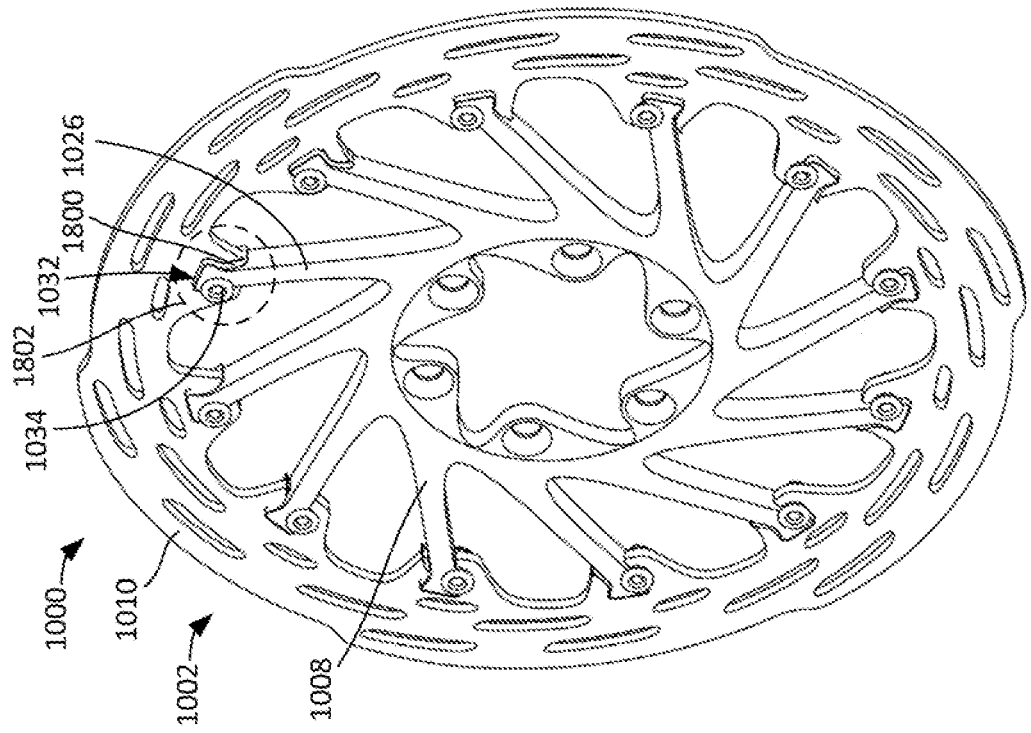

In some examples, one or more intermediary structures can be disposed between the carrier 1008 and the brake track 1010. Such structure(s) can be used help account for dimensional tolerances and thermal growth due to increased braking temperature that may otherwise create larger than acceptable clearances between the brake track 1010 and the carrier 1008. These clearances could cause the brake track 1010 to freely move or rattle on the carrier 1008 due to vehicle rolling surface vibrations when the brake is not applied. For example, FIGS. 18A and 18B are perspective views of the first and second sides 1002, 1004, respectively, of the brake rotor 1000. In this example, the brake rotor 1000 includes a set of springs 1800 (one of which is referenced in FIGS. 18A and 18B) that are disposed in the respective notches 1032 (one of which is referenced in FIGS. 18A and 18B) of the brake track 1010, between the arms 1026 (one of which is referenced in FIGS. 18A and 18B) and the brake track 1010. The springs 1800 bias the brake track 1010 circumferentially relative to the carrier 1008. In particular, the springs 1800 bias the brake track 1010 against the pins 1034 (one of which is referenced in FIGS. 18A and 18B) and the carrier 1008 to reduce or eliminate the potential free movement and rattle described above. In this example, the brake rotor 1000 includes the same number of springs 1800 as the arms 1026 and the notches 1032. In other examples, the brake rotor 1000 may include more or fewer springs (e.g., one, two, three, etc.).

FIG. 19A is an enlarged view of the callout 1802 from FIG. 18A and FIG. 19B is an enlarged view of the callout 1804 from FIG. 19B. FIGS. 19A and 19B show opposite sides of one of the arms 1026 and the corresponding spring 1800. As shown in FIGS. 19A and 19B, the spring 1800 is disposed in the notch 1032 between an outer peripheral edge 1900 of the end portion 1028 of the arm 1026 and the inner peripheral edge 1030 of the brake track 1010. FIG. 20 is an isolated perspective view of the spring 1800. In some examples, the spring 1800 is a piece of sheet metal, such as stainless steel sheet metal. The spring 1800 is installed in an elastically deformed state. As show in FIGS. 19A and 19B, the spring 1800 fills any excess space between the outer peripheral edge 1900 of the arm 1026 and the inner peripheral edge 1030 of the brake track 1010 in the notch 1032. The spring 1800 also biases the brake track 1010 in the circumferential direction of the braking load against the pin 1034 and the carrier 1008. This ensure that no gap or slop exists between the brake track 1010 and the carrier 1008, so that when the brake is applied, the braking load on the brake track 1010 is transferred directly to the carrier 1008. Additionally, the spring 1800 acts as a heat shield to help reduce heat transferred to the carrier 1008. In some examples, it is desired to reduce heat to the carrier 1008, because the carrier 1008 may be susceptible to deforming at higher temperatures. While in this example the spring 1800 is formed from a flat strip of metal, in other examples, the spring 1800 may be formed in other geometric shapes and/or implemented as other types of springs, such as a coil spring or a split hollow pin. Additionally or alternatively, the spring 1800 may be formed with as part of the brake track 1010, the carrier 1008, and/or the pin 1034. The other springs 1800 shown in FIGS. 18A and 18B are identical to the spring 1800 disclosed in connection with FIGS. 19A, 19B, and 20. Therefore, any of the aspects disclosed in connection with the spring 1800 in FIGS. 19A, 19B, and 20 likewise apply to the other springs 1800.

In this example, the spring 1800 is about the same thickness as the carrier 1008. The spring 1800 may be axially constrained by the head 1300 of the pin 1034 and the clip 1200. In this example, the brake track 1010 slides axially on an outer surface 1902 of the spring 1800. The frictional force between the inner peripheral edge 1030 of the brake track 1010 and the outer surfaces 1902 of the springs 1800 may be the same as the frictional force disclosed in connection with the carrier 208 and the brake rack 210 of the brake rotor 200 in FIGS. 2A and 2B. In particular, the frictional force between the brake track 1000 and the spring 1800 is an amount that enables the brake track 210 to slide axially on the springs 1800 when engaged with a sufficient force (e.g., 1 newton) by the brake pads, but when the brake pads are released, the frictional force holds the brake track 210 in substantially the same axial position relative to the carrier 208.

Figure 21:
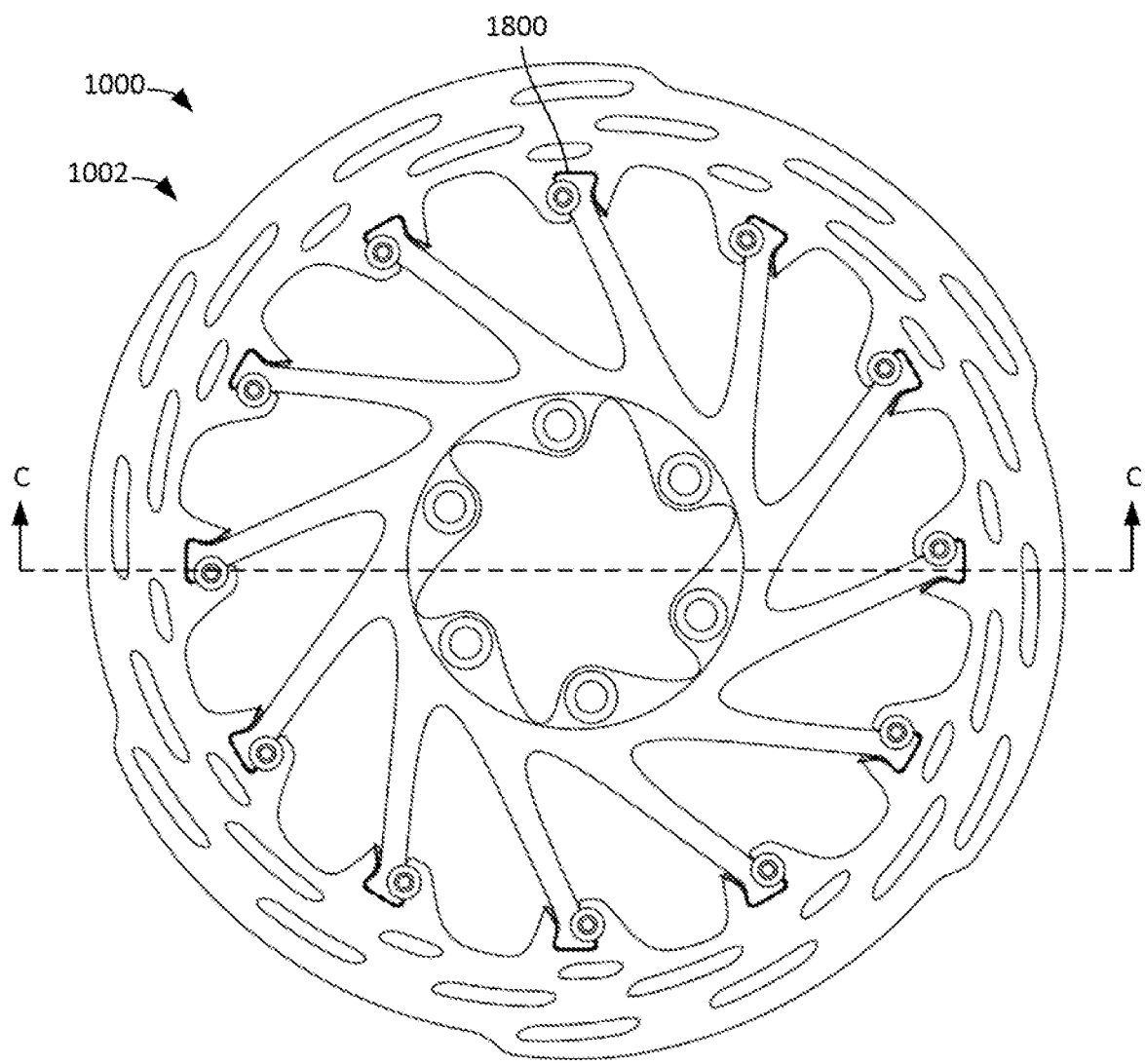
FIG. 21 is a side view of the example brake rotor of FIGS. 18A and 18B.
Figure 22:
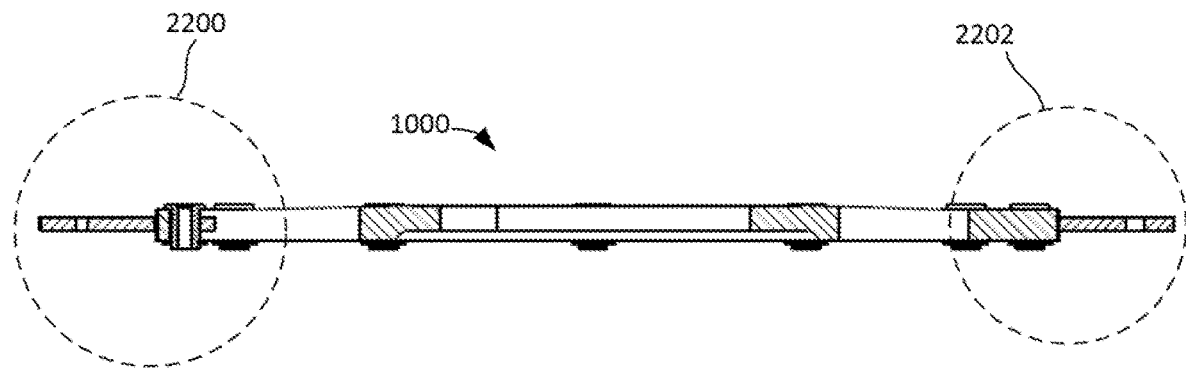
FIG. 22 is a cross-sectional view of the example brake rotor of FIGS. 18A and 18B taken along line C-C in FIG. 21.
Figure 23:
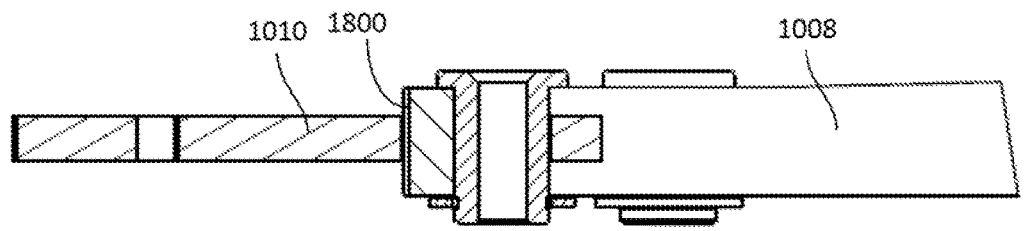
FIG. 23 is an enlarged view of one of the callouts in FIG. 22.
Figure 24:
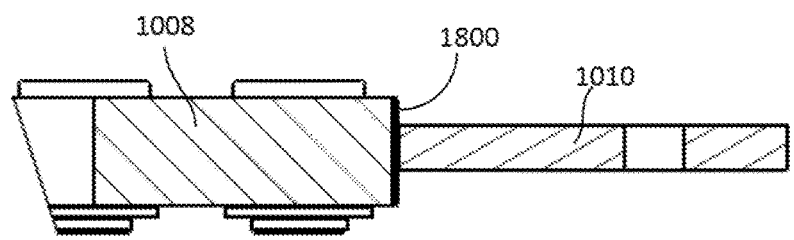
FIG. 24 is an enlarged view of the other callout in FIG. 22.

FIG. 21 is a side view showing the first side 1002 of the brake rotor 1000 with the springs 1800 (one of which is referenced in FIG. 21). FIG. 22 is a cross-sectional view of the example brake rotor 1000 taken along line C-C of FIG. 21. FIG. 23 is an enlarged view of the callout 2200 from FIG. 22. FIG. 24 is an enlarged view of the callout 2202 from FIG. 22. As shown in FIGS. 23 and 24, the springs 1800 are disposed between the carrier 1008 and the brake track 1010. The thicknesses and center range CR can be the same as disclosed in connection with FIGS. 17A-17C and descriptions thereof are not repeated herein.

Figure 25B:
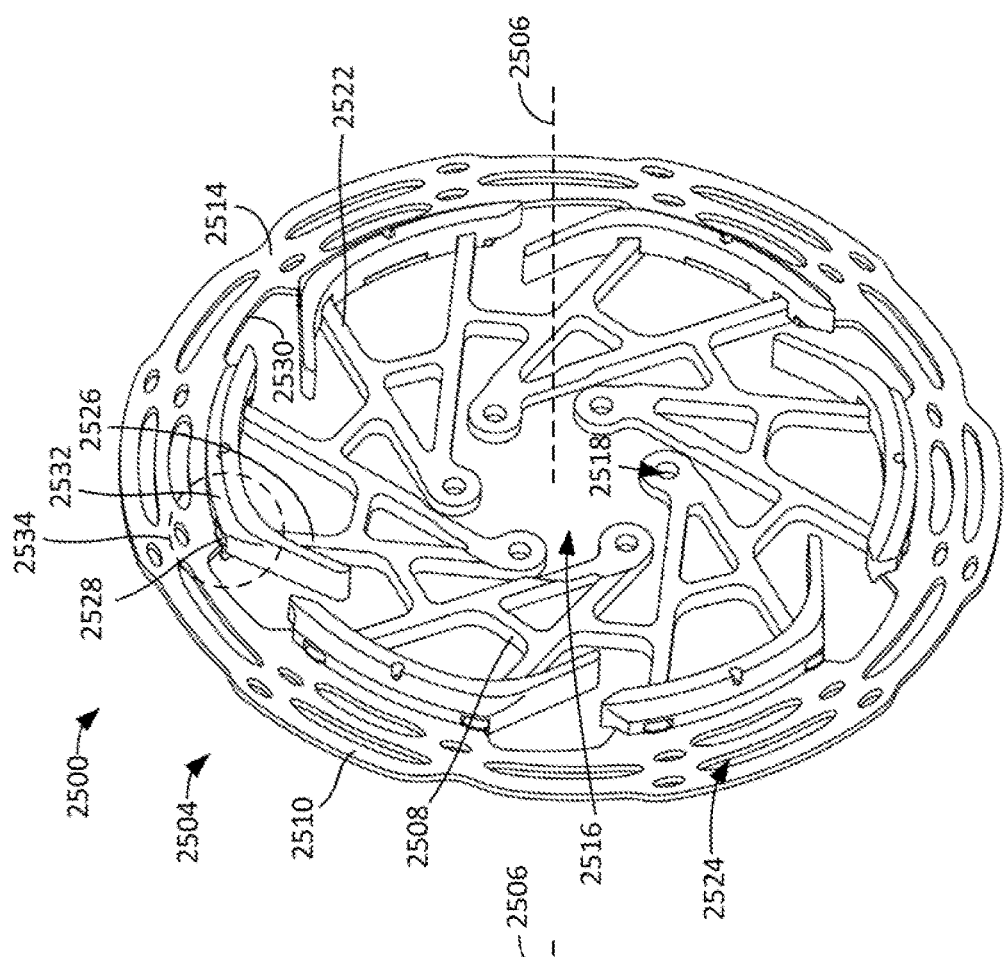
FIGS. 25A and 25B are perspective views of opposite sides of an example brake rotor constructed in accordance with the teachings of this disclosure.
Figure 25A:
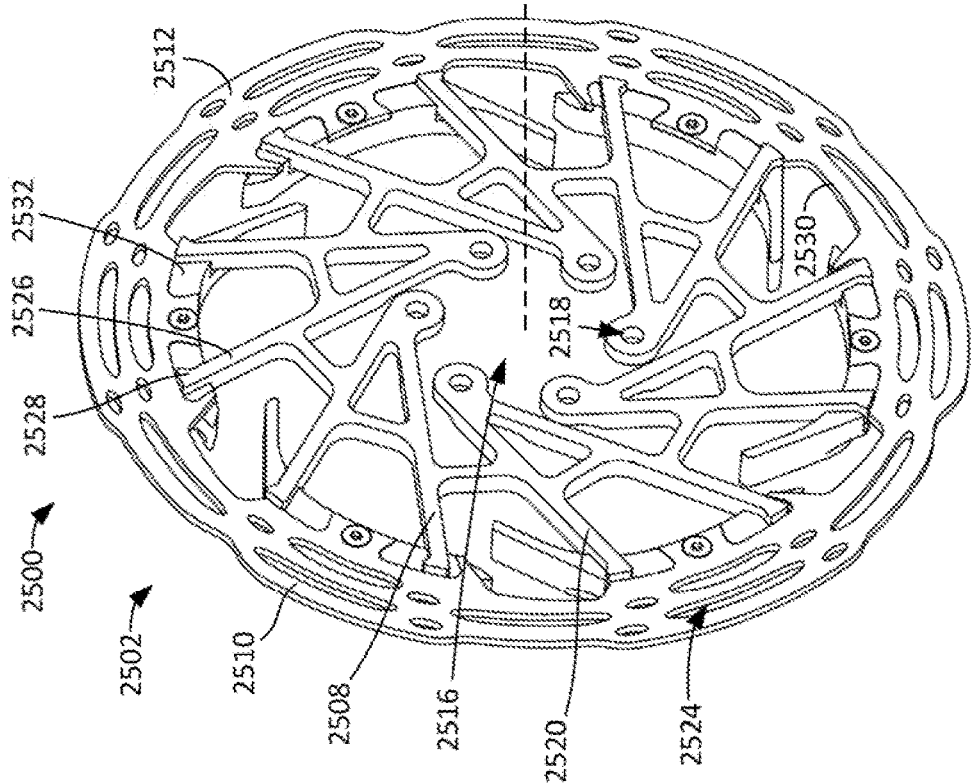

FIGS. 25A and 25B illustrate another example brake rotor 2500 constructed in accordance with the teachings of this disclosure. The example brake rotor 2500 can be implemented on the bicycle 100 of FIG. 1, for example, as the front brake rotor 142 and/or the rear brake rotor 150. FIG. 25A is a perspective view of a first side 2502 of the brake rotor 2500 and FIG. 25B is a perspective view of a second side 2504 of the brake rotor 2500 opposite the first side 2502. The brake rotor 2500 has a central axis 2506 that forms the rotational axis about which the brake rotor 2500 rotates. The brake rotor 2500 is similar to the brake rotor 200 of FIGS. 2A and 2B. In particular, the brake rotor 2500 includes a carrier 2508, a brake track 2510 disposed radially outward of the carrier, a first side 2512 and a second side 2514 of the brake track 2510 (which form the braking surfaces), a central opening 2516 in the carrier 2508 to receive a hub, a plurality of fastener openings 2518, a first side 2520 and a second side 2522 of the carrier 2508, a plurality of openings 2524 in the brake track 2510, a set of arms 2526 having end portions 2528, and an inner peripheral edge 2530 of the brake track 2510. The end portions 2528 of the arms 2526 have the same shape as the end portions 228 of the arms 226 disclosed above. The carrier 2508 and the brake track 2510 can be constructed of any of the materials disclosed above in connection with the brake rotor 200. As disclosed in further detail, the brake track 2510 is axially movable relative to the carrier 2508, but constrained in the radial and circumferential directions.

In the illustrated example, the brake rotor 2500 includes a set of positioning portions with thermal dissipation elements 2532 (referred to herein as the positioning portions 2532) (one of which is referenced in FIGS. 25A and 25B). The positioning portions 2532 can act as stops that limit axial movement in at least one direction, and can also be configured as convection elements, as disclosed in further detail below. The positioning portions 2532 may also be referred to as stops, cooling fins, cooling fixtures, cooling vanes, or heat sinks. In the illustrated example, the brake rotor 2500 includes six positioning portions 2532. However, in other examples, the brake rotor 2500 may include more or fewer positioning portions (e.g., one, two, three, etc.). In this example, the positioning portions 2532 are coupled to the brake track 2510. As such, the positioning portions 2532 move axially with the brake track 2510 relative to the carrier 2508. In the illustrated example, the positioning portions 2532 extend at least partially outward from the second side 2514 of the brake track 2510, as shown in FIG. 25B. The positioning portions 2532 dissipate heat from the brake track 2510. In particular, the positioning portions 2532 absorb heat from the brake track 2510 and dissipate the heat to the surrounding air, thereby helping to cool the brake rotor 2500 more quickly. The positioning portions 2532 can also affect the airflow around the brake rotor 2500 to improve cooling. In some examples, the positioning portions 2532 are constructed of aluminum, which has a relatively high thermal conductivity. In other examples, the positioning portions 2532 can be constructed of other materials (e.g., stainless steel). The positioning portions 252 also distribute breaking loads from the brake track 2510 to the carrier 2508 over a larger surface areas so as not to permanently deform the load transferring surfaces.

Figure 26:
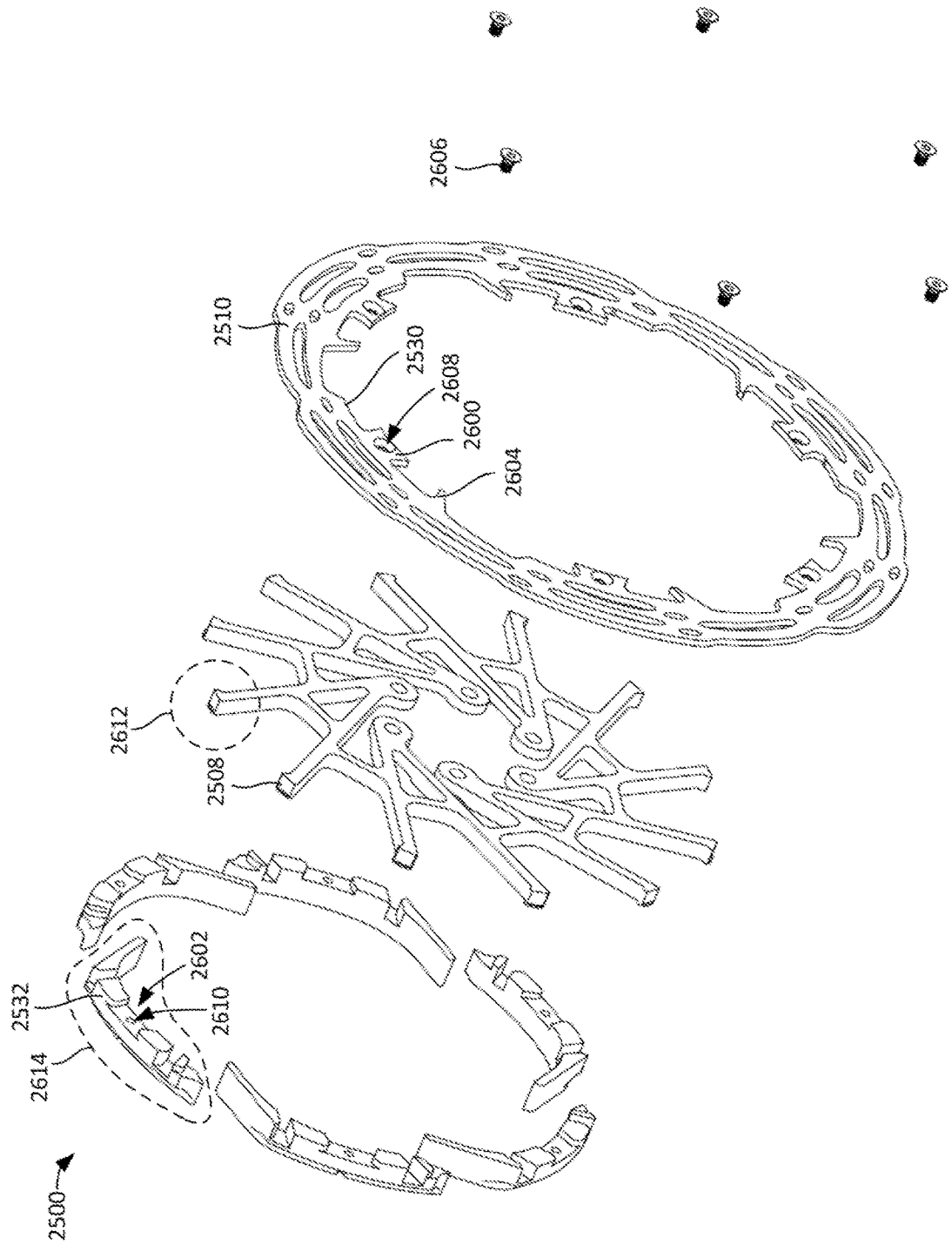
FIG. 26 is an exploded view of the example brake rotor of FIGS. 25A and 25B.

FIG. 26 is an exploded view of the brake rotor 2500. The brake rotor 2500 includes the carrier 2508, the brake track 2510, and the positioning portions 2532 (one of which is referenced in FIG. 26). As shown in FIG. 26, the inner peripheral edge 2530 of the brake track 2510 has a set of tabs 2600 (one of which is referenced in FIG. 26) extending radially inward. Each of the positioning portions 2532 has a recess 2602 to receive one of the tabs 2600. The inner peripheral edge 2530 of the brake track 2510 also has a set of hooks 2604 (one of which is referenced in FIG. 26) to help secure each of the corresponding positioning portions 2532. The shape of the tabs 2600 and the hooks 2604 can radially constrain the positioning portions 2532 relative to the brake track 2510.

In the illustrated example, the brake rotor 2500 includes a set of threaded fasteners 2606 (e.g., screws, bolts, etc.) (one of which is referenced in FIG. 26) to couple respective ones of the positioning portions 2532 to the brake track 2510. The brake track 2510 has fastener openings 2608 (one of which is referenced in FIG. 26) through which threaded fasteners 2606 extend. Each of the positioning portions 2532 also has a corresponding fastener opening 2610 (one of which is referenced in FIG. 26). When the brake rotor 2500 is assembled, each threaded fastener 2606 extends through one of the fastener openings 2608 in the brake track 2510 and into one of the fastener openings 2610 in one of the positioning portions 2532. In this example, the fastener openings 2608 are formed through the tabs 2600. However, in other examples, the fastener openings 2608 may be formed in other locations on the brake track 2510. In other examples, the positioning portions 2532 can be coupled to the brake track 2510 using other mechanical and/or chemical fastening techniques (e.g., rivets, adhesives, etc.). In other examples, the positioning portions 2532 can be integrally formed with the brake track 2510.

Figure 27:
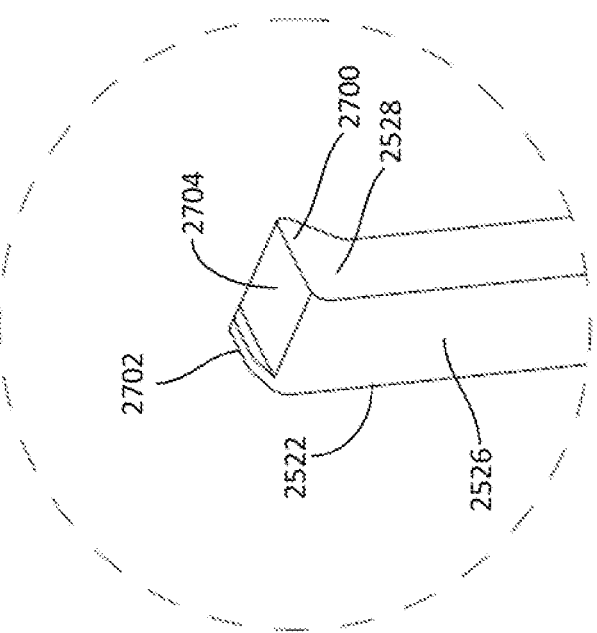
FIG. 27 is an enlarged view of one of the callouts in FIG. 26 showing an example end portion of an example arm of an example carrier.

FIG. 27 is an enlarged view of the callout 2612 from FIG. 26 showing one of the end portions 2528 of one of the arms 2526. The end portions 2528 of the other arms 2526 of the brake rotor 2500 in FIGS. 25A and 25A are identical to the end portion 2528 shown in FIG. 27. Thus, any of the aspects disclosed in connection with the end portion 2528 shown in FIG. 27 likewise apply to the other end portions 2528. The end portion 2528 is shaped substantially the same as the end portion 228 of the brake rotor 200 disclosed in connection with FIGS. 2A and 2B. The end portion 2528 has a protrusion 2700 that constrains the brake track 2510 in the radial direction. As shown in FIG. 27, the end portion 2528 of the arm 2526 has a tab 2702 extending outward from an outer peripheral edge 2704 of the end portion 2528. The tab 2702 is an extension of the second side 2522 of the arm 2526. The tab 2702 forms a first stop that limits axial movement of the brake track 2510 in one axial direction.

Figure 28:
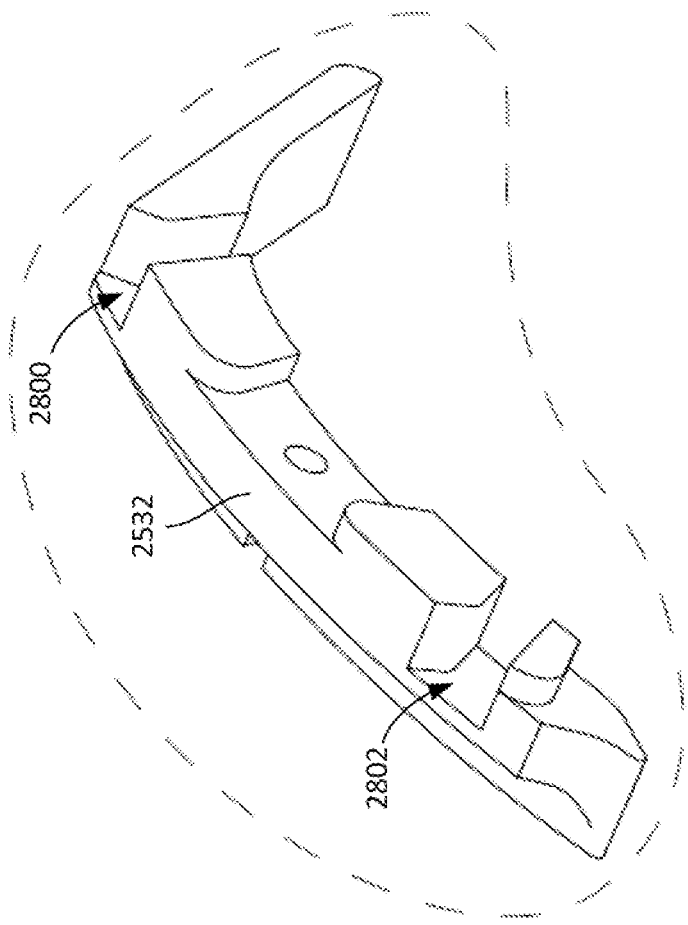
FIG. 28 is an enlarged view of the other callout in FIG. 26 showing an example positioning portion with thermal dissipation element.

FIG. 28 is an enlarged view of the callout 2614 from FIG. 26 showing one of the positioning portions 2532. The other positioning portions 2532 of the brake rotor 2500 in FIGS. 25A and 25A are identical to the positioning portion 2532 shown in FIG. 28. Thus, any of the aspects disclosed in connection with the positioning portion 2532 shown in FIG. 28 likewise apply to the other positioning portions 2532. In this example, the positioning portion 2532 has a first notch 2800 for receiving one of the end portions 2528 of one of the arms 2526 and a second notch 2802 for receiving another end portion 2528 of another one of the arms 2526. In other examples, the positioning portion 2532 may only have one notch for one of the end portions 2528, or more have more than two notches for more than two for the end portions 2528. The notches 2800, 2802 have a shape or profile that matches the shape of the end portions 2528. The positioning portion 2532 forms a second stop that limits axial movement of the brake track 2510 in one axial direction.

Figure 29A:
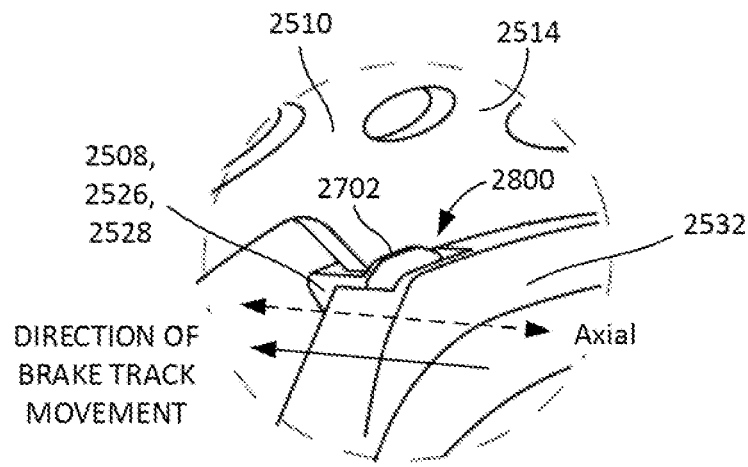
FIGS. 29A, 29B, and 29C are enlarged views of the callout in FIG. 25B showing an example sequence of axial movement of an example brake track between two stops.
Figure 29B:
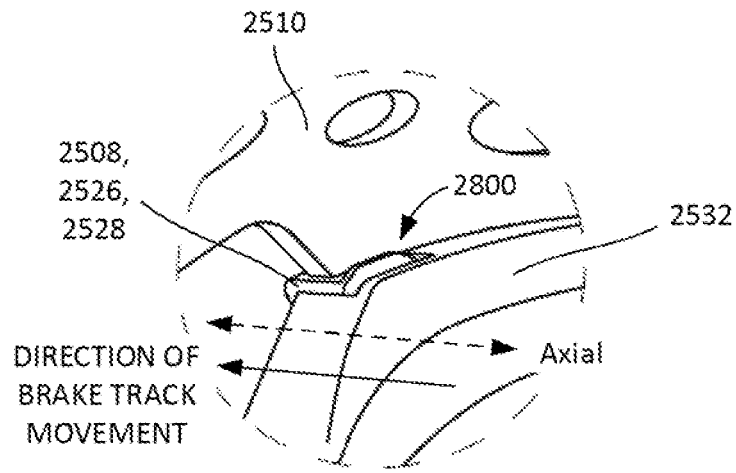
Figure 29C:
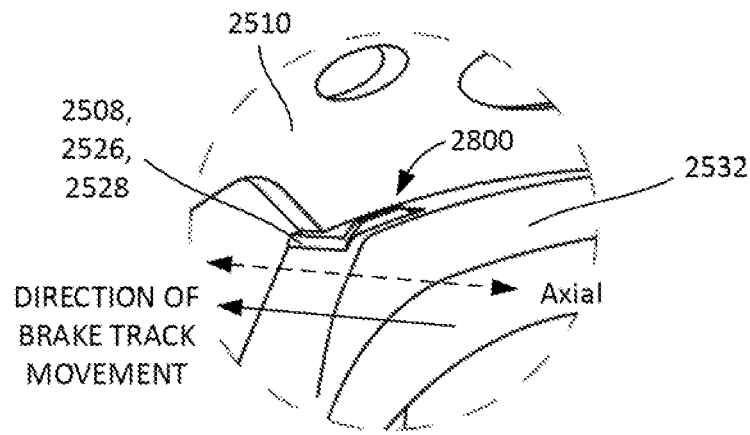

FIGS. 29A-29C are enlarged views of the callout 2534 from FIG. 25B showing an example sequence of the brake track 2510 being moved axially. The end portion 2528 of the arm 2526 is disposed in the first notch 2800 of the positioning portion 2532. The interface between the end portions 2528 and the positioning portion 2532 constrains the brake track 2510 in the radial and circumferential directions. Braking loads are transferred through the positioning portion 2532 to the carrier 2508. The positioning portion 2532 is slidable on the end portion 2528 in the axial direction, which enables the positioning portion 2532 to move axially relative to the carrier 2508 and, thus, enables the brake track 2510 to move axially relative to the carrier 2508. As such, the end portion 2528 is to slide in the first notch 2800 when the brake track 2510 moves axially relative to the carrier 2508. Similarly, a second one of the arms 2526 disposed in the second notch 2802 (FIG. 8) similarly slides in the second notch 2802 when the brake track 2510 moves axially relative to the carrier 2508.

In FIG. 29A, the tab 2702 on the end portion 2528 is engaged with the second side 2514 of the brake track 2510. This limits the brake track 2510 from being moved further in one axial direction (to the right in FIG. 29A). As shown in the sequence in FIGS. 29A-29C, the brake track 2510 can be moved axially in the opposite direction. In FIG. 29C, the end portion 2528 is engaged the positioning portion 2532, which limits the brake track 2510 from being further moved in the other axial direction. As such, the tab 2702 is a first stop that limits axial movement of the brake track 2510 in a first axial direction and the positioning portion 2532 is a second stop that limits axial movement of the brake track 2510 in a second axial direction. Therefore, in this example, the positioning portion 2532 acts as both a stop and a cooling mechanism to dissipate heat. In this example, the tab 2702 and the positioning portion 2532 (i.e., the first and second stops) are on a same side of the brake rotor 2500. In particular, both the tab 2702 and the positioning portion 2532 are on the second side 2504 (FIG. 4) of the brake rotor 2500 instead of being on opposite sides of the brake rotor 2500.

Figure 30:
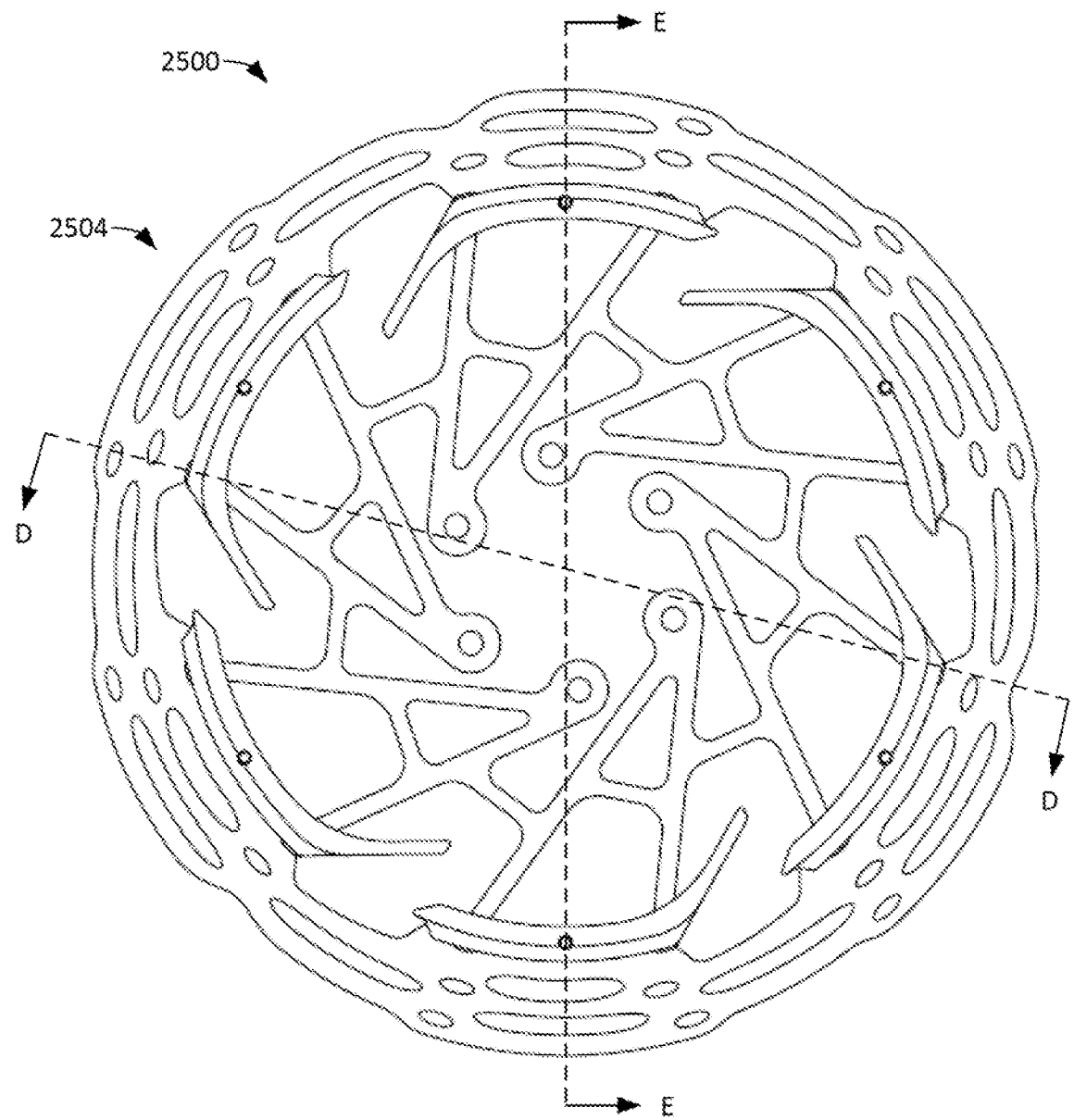
FIG. 30 is a side view of the example brake rotor of FIGS. 25A and 25B.

FIG. 30 is a side view of the second side 2504 of the brake rotor 2500. FIG. 31 is a cross-sectional view of the brake rotor 2500 taken along line D-D in FIG. 30. As can be seen from FIG. 31, the brake track 2510 is disposed radially outward of the carrier 2508. In particular, the brake track 2510 is positioned axially between the first and second sides 2520, 2522 of the carrier 2508 (e.g., between the first and second sides 2520, 2522 at the end portions 2528 of the carrier 2508).

FIGS. 32A, 32B, and 32C are enlarged views of the callout 3100 from FIG. 31 showing the brake track 2510 and the positioning portion 2532 in three different axial positions. The axial positions shown in FIGS. 32A-32C also correspond to the axial positions shown in FIGS. 29A-29C. As shown in FIG. 32A, the brake track 2510 has a thickness T1 and the carrier 2508 (e.g., the end portion 2528 of the arm 2526) has a thickness T2 that is greater than the thickness T1 of the brake track 2510. The brake track 2510 can move axially (to the left and right in FIGS. 32A-32C) relative to the carrier 2508. FIG. 32A shows the brake track 2510 in a first limit position in which the brake track 2510 is engaged with the tab 2702 on the end portion 2528 of the arm 2526. The brake track 2510 is restricted from moving further to the left in FIG. 32A by the tab 2702. FIG. 32B shows the brake track 210 moved to a center position. FIG. 32C shows the brake track 2510 moved to a second limit position, in which the positioning portion 2532 is engaged with the end portion 2528 of the arm 2526. In this example, the center range CR is defined by the inner surfaces of the tab 2702 and the first side 2520 of the carrier 2508, as shown in FIG. 32A. The center range CR is about the same as the thickness T2 of the carrier 208 (minus the thickness of the tab 2702).

FIG. 33 is a cross-sectional view of the brake rotor 2500 take along line E-E in FIG. 30. FIG. 34 is an enlarged view of the callout 3300 from FIG. 33. FIG. 34 shows the fastener 2606 that couples the positioning portion 2532 to the brake track 2510. In this example, the fastener opening 2610 in the positioning portion 2532 is threaded but the fastener opening 2608 in the brake track 2510 is not threaded. In other examples, the fastener opening 2608 in the brake track 2510 may also be threaded.

Figure 35B:
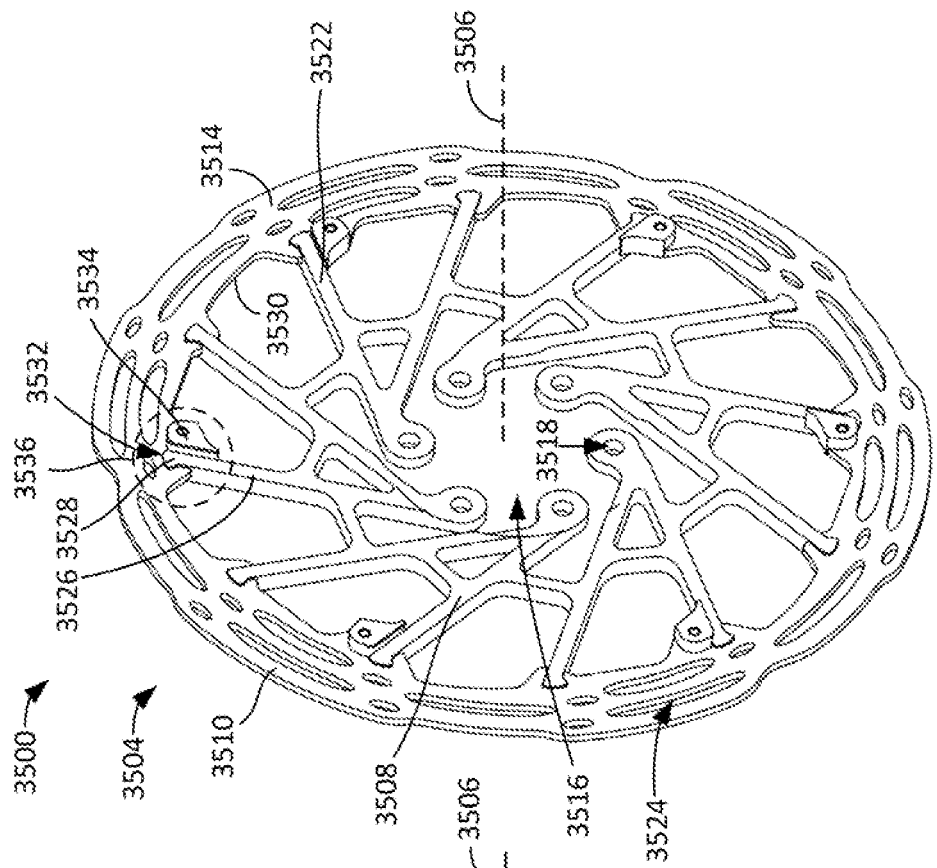
FIGS. 35A and 35B are perspective views of opposite sides of an example brake rotor constructed in accordance with the teachings of this disclosure.
Figure 35A:
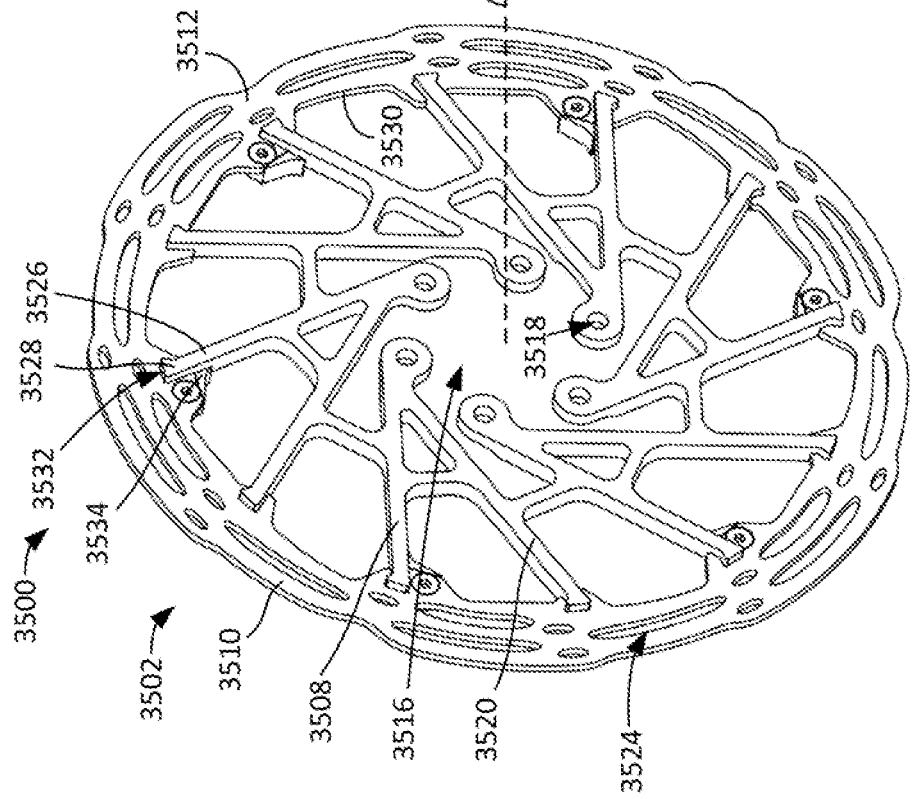

FIGS. 35A and 35B illustrate another example brake rotor 3500 constructed in accordance with the teachings of this disclosure. The example brake rotor 3500 can be implemented on the bicycle 100 of FIG. 1, for example, as the front brake rotor 142 and/or the rear brake rotor 150. FIG. 35A is a perspective view of a first side 3502 of the brake rotor 3500 and FIG. 35B is a perspective view of a second side 3504 of the brake rotor 3500 opposite the first side 3502. The brake rotor 3500 has a central axis 3506 that forms the rotational axis about which the brake rotor 3500 rotates. The brake rotor 3500 is substantially the same as the brake rotor 200 of FIGS. 2A and 2B. In particular, the brake rotor 3500 includes a carrier 3508, a brake track 3510 disposed radially outward of the carrier 3508, a first side 3512 and a second side 3514 of the brake track 3510 (which form the braking surfaces), a central opening 3516 in the carrier 3508 to receive a hub, a plurality of fastener openings 3518, a first side 3520 and a second side 3522 of the carrier 3508, a plurality of openings 3524 in the brake track 3510, a set of arms 3526 having end portions 3528, and an inner peripheral edge 3530 forming notches 3532 on the brake track 3510. The brake track 3510 is slidable in the axial direction on the end portions 3528 of the arms 3526, but constrained in the radial and circumferential directions in the same manner as in the brake rotor 200 disclosed above. To avoid redundancy, a full description of the carrier 3508 and the brake track 3510 is not provided. Instead, it is understood that any of the example structural and/or functional aspects disclosed above in connection with the brake rotor 200 likewise apply to the brake rotor 3500.

In this example, the brake rotor 3500 includes stops to limit the axial movement of the brake track 3510 relative to the carrier 3508 and thereby define the center range CR. For example, as shown in FIGS. 35A and 35B, the brake rotor 3500 includes a set of stops 3534 (one of which is referenced in FIGS. 35A and 35B). The stops 3534 limit axial movement of the brake track 3510 in one axial direction. In this example, the brake rotor 3500 includes six stops 3534. The stops 3534 are associated with every other one of the arms 3526. However, in other examples, the brake rotor 3500 may include more or fewer stops. In this example, the stops 3534 are coupled to the brake track 3500. As such, the stops 3534 move with the brake track 3510 relative to the carrier 3508. The stops 3534 extend outward from the second side 3514 of the brake track 3510, as shown in FIG. 35B.

Figure 36:
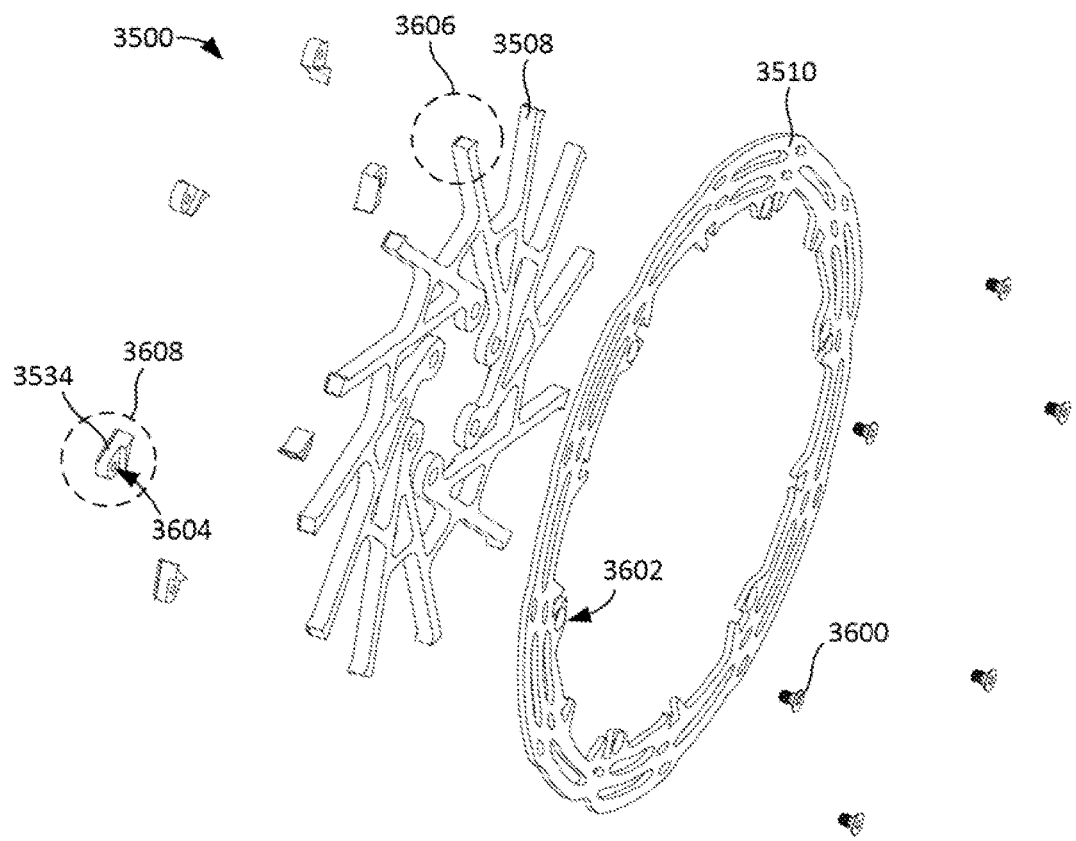
FIG. 36 is an exploded view of the example brake rotor of FIGS. 35A and 35B.

FIG. 36 is an exploded view of the brake rotor 3500. As shown in FIG. 36, the brake rotor 3500 includes the carrier 3508, the brake track 3510, and the stops 3534 (one of which is referenced in FIG. 36). In the illustrated example, the brake rotor 3500 includes a set of threaded fasteners 3600 (e.g., screws, bolts, etc.) (one of which is referenced in FIG. 36) to couple respective ones of the stops 3534 to the brake track 3510. The brake track 3510 has fastener openings 3602 (one of which is referenced in FIG. 36) through which the threaded fasteners 3600 extend. Each of the stops 3534 also has a corresponding fastener opening 3604 (one of which is referenced in FIG. 36). When the brake rotor 3500 is assembled, each threaded fastener 3600 extends through one of the fastener openings 3602 in the brake track 3510 and into one of the fastener openings 3604 in one of the stops 3534. In other examples, the stops 3532 can be coupled to the brake track 3510 using other mechanical and/or chemical fastening techniques.

Figure 37:
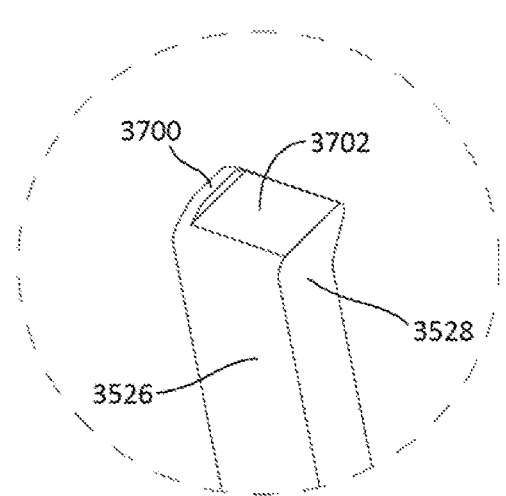
FIG. 37 is an enlarged view of one of the callouts in FIG. 36 showing an example end portion of an example arm of an example carrier.

FIG. 37 is an enlarged view of the callout 3606 from FIG. 36 showing one of the end portions 3528 of one of the arms 3626. The end portions 3528 of the other arms 3526 of the brake rotor 3500 in FIGS. 35A and 35A are identical to the end portion 3528 shown in FIG. 37. Thus, any of the aspects disclosed in connection with the end portion 3528 shown in FIG. 37 likewise apply to the other end portions 3528. The arm portion 3528 is identical to the end portion 2528 of the arm 2526 shown in FIG. 27. The end portion 3528 has a tab 3700 extending upward beyond an outer peripheral edge 3702 of the end portion 3528. The tab 3700 forms a first stop that limits axial movement of the brake track 3510 in one axial direction.

Figure 38:
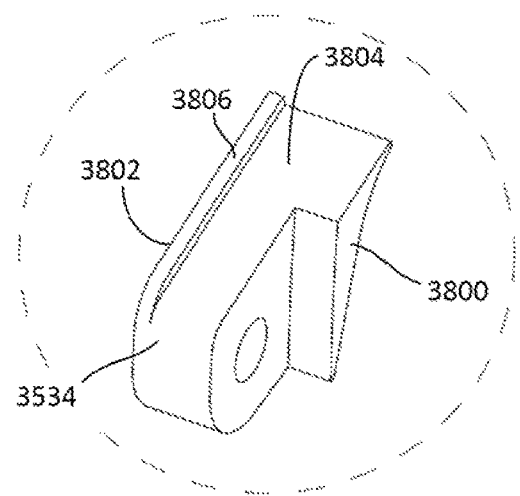
FIG. 38 is an enlarged view of the other callout in FIG. 36 showing an example stop.

FIG. 38 is an enlarged view of the callout 3608 from FIG. 36 showing one of the stops 3534. The other stops 3534 of the brake rotor 3500 of FIGS. 35A and 35B are identical to the stop 3534 shown in FIG. 38. Thus, any of the aspects disclosed in connection with the stop 3534 shown in FIG. 38 likewise apply to the other stops 3534. The stop 3534 has a first side 3800, a second side 3802 opposite the first side 3800, and an outer peripheral edge 3804 between the first and second sides 3800, 3802. As shown in FIG. 38, the stop 3534 has a ledge 3806, formed on the second side 3802, that extends upward beyond the outer peripheral edge 3804. The ledge 3806 forms a second stop that limits axial movement of the brake track 2510 in one axial direction.

Figure 39A:
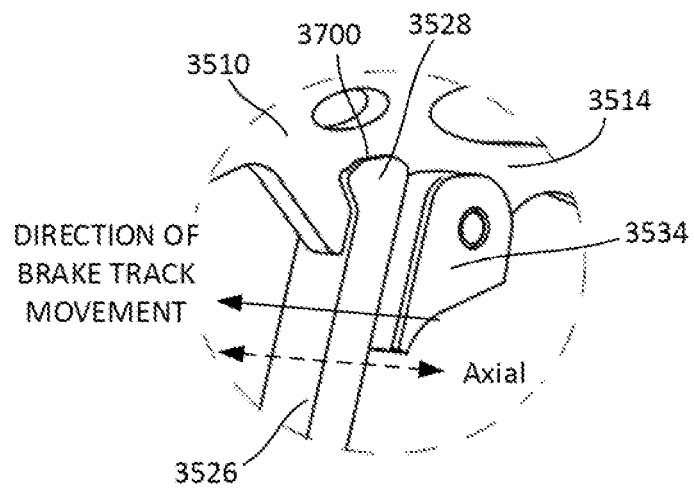
FIGS. 39A, 39B, and 39C are enlarged views of the callout in FIG. 35B showing an example sequence of axial movement of an example brake track between two stops.
Figure 39B:
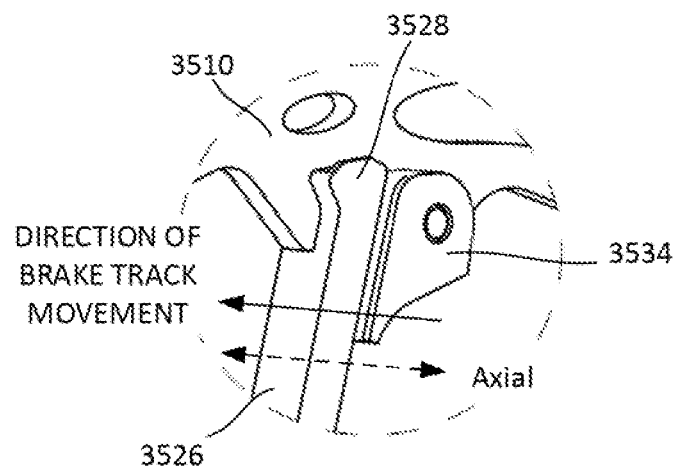
Figure 39C:
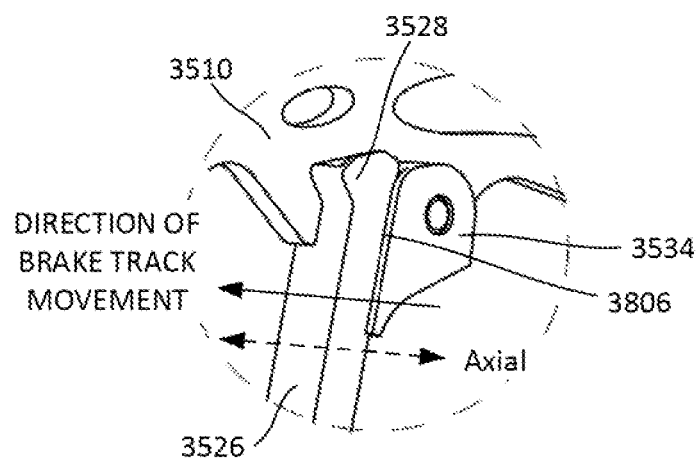

FIGS. 39A-39C are enlarged views of the callout 3536 from FIG. 35B showing an example sequence of the brake track 3510 being moved axially. The end portion 3528 of the arm 3526 is disposed in the notch 3532 in brake track 3510. The brake track 3510 is axially slidable on the end portion 3528 of the arm 3526. The stop 3534 is coupled to the brake track 3510 adjacent the arm 3526. In FIG. 39A, the tab 3700 on the end portion 3528 is engaged with the second side 3514 of the brake track 3510. This limits the brake track 3510 from being further moved in one axial direction (to the right in FIG. 39A). As shown in the sequence in FIGS. 39A-39C, the brake track 3510 can be moved axially in the opposite direction. In FIG. 39C, the end portion 3528 is engaged the ledge 3806 on the stop 3534. The ledge 3806 on the stop 3534 overlaps with the arm 3526 in the axial direction. The ledge 3806 limits the brake track 3510 from being further moved in the other axial direction. As such, the tab 3700 is a first stop that limits axial movement in a first axial direction and the stop 3534 is a second stop that limits axial movement in a second axial direction. In this example, both the tab 3700 and the ledge 3806 (i.e., the first and second stops) are on the same side of the brake rotor 3500. In particular, the tab 3700 and the ledge 3806 are on the second side 3504 of the brake rotor 3500. In some examples, when the brake track 3510 is moved axially, the arm 3526 is engaged with and slides on the outer peripheral edge 3804 (FIG. 38) of the stop 3534. In other examples, the stop 3534 is spaced from the arm 3526 such that the arm 3526 does not slide on the stop 3534. In some examples, instead of using the stop 3534 to provide a limit in one axial direction, a second tab can be formed on the opposite side of the arm 3526. For example, similar to the tab 3700, a second tab may extend upward beyond the outer peripheral edge 3702 on the first side 3520 of the end portion 3528 opposite the tab 3700. In such an example, the brake track 3510 is axially movable between the tab 3700 (a first stop) and a second tab (a second stop). In some examples, the second stop may be formed (e.g., by deforming the arm 3526) after the brake track 3510 is on the carrier 3508, thereby trapping the brake track 3510 between the tabs.

Figure 40:
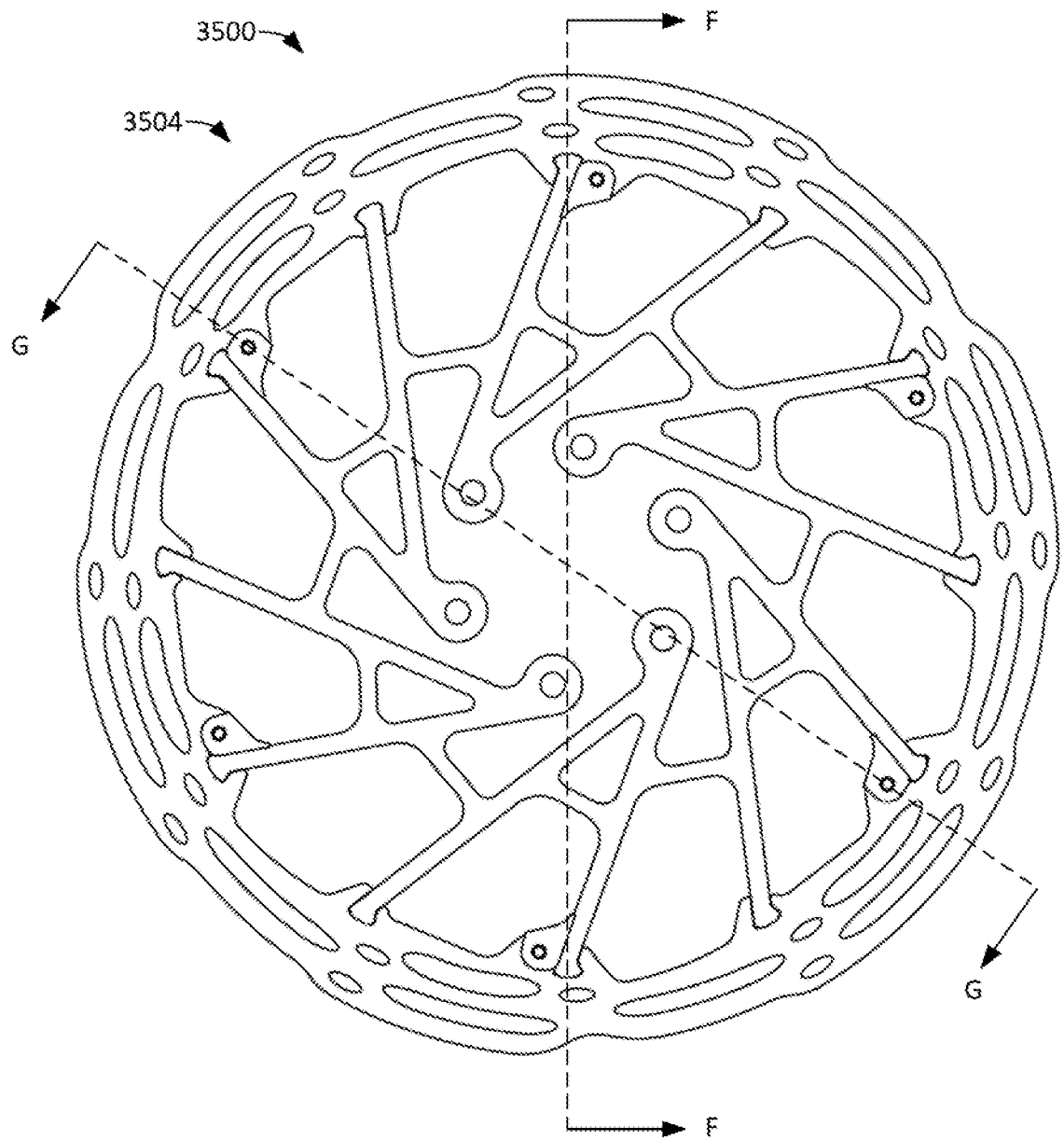
FIG. 40 is a side view of the example brake rotor of FIGS. 35A and 35B.

FIG. 40 is a side view of the second side 3504 of the brake rotor 3500. FIG. 41 is a cross-sectional view of the brake rotor 3500 taken along line F-F in FIG. 40. FIGS. 42A, 42B, and 42C are enlarged views of the callout 4100 from FIG. 41 showing the brake track 3510 and the stop 3534 in three different axial positions. The axial positions shown in FIGS. 42A-42C also correspond to the axial positions shown in FIGS. 39A-39C. As shown in FIG. 42A, the brake track 2510 has a thickness T1 and the carrier 3508 (e.g., the end portion 3538 of the arm 3526) has a thickness T2 that is greater than the thickness T1 of the brake track 3510. The brake track 210 can move axially (to the left and right in FIGS. 42A-42C) relative to the carrier 3508. FIG. 42A shows the brake track 3510 in a first limit position, in which the brake track 3510 is engaged with the tab 3700 on the end portion 3528 of the arm 3526. The brake track 3510 is restricted from moving further to the left in FIG. 42A by the tab 3700. FIG. 42B shows the brake track 3510 in a center position. FIG. 42C shows the brake track 3510 moved to a second limit position, in which the ledge 3806 on the stop 3534 is engaged with the end portion 3528 of the arm 3526. In this example, the center range CR is defined by the inner surfaces of the tab 3700 and the first side 3520 of the carrier 3508, as shown in FIG. 42A. The center range CR is about the same as the thickness T2 of the carrier 3508 (minus the thickness of the tab 3700).

FIG. 43 is a cross-sectional view of the brake rotor 3500 take along line G-G in FIG. 40. FIG. 44 is an enlarged view of the callout 4300 from in FIG. 43. FIG. 44 shows the fastener 3600 that couples the stop 3534 to the brake track 3510. In this example, the fastener opening 3604 in the stop 3534 is threaded but the fastener opening 3602 in the brake track 3510 is not threaded. In other examples, the fastener opening 3602 in the brake track 3510 may also be threaded.

Figure 45:
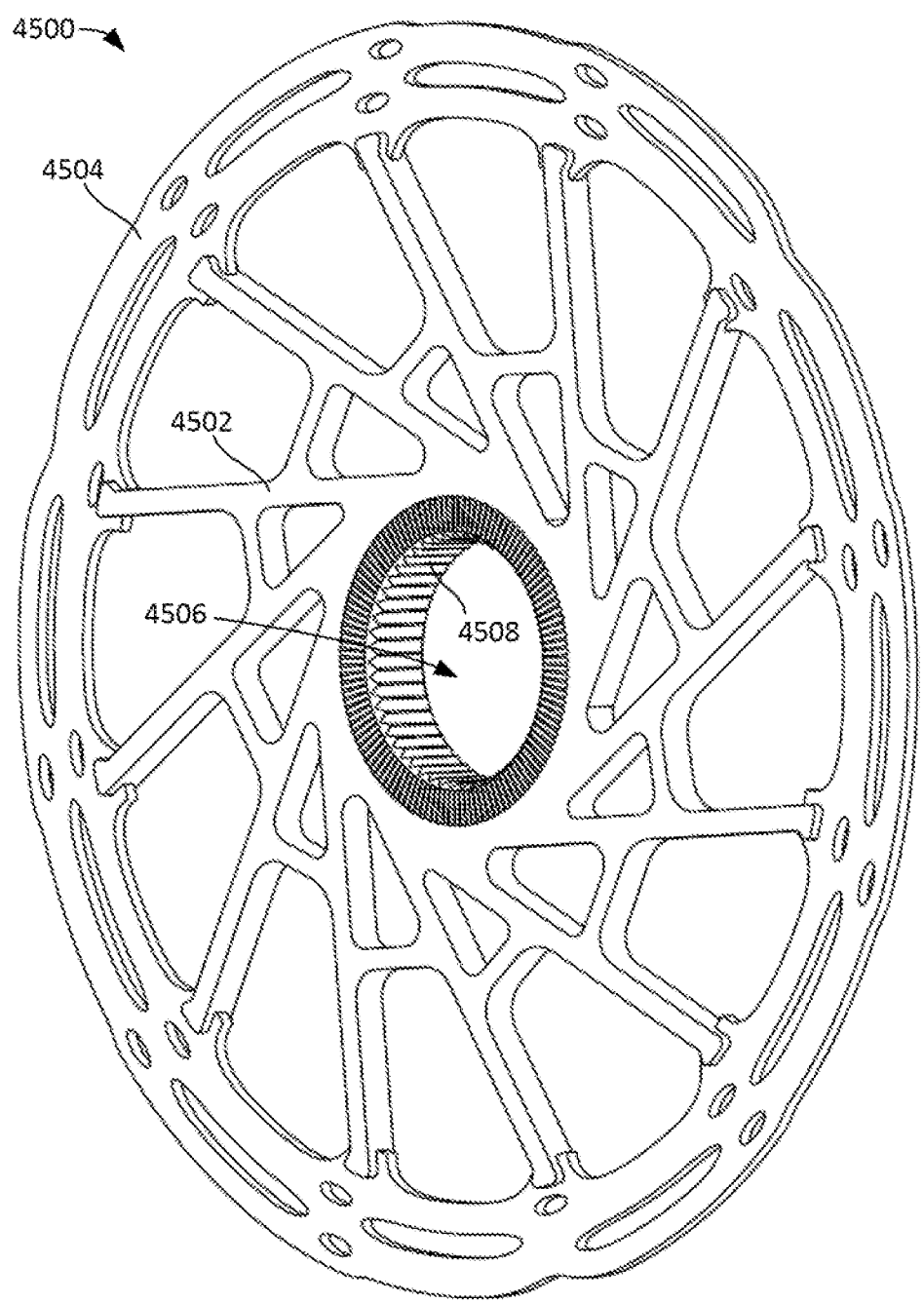
FIG. 45 is a perspective view of an example rotor constructed in accordance with the teachings of this disclosure. The example brake rotor includes a center-lock style carrier.

While the example brake rotors 200, 1000, 2500, and 3500 disclosed above include a six bolt mounting system for mounting to a hub, any of the example brake rotors disclosed herein can instead include a center-lock style mounting carrier for mounting to a hub. For example, FIG. 45 is a perspective view of an example brake rotor 4500. The brake rotor 4500 includes a carrier 4502 and a brake track 4504 that are substantially the same as the brake rotor 200 disclosed in connection with FIGS. 2A and 2B. However, in this example, the carrier 202 has a central opening 4506 defined by a splined interface 4508. The splined interface 4508 can be engaged (e.g., meshed) with a corresponding spline interface on the hub, and which may or may not include a lock ring. In other examples, any of the example brake rotors disclosed herein can be coupled to the hub in other manners.

In the example rotors 200, 1000, 2500, 3500, and 4500 disclosed above, the movable (e.g., slidable) interface that allows for the axial movement is between the brake rotor and the carrier, and which is radially outward of the hub attachment section of the carrier. This interface has a relatively large diameter. In particular, the sliding interface is formed between the outer diameter of the carrier and the inner diameter of the brake track. In other examples, this sliding interface can have smaller diameter. For example, the brake rotor can be configured such that the movable (e.g., slidable) interface is at the hub attachment section of the carrier.

Figure 47:
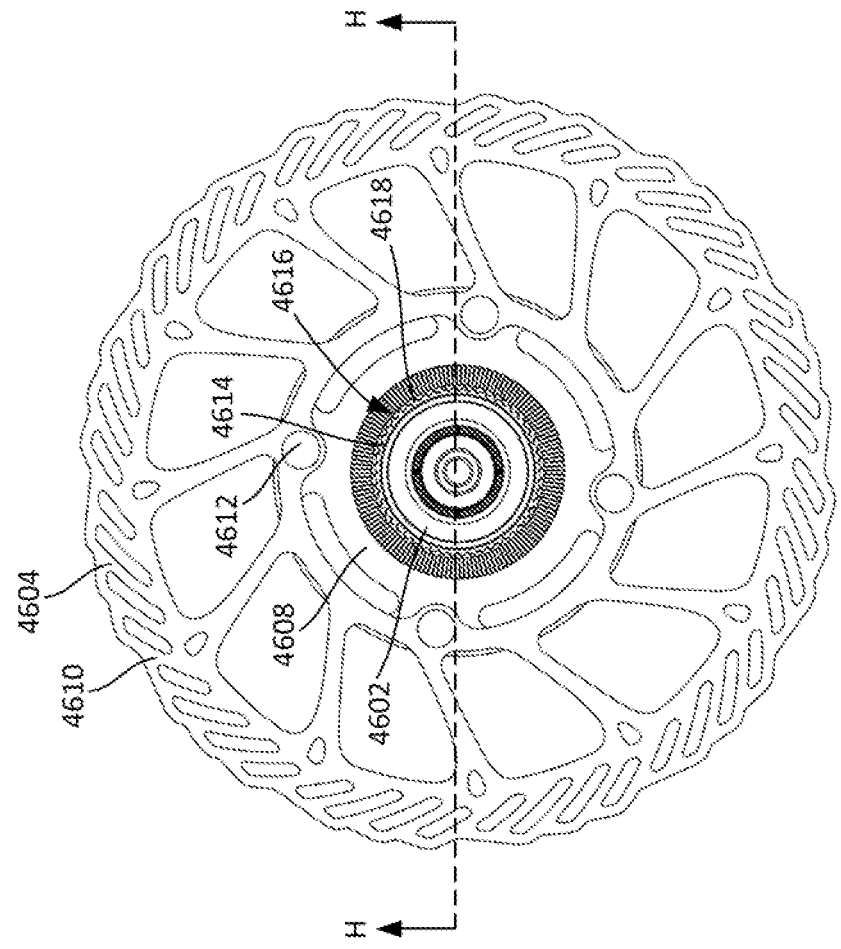
FIG. 47 is a side view of the example brake rotor and the example hub of FIG. 46.
Figure 46:
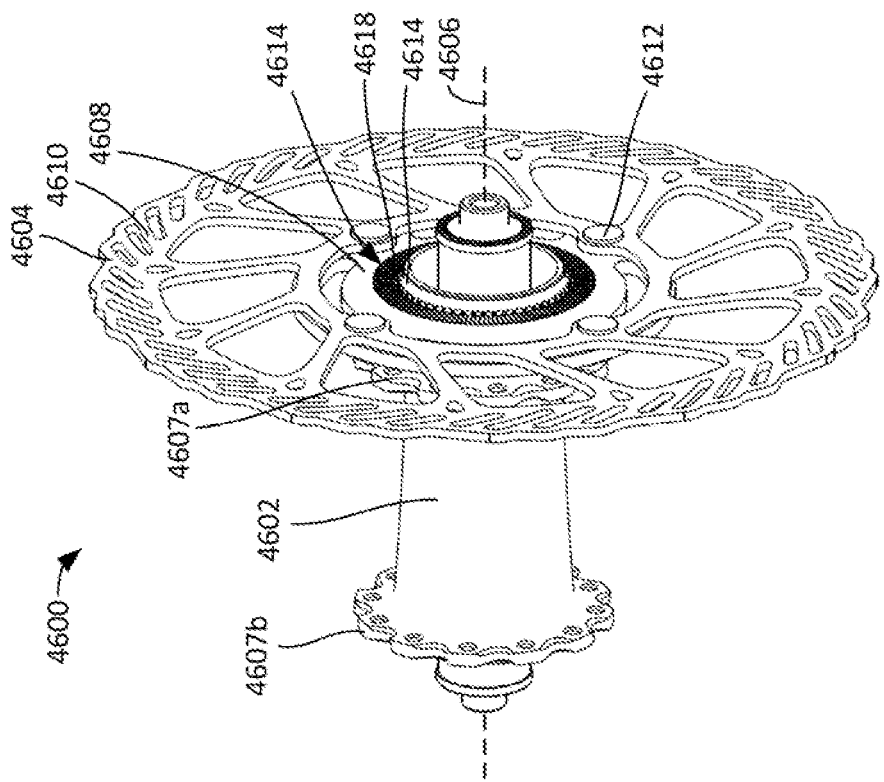
FIG. 46 is a perspective view of an example hub assembly constructed in accordance with the teachings of this disclosure. The example hub assembly includes an example hub and an example brake rotor.

FIG. 46 is a perspective view of an example hub assembly 4600 including an example hub 4602 and an example brake rotor 4604 constructed in accordance with the teachings of this disclosure. The brake rotor 4604 is disposed on the hub 4602. The hub 4602 and the brake rotor 4604 rotate about a central axis 4606. As such, the central axis 4606 is the same as the rotational axis, which defines the coordinate reference for the axial, radial, and circumferential directions referenced herein. FIG. 47 is a side view of the brake rotor 4604 on the hub 4602. The hub 4602 may be a rear hub or a front hub of a wheel on a bicycle, such as the bicycle 100 of FIG. 1. The hub 4602, as shown in FIG. 46, has a first spoke-attachment flange 4607a and a second spoke-attachment flange 4607b. A wheel having the example hub assembly 4600 may have spokes that can be attached to the first and second spoke-attachment flanges 4607a, 4607b.

As shown in FIGS. 46 and 47, the brake rotor 4604 includes a carrier 4608 and a brake track 4610 coupled to the carrier 4608. The brake track 4610 has braking surfaces to be engaged by brake pads. In this example, the brake track 4610 is fixedly coupled to the carrier 4608. As such, the brake track 4610 is constrained axially, radially, and circumferentially relative to the carrier 4608. In the illustrated example, the brake track 4610 and the carrier 4608 are coupled via a set of fasteners 4612 (e.g., rivets, screws, etc.) (one of which is referenced in FIGS. 46 and 47). However, in other examples, the brake track 4610 and the carrier 4608 can be coupled using other fastening techniques. In some examples, the fasteners 4612 and/or the carrier 4608 are constructed of aluminum alloy, steel alloy, a structural polymer, or other composite material.

As shown in FIGS. 46 and 47, the hub 4602 has a first spline interface 4614. The carrier 4608 has a central opening 4616 defined by a second spline interface 4618. The second spline interface 4618 is engaged (e.g., meshed) with the first spline interface 4614 on the hub 4602. As such, the brake rotor 4604 and the hub 4602 are rotationally fixed together. This interface also radially and circumferentially constrains the brake rotor 4604. However, the carrier 4608 of the brake rotor 4064 is axially movable (e.g., slidable) on the hub 4602. This enables the brake rotor 4604 to move axially relative to the hub 4602 for re-centering during braking operations. Therefore, in this example, the sliding interface that enables axial movement of the brake rotor 4604 (and, thus, the brake track 4610) is between the first spline interface 4614 of the hub 4602 and the second spline interface 4618 of the brake rotor 4604. In some examples, the sliding interface is less than half the diameter of the brake rotor 4604. In other examples, the sliding interface may be greater than or less than half the diameter of the brake rotor 4604.

Figure 48:
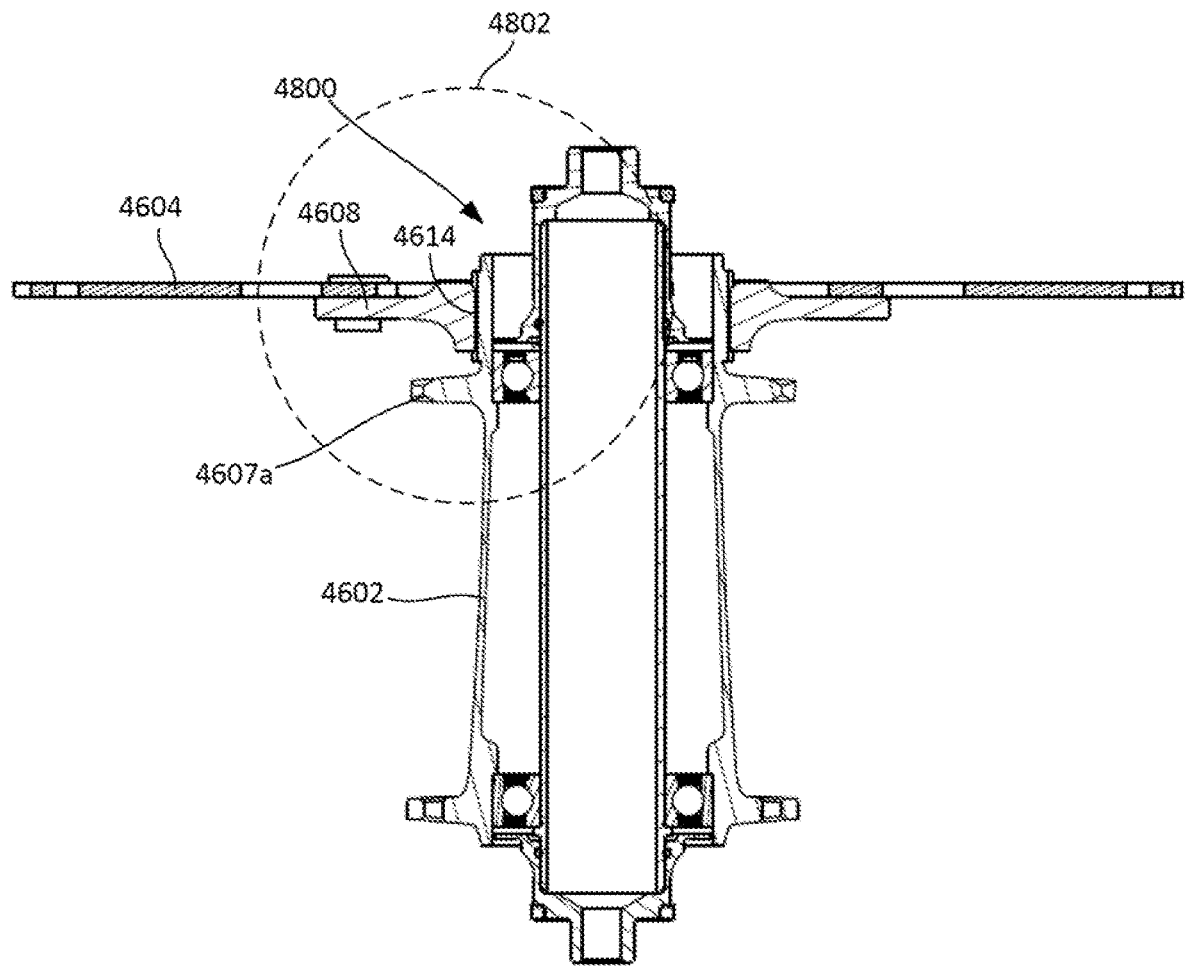
FIG. 48 is a cross-sectional view of the example brake rotor and the example hub of FIG. 46 taken along line H-H of FIG. 47.

FIG. 48 is a cross-sectional view of the hub 4602 and the brake rotor 4604 taken along line H-H in FIG. 47. The hub 4602 has a frame attachment section 4800, which is a section where a member of the frame of the bicycle attaches to the hub 4602. As shown in FIG. 48, the first spline interface 4614 is between the first spoke-attachment flange 4607a and the frame attachment section 4800. The carrier 4608 of the brake rotor 4604 is axially slidable on the first spline interface 4614.

Figure 49A:
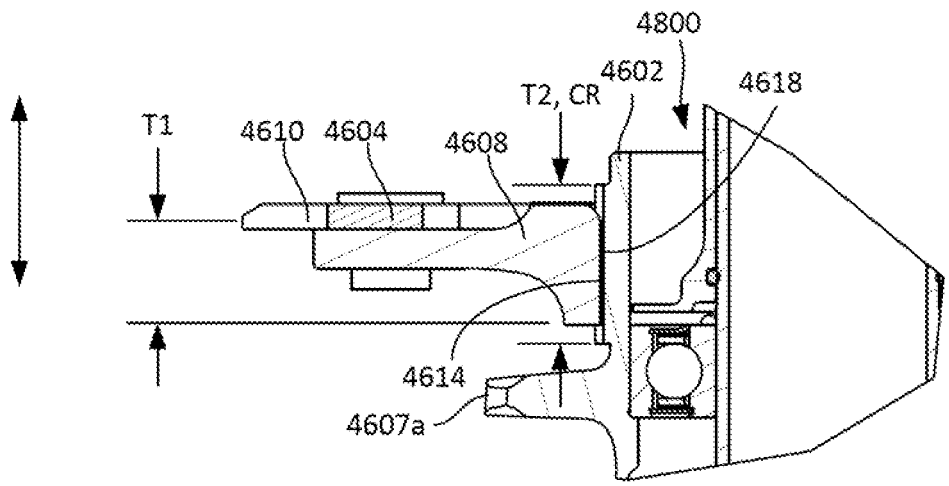
FIGS. 49A, 49B, and 49C are enlarged views of the callout in FIG. 48 showing the example brake rotor moved axially to three different positions.
Figure 49B:
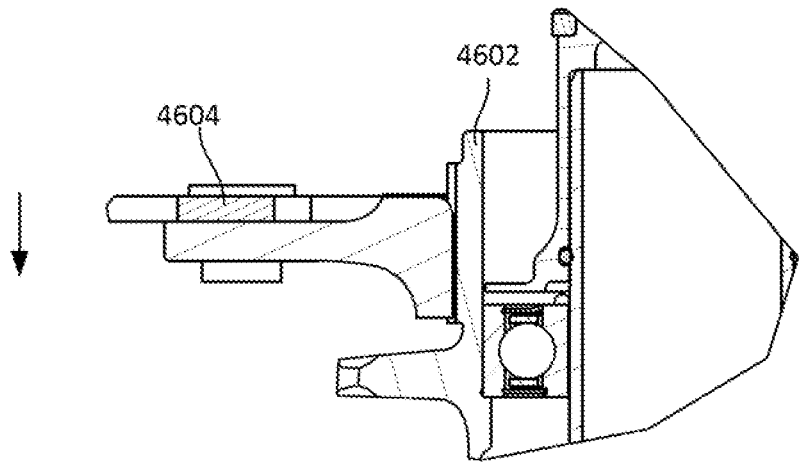
Figure 49C:
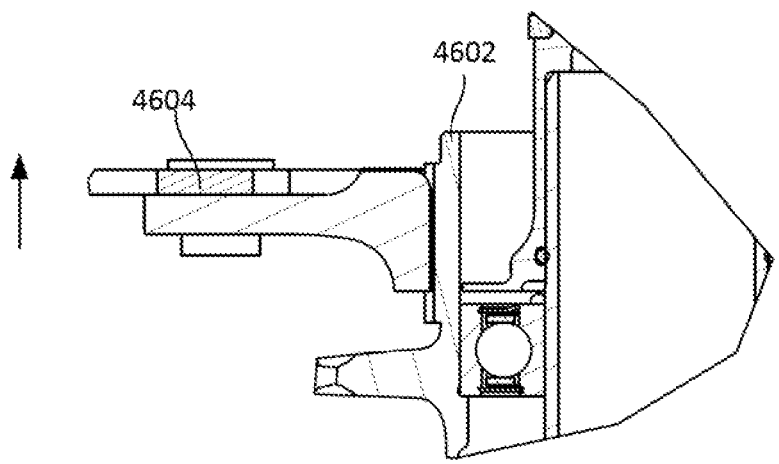

FIGS. 49A, 49B, and 49C are enlarged views of the callout 4802 from FIG. 48 showing the brake rotor 4604 in three different axial positions on the hub 4602. FIG. 49A shows the brake track 4604 in a center position. The brake rotor 4604 is movable (e.g., slidable) in the axial direction (up or down in FIG. 49A) relative to the hub 4602. This enables the brake rotor 4604 to self-center when the brake pads are applied. For example, FIG. 49B shows the brake rotor 4604 moved in a first axial direction to an inboard position, and FIG. 49C shows the brake rotor 4604 moved in a second axial to an outboard position. The frictional force of the sliding interface between the brake rotor 4604 and the hub 4602 is the same as the frictional force disclosed in connection with the other brake rotors disclosed herein. In particular, the frictional force between the first spline interface 4614 of the hub 4602 and the second spline interface 4618 of the brake rotor 4604 is an amount that the brake rotor 4604 can slide axially on the hub 4602 when engaged with a sufficient force (e.g., 1 newton) by the brake pads, but when the brake pads are released, the friction holds the brake rotor 4604 in substantially the same axial position on the hub 4602.

As shown in FIG. 49A, the second spline interface 4618 of the carrier 4608 has a thickness of T1. In this example, the second spline interface 4618 is less than the thickness of the carrier 4608, because the central opening 4616 flares outward on one end. The first spline interface 4614 of the hub 4602 has a thickness of T2 that is greater than the thickness T1 of the second spline interface 4618, which allows the brake rotor 4604 to move axially on the hub 4602 without extending beyond the hub 4602. In this example, the brake rotor 4604 has a center range CR that corresponds to the thickness T2 of the first spline interface 4618 of the hub 4602. However, in other examples, the center range CR may be greater than or less than the thickness T2. In some examples, the center range CR may be any amount that is greater than the thickness T1 of the second spline interface 4618 of the carrier 4608. In other words, the center range CR can be any factor that is greater than the thickness T1 of the second spline interface 4618, such as 1.1×, 1.2×, 1.3×, etc.

In the illustrated example, the hub assembly 4600 does not include any stops to limit axial movement to the center range CR. However, as disclosed in connection with the brake rotor 200 in FIGS. 8 and 9, the brake pads may define stops that limit the axial movement and define the center range CR. Additionally or alternatively, the brake rotor 4604 may be stopped by one or more other structures that are adjacent the brake rotor 4604. For example, if the brake rotor 4604 is moved axially inboard a sufficient amount, the carrier 4608 engages the first spoke-attachment flange 4607a. If the brake rotor 4604 is moved axially outboard a sufficient amount, the carrier 4608 engages a portion of the frame of the bicycle at the frame attachment section 4800. Therefore, the brake rotor 4604 is axially movable on the first spline interface 4614 of the hub between the first spoke-attachment flange 4607a and the frame attachment section 4800. As such, the center range CR is defined by the first spoke-attachment flange 4607a and the frame attachment section 4800. In other examples, one or more stops may be formed on one or both sides to limit the axial movement.

In some examples, a brake rotor may be axially slidable on a hub, as shown in FIG. 46, and may include a brake track that is axially slidable on a carrier. For example, any of the example brake rotors 200, 1000, 2500, 3500, and 4500 can be implemented with a spline interface as shown in FIGS. 46 and 47. This provides two layers of axial movement.

As disclosed herein, some example brake rotors have sliding interfaces that are radially outward from the hub attachment section and other brake rotors having sliding interfaces that are at the hub attachment section. The dimensions of the brake rotor and/or its components can be varied as desired. In some examples, to prevent or limit the brake rotor from binding, the brake rotor is designed with a ratio L/D that is less than or equal to 10. L is the length or distance between the brake pad center and the sliding interface of the brake rotor (whether between the brake track and the carrier, or between the carrier and the hub), and D is the sliding interface depth. This ratio is demonstrated in connection with FIGS. 50-53 and disclosed in further detail below.

Figure 50:
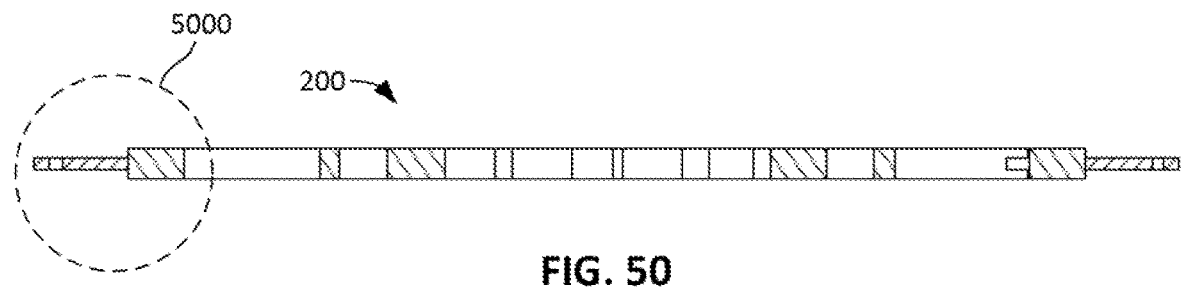
FIG. 50 is another cross-sectional view of the example brake rotor of FIGS. 2A and 2B taken along line A-A in FIG. 3.
Figure 51:
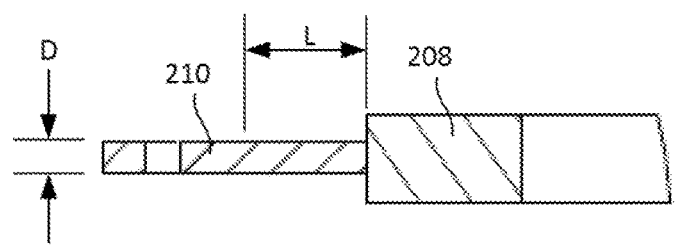
FIG. 51 is an enlarged view of the callout in FIG. 50.

FIG. 50 is a cross-sectional view of the brake rotor 200 of FIGS. 2A and 2B taken along line A-A of FIG. 3. FIG. 51 is an enlarged view of the callout 5000 from FIG. 50. The depth D and the length L are labeled in FIG. 51. The depth D is the depth or thickness of the sliding interface (which is defined by the contact surface between the brake track 210 and the carrier 208). In this example, the depth D correspond to the thickness of the brake track 210. The length L is the distance between the center of the brake pad (where the brake pad would be aligned) and the sliding interface. If the L/D ratio becomes too large, such as if the length L is increased significantly compared to the depth D, the brake track 210 may have tendency to become misaligned and bind on the carrier 208. Therefore, as disclosed above, having the L/D ratio equal to or less than 10 helps to prevent or limit this potential binding.

Figure 52:
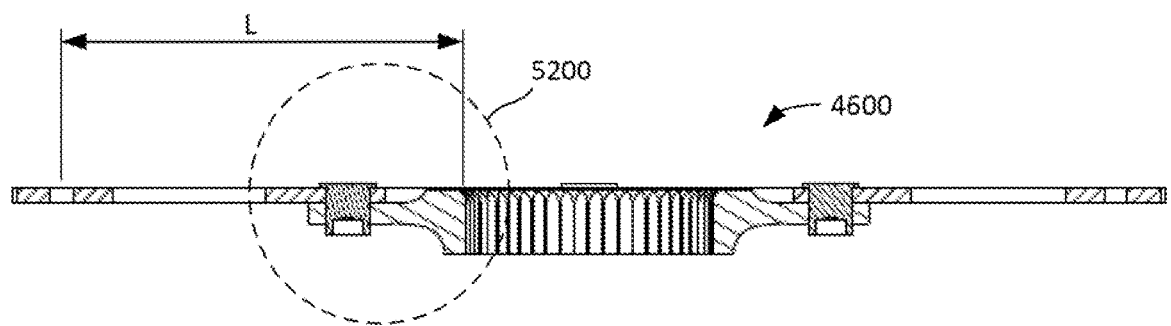
FIG. 52 is a cross-sectional view of just the example brake rotor of FIG. 46 taken along line H-H of FIG. 47.
Figure 53:
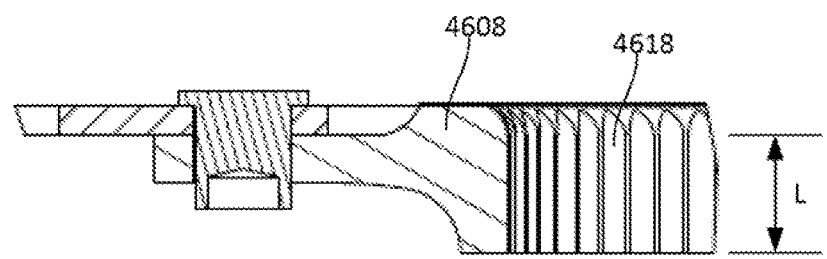
FIG. 53 is an enlarged view of the callout in FIG. 52.

This ratio also applies to configurations having a sliding interface at the hub attachment section. For example, FIG. 52 is a cross-sectional view of the brake rotor 4604 of FIG. 46 taken along line H-H of FIG. 47. The length L is labeled in FIG. 52. The length L is the distance between the center of the brake pad and the sliding interface (which is defined by the contact surface between the carrier 4608 and the hub 4602 (FIG. 46)). FIG. 53 is an enlarged view of the callout 5200 from FIG. 52. The depth D is labeled in FIG. 53. The depth D is the depth or thickness of the second spline interface 4618 of the carrier 4608, which forms the sliding interface. As disclosed above, having the L/D ratio equal to or less than 10 helps to prevent or limit potential binding. However, in other examples, other L/D ratios may be implemented.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A brake rotor for a bicycle, the brake rotor comprising:
   a carrier to be coupled to a hub of the bicycle, the carrier having an arm with an end portion, the end portion having a protrusion extending in a circumferential direction; and
   a brake track having braking surfaces to be engaged by brake pads, the brake rotor having a rotational axis defining a coordinate reference, the brake track disposed radially outward of the carrier, the brake track having an inner peripheral edge with a notch, the end portion of the arm disposed in the notch, the brake track being axially slidable on the end portion, the notch of the brake track at least partially defined by a lip that is disposed radially inward relative to the protrusion of the end portion to radially constrain the brake track relative to the carrier.

2. The brake rotor of claim 1, further including a first stop to limit axial movement of the brake track in a first axial direction and a second stop to limit axial movement of the brake track in a second axial direction.

3. The brake rotor of claim 2, wherein the first stop is on a first side of the brake rotor and the second stop is on a second side of the brake rotor opposite the first side of the brake rotor.

4. The brake rotor of claim 2, wherein the first stop and the second stop are on a same side of the brake rotor.

5. The brake rotor of claim 1, wherein the inner peripheral edge of the brake track along the notch is slidably engaged with an outer peripheral edge of the end portion.

6. The brake rotor of claim 1, wherein the carrier has a spline interface to engage a spline interface on the hub.

7. The brake rotor of claim 1, wherein the brake rotor does not include any stops to limit axial movement of the brake track relative to the carrier.

8. A brake rotor for a bicycle, the brake rotor comprising:
   a carrier to be coupled to a hub of the bicycle;
   a brake track having braking surfaces to be engaged by brake pads, the brake track disposed radially outward of the carrier, the brake track having a first thickness and the carrier having a second thickness greater than the first thickness, the brake rotor having a rotational axis defining a coordinate reference, the brake track coupled to the carrier such that the brake track is axially movable relative to the carrier while being radially and circumferentially constrained relative to the carrier; and
   a positioning portion coupled to the brake track, the positioning portion to dissipate heat from the brake track, wherein the carrier has an arm with an end portion, and wherein the positioning portion has a notch, the end portion disposed in the notch, the end portion to slide in the notch when the brake track moves axially relative to the carrier.

9. The brake rotor of claim 8, wherein the end portion of the arm has a tab extending outward from an outer peripheral edge of the end portion.

10. The brake rotor of claim 9, wherein the tab is to limit axial movement of the brake track in a first axial direction and the cooling fin is to limit axial movement of the brake track in a second axial direction.

11. The brake rotor of claim 9, wherein the tab and the cooling fin are on a same side of the brake rotor.

12. The brake rotor of claim 8, wherein the arm is a first arm, the end portion is a first end portion, and the notch is a first notch, wherein:
   the carrier includes a second arm with a second end portion, and
   the cooling fin has a second notch, the second end portion disposed in the second notch, the second end portion to slide in the second notch when the brake track moves axially relative to the carrier.

13. A brake rotor for a bicycle, the brake rotor comprising:
   a carrier to be coupled to a hub of the bicycle;
   a brake track having braking surfaces to be engaged by brake pads, the brake track disposed radially outward of the carrier, the brake track having a first thickness and the carrier having a second thickness greater than the first thickness, the brake rotor having a rotational axis defining a coordinate reference, the brake track coupled to the carrier such that the brake track is axially movable relative to the carrier while being radially and circumferentially constrained relative to the carrier;
   a pin extending through an opening formed in the brake rotor, the pin having a head disposed on a first side of the carrier; and
   a clip coupled to the pin and disposed on a second side of the carrier, the head and the pin overlap with a portion of the brake track in an axial direction.

14. The brake rotor of claim 13, wherein the head is to limit axial movement of the brake track in a first axial direction and the clip is to limit axial movement of the brake track in a second axial direction.

15. The brake rotor of claim 13, wherein the opening is partially formed in the brake track and partially formed in the carrier.

16. The brake rotor of claim 13, further including a spring disposed between an outer peripheral edge of the carrier and an inner peripheral edge of the brake track, the spring to bias the brake track circumferentially relative to the carrier.

17. A brake rotor for a bicycle, the brake rotor comprising:
   a carrier to be coupled to a hub of the bicycle; and
   a brake track having braking surfaces to be engaged by brake pads, the brake track disposed radially outward of the carrier, the brake track having a first thickness and the carrier having a second thickness greater than the first thickness, the brake rotor having a rotational axis defining a coordinate reference, the brake track coupled to the carrier such that the brake track is axially movable relative to the carrier while being radially and circumferentially constrained relative to the carrier, wherein:
   the carrier has an arm with an end portion, the end portion having a protrusion extending in a circumferential direction, and
   the brake track has a notch with a shape corresponding to the end portion, the end portion disposed in the notch, the end portion to slide in the notch when the brake track moves axially relative to the carrier.

* * * * *